(12) United States Patent
Gao et al.

(10) Patent No.: US 10,897,385 B2
(45) Date of Patent: Jan. 19, 2021

(54) POWER AND RESOURCE EFFICIENT UPLINK DMRS SEQUENCES FOR IFDMA

(71) Applicant: Telefonaktiebolaget LM Ericsson (publ), Stockholm (SE)

(72) Inventors: Shiwei Gao, Nepean (CA); Robert Mark Harrison, Grapevine, TX (US); Lars Lindbom, Karlstad (SE); Florent Munier, Västra Frölunda (SE); Siva Muruganathan, Stittsville (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/335,580

(22) PCT Filed: Sep. 29, 2017

(86) PCT No.: PCT/IB2017/056042
§ 371 (c)(1),
(2) Date: Mar. 21, 2019

(87) PCT Pub. No.: WO2018/060969
PCT Pub. Date: Apr. 5, 2018

(65) Prior Publication Data
US 2020/0028723 A1    Jan. 23, 2020

Related U.S. Application Data

(60) Provisional application No. 62/402,215, filed on Sep. 30, 2016, provisional application No. 62/417,969, filed on Nov. 4, 2016.

(51) Int. Cl.
*H04W 4/00*    (2018.01)
*H04L 27/26*   (2006.01)
(Continued)

(52) U.S. Cl.
CPC ........ *H04L 27/2613* (2013.01); *H04L 5/0051* (2013.01); *H04L 5/10* (2013.01);
(Continued)

(58) Field of Classification Search
CPC ............... H04W 72/042; H04W 76/27; H04W 72/0453; H04L 5/0053; H04L 5/0007;
(Continued)

(56) References Cited

U.S. PATENT DOCUMENTS 10,469,225 B2 * 11/2019 Kim ...................... H04L 5/0048
2009/0168730 A1 * 7/2009 Baum .................. H04L 25/0228
370/336
(Continued)

OTHER PUBLICATIONS

3GPP TSG-RAN WG1 Meeting #84bis R1-162777 Busan, Korea, Apr. 11-15, 2016, (Year: 2016).*
(Continued)

*Primary Examiner* — Atique Ahmed
(74) *Attorney, Agent, or Firm* — Christopher & Weisberg, P.A.

(57) ABSTRACT

A method of transmitting demodulation reference signals (DMRS) over one, three or five resource blocks (RBs) with Interleaved Frequency Division Multiple Access (IFDMA) from a wireless device to a wireless network node in a wireless network wherein Single Carrier Frequency Division Multiple Access (SC-OFDMA) is deployed in uplink, is provided. At least one of: a set of base sequences including thirty quadrature phase shifting keying, QPSK, sequences of length 6, 18 or 30 is determined, a demodulation reference signal sequence is derived from the determined set of base sequences, the demodulation reference signal sequence is multiplexed, and the multiplexed demodulation reference signal sequence is transmitted, by the wireless device, to the wireless network node.

7 Claims, 27 Drawing Sheets

(51) Int. Cl.
  *H04L 5/00* (2006.01)
  *H04L 5/10* (2006.01)
  *H04L 27/20* (2006.01)
  *H04W 72/04* (2009.01)
(52) U.S. Cl.
  CPC ...... *H04L 27/2085* (2013.01); *H04L 27/2607* (2013.01); *H04L 27/2636* (2013.01); *H04W 72/042* (2013.01)
(58) Field of Classification Search
  CPC ..... H04L 27/2613; H04L 5/0051; H04L 5/10; H04L 27/2085; H04L 27/2607; H04L 27/2636
  See application file for complete search history.

(56) References Cited

U.S. PATENT DOCUMENTS

| | | | | |
|---|---|---|---|---|
| 2012/0269144 | A1* | 10/2012 | Suzuki | H04L 5/0091 370/329 |
| 2015/0043465 | A1* | 2/2015 | Ouchi | H04W 72/12 370/329 |
| 2015/0312009 | A1* | 10/2015 | Nissila | H04L 27/2602 370/329 |
| 2017/0331577 | A1* | 11/2017 | Parkvall | H04L 5/1469 |
| 2018/0278395 | A1* | 9/2018 | Yoon | H04L 5/0051 |
| 2019/0081839 | A1* | 3/2019 | Qu | H04L 27/2607 |

OTHER PUBLICATIONS

3GPP TSG-RAN WG1#86bis R1- 1609850 Lisbon, Portugal, Oct. 10-14, 2016 (Year: 2016).*
Invitation to Pay Additional Fees dated Jan. 5, 2018 issued in corresponding PCT Application No. PCT/IB2017/056042, consisting of 19 pages.
International Search Report and Written Opinion of the International Searching Authority dated Mar. 1, 2018 issued in corresponding PCT Application No. PCT/IB2017/056042, consisting of 22 pages.
International Preliminary Report on Patentability dated Feb. 13, 2019 issued in corresponding PCT Application No. PCT/IB2017/056042, consisting of 53 pages.
3GPP TS 36.211 V13.0.0 (2015-12); 3rd Generation Partnership Project; Technical Specification Group Radio Access Network; Evolved Universal Terrestrial Radio Access (E-UTRA); Physical Channels and Modulation (Release 13), consisting of 141 pages.
3GPP TSG-RAN WG1#86bis R1-16nnnn, Title: "On RPF, Control Signalling, and Power Boosting for UL DMRS," Source: Ericsson, Agenda Item: 7.2.2.3, Document for Discussion and Decision, Conference Location and Date: Lisbon, Portugal, Oct. 10-14, 2016, consisting of 4 pages.
3GPP TSG-RAN WG1#86bis R1-1609850, Title: "On New UL DMRS Sequences of Lengths 6,18 and 30," Source: Ericsson, Agenda Item: 7.2.2.3, Document for Discussion and Decision, Conference Location and Date: Lisbon, Portugal, Oct. 10-14, 2016, consisting of 8 pages.
GPP TSG-RAN WG1#84bis R1-162777, Title: "NB-IoT—UL Reference Signals," Source: Ericsson, Agenda Item: 7.2.1.2.2, Document for Discussion and Decision, Conference Location and Date: Busan, Korea, Apr. 11-15, 2016, consisting of 8 pages.
3GPP TSG-RAN WG1#86bis R1-1609849, Title: "On RPF, Control Signalling, and Power Boosting for UL DMRS," Source: Ericsson, Agenda Item: 7.2.2.3, Document for Discussion and Decision, Conference Location and Date: Lisbon, Portugal, Oct. 10-14, 2016, consisting of 4 pages.
3GPP TSG RAN WG1 #44 Tdoc# R1-060385, Title: "Cubic Metric in 3GPP-LTE", Source: Motorola, Document for Discussion, Conference Location and Date: Denver, USA, Feb. 13-17, 2006, consisting of 7 pages.
3GPP TSG RAN WG1 Meeting #86 R1-166341, Title: "Control Signalling for UL DMRS With IFDMA," Source: Nokia, Alcatel-Lucent Shanghai Bell, Document for Discussion and Decision, Conference Location and Date: Gothenburg, Sweden, Aug. 22-26, 2016, consisting of 5 pages.
3GPP TSG RAN WG1 Meeting #86 R1-167087, Title: "UL DMRS Base Sequences with IFDMA," Source: Nokia, Alcatel-Lucent Shanghai Bell, Document for Discussion and Decision, Conference Location and Date: Gothenburg, Sweden, Aug. 22-26, 2016, consisting of 4 pages.
Written Opinion of the International Preliminary Examining Authority dated Nov. 21, 2018 issued in corresponding PCT Application No. PCT/IB2017/056042, consisting of 11 pages.
3GPP TSG RAN WG1 Meeting #86 R1-166141, Title: "Uplink DMRS Enhancement Support More Orthogonal Partial Overlapped Ports," Source: Huawei, HiSilicon, Document for Discussion and Decision, Conference Location and Date: Gothenburg, Sweden, Aug. 22-26, 2016, consisting of 6 pages.

* cited by examiner

POWER AND RESOURCE EFFICIENT UPLINK DMRS SEQUENCES FOR IFDMA

CROSS-REFERENCE TO RELATED APPLICATIONS

This application is a Submission Under 35 U.S.C. § 371 for U.S. National Stage Patent Application of International Application Number: PCT/IB2017/056042, filed Sep. 29, 2017 entitled "POWER AND RESOURCE EFFICIENT UPLINK DMRS SEQUENCES FOR IFDMA", which claims priority to and the benefit of the filing date of U.S. Provisional Application No. 62/402,215 filed Sep. 30, 2016 entitled "POWER AND RESOURCE EFFICIENT UPLINK DMRS SEQUENCES FOR IFDMA" and U.S. Provisional Application No. 62/417,969 filed Nov. 4, 2016 entitled "POWER AND RESOURCE EFFICIENT UPLINK DMRS SEQUENCES FOR IFDMA", all of which are incorporated herein by reference in their entirety.

TECHNICAL FIELD

This disclosure relates to wireless communications, and in particular to a method and wireless device for using a reference signal sequence at a predetermined power level.

BACKGROUND

In 3GPP Long Term Evolution (LTE) systems, data transmissions in both downlink. i.e. from a network node or base station such as an eNodeB (eNB) to a wireless device such as a User Equipment (UE) and uplink. i.e., from a wireless device or UE to a network node or base station or eNB, are organized into radio frames of 10 ms, each radio frame consisting of ten equally-sized subframes of length Tsubframe=1 ms, as shown in FIG. 1.

LTE uses Orthogonal Frequency Division Multiplexing (OFDM) in the downlink and Single Carrier OFDM (SC-OFDM) in the uplink. The basic LTE downlink physical resource can thus be seen as a time-frequency grid as illustrated in FIG. 2 where each resource element corresponds to one OFDM subcarrier during one OFDM symbol interval.

Furthermore, the resource allocation in LTE is typically described in terms of resource blocks (RBs), where a resource block corresponds to one slot (0.5 ms) in the time domain and 12 contiguous subcarriers in the frequency domain. Resource blocks are numbered in the frequency domain, starting with 0 from one end of the system bandwidth.

Similarly, the LTE uplink resource grid is illustrated in FIG. 3, where $N_{RB}^{UL}$ is the number of RBs contained in the uplink system bandwidth, $N_{sc}^{RB}$ is the number subcarriers in each RB, typically $N_{sc}^{RB}=12$, $N_{symb}^{UL}$ is the number of SC-OFDM symbols in each slot. $N_{symb}^{UL}=7$ for normal cyclic prefix (CP) and $N_{symb}^{UL}=6$ for extended CP. A subcarrier and a SC-OFDM symbol form an uplink resource element (RE).

Downlink data transmissions from a base station to a wireless device are dynamically scheduled, i.e., in each subframe the base station transmits control information about which terminal's data is transmitted and upon which resource blocks the data is transmitted, in the current downlink subframe. This control signaling is typically transmitted in the first 1, 2, 3 or 4 OFDM symbols in each subframe. A downlink system with 3 OFDM symbols as control is illustrated in FIG. 4.

Similar to downlink, uplink transmissions from a wireless device to a base station are also dynamically scheduled through the downlink control channel. When a wireless device receives an uplink grant in subframe n, it transmits data in the uplink at subframe n+k, where k=4 for Frequency Division Duplex (FDD) system and k varies for TDD systems.

In LTE, a number of physical channels are supported for data transmissions.

A downlink or an uplink physical channel corresponds to a set of resource elements carrying information originating from higher layers while a downlink or an uplink physical signal is used by the physical layer but does not carry information originating from higher layers. Some of the downlink physical channels and signals supported in LTE are:
  Physical Downlink Shared Channel (PDSCH)
  Physical Downlink Control Channel (PDCCH)
  Enhanced Physical Downlink Control Channel (EPDCCH)
  Reference signals:
    Cell Specific Reference Signals (CRS)
    Demodulation Reference Signal for PDSCH
    Channel State Information Reference Signals (CSI-RS)

PDSCH is used mainly for carrying user traffic data and higher layer messages in the downlink and is transmitted in a downlink (DL) subframe outside of the control region as shown in FIG. 4. Both PDCCH and EPDCCH are used to carry Downlink Control Information (DCI) such as PRB allocation, modulation level and coding scheme (MCS), precoder used at the transmitter, and etc. PDCCH is transmitted in the first one to four OFDM symbols in a downlink (DL) subframe, i.e. the control region, while EPDCCH is transmitted in the same region as PDSCH.

Some of the uplink physical channels and signals supported in LTE are:
  Physical Uplink Shared Channel (PUSCH)
  Physical Uplink Control Channel (PUCCH)
  Demodulation Reference Signal (DMRS) for PUSCH
  Demodulation Reference Signal (DMRS) for PUCCH The PUSCH is used to carry uplink data from the wireless device to the base station. The PUCCH is used to carry uplink control information from the wireless device to the base station.

Multi-Antenna Techniques in Uplink

Multi-antenna techniques can significantly increase the data rates and reliability of a wireless communication system. The performance is in particular improved if both the transmitter and the receiver are equipped with multiple antennas, which results in a multiple-input multiple-output (MIMO) communication channel. Such systems and/or related techniques are commonly referred to as MIMO.

A core component in LTE is the support of MIMO antenna deployments and MIMO related techniques. Currently, uplink spatial multiplexing mode for 2 and 4 transmitter (Tx) antenna ports is supported in LTE. The spatial multiplexing mode is aimed for high data rates in favorable channel conditions. An illustration of the spatial multiplexing operation is provided in FIG. 5.

As seen in FIG. 5, the information carrying symbol vector $s=[s_1, s_2, \ldots, s_r]$ to be transmitted at a particular RE is first multiplied by an $N_r \times r$ precoder matrix W, which serves to distribute the symbols to NT antenna ports. The precoder matrix is selected from a codebook of possible precoder matrices, and typically indicated by means of a Transmitted Precoding Matrix Indicator (TPMI), which specifies a unique precoder matrix in the codebook for a given number of transmit antennas, $N_T$, and number of MIMO layers, r. r is also referred to as the transmission rank. The number of MIMO layers is determined by the underlying channel. Each of the r symbols in s is associated with a MIMO layer. In this way, spatial multiplexing is achieved since multiple symbols can be transmitted simultaneously over the same time/frequency resource element (RE).

UL DMRS for PUSCH

DMRS for PUSCH is used for PUSCH demodulations. More specifically, the DMRS is used by the network node or base station (such as an eNB) for uplink channel estimation in the resource blocks (RBs) scheduled for the associated PUSCH. DeModulation Reference Signal (DMRS) is time multiplexed with associated PUSCH and occupies the same RBs as the PUSCH. The DMRS is transmitted on the REs of the $3^{rd}$ SC-OFDM symbol of each slot of a subframe as shown in FIG. 6, where only one RB is shown. It can be seen that DMRS occupies all the subcarriers in the $3^{rd}$ symbol of each slot.

SUMMARY

Some embodiments advantageously provide a method, wireless device, and network node for using a reference signal sequence at a predetermined power level.

According to one aspect of the disclosure, a method of transmitting demodulation reference signals (DMRS) over one, three or five resource blocks (RBs) with Interleaved Frequency Division Multiple Access (IFDMA) from a wireless device to a wireless network node 48 in a wireless network wherein Single Carrier Frequency Division Multiple Access (SC-OFDMA) is deployed in uplink is provided. At least one of: a set of base sequences including thirty quadrature phase shifting keying, QPSK, sequences of length 6, 18 or 30 is provided; a demodulation reference signal sequence is derived from the determined set of base sequences; the demodulation reference signal sequence is multiplexed with PUSCH; and the multiplexed demodulation reference signal sequence is transmitted to the wireless network node 48 by the wireless device.

According to one embodiment of this aspect, the set of thirty base sequences is given by:

$$\bar{r}_{u,v}(n)=e^{j\varphi(n)\pi/4}, 0\le n\le M_{sc}^{RS}-1; M_{sc}^{RS}\in\{6,18,30\};$$
$$v=,0 u=0,1,\ldots,29.$$

According to one embodiment of this aspect, $\varphi(n)$ is given in the tables below:

| $\varphi(n)$ for $M_{sc}^{RS} = 6$. | | | | | | |
|---|---|---|---|---|---|---|
| u | $\varphi(0), \varphi(1), \ldots, \varphi(5)$ | | | | | |
| 0 | -1 | -3 | 3 | -3 | 3 | -3 |
| 1 | -1 | 3 | -1 | 1 | 1 | 1 |
| 2 | 3 | -1 | -3 | -3 | 1 | 3 |
| 3 | 3 | -1 | -1 | 1 | -1 | -1 |
| 4 | -1 | -1 | -3 | 1 | -3 | -1 |
| 5 | 1 | 3 | -3 | -1 | -3 | 3 |
| 6 | -3 | 3 | -1 | -1 | 1 | -3 |
| 7 | -1 | -3 | -3 | 1 | 3 | 3 |
| 8 | 3 | -1 | -1 | 3 | 1 | 3 |
| 9 | 3 | -3 | 3 | 1 | -1 | 1 |
| 10 | -3 | 1 | -3 | -3 | -3 | -3 |
| 11 | -3 | -3 | -3 | 1 | -3 | -3 |
| 12 | 3 | -3 | 1 | -1 | -3 | -3 |
| 13 | 3 | -3 | 3 | -1 | -1 | -3 |
| 14 | 3 | -1 | 1 | 3 | 3 | 1 |
| 15 | -1 | 1 | -1 | -3 | 1 | 1 |
| 16 | -3 | -1 | -3 | -1 | 3 | 3 |

-continued

| $\varphi(n)$ for $M_{sc}^{RS} = 6$. | | | | | | |
|---|---|---|---|---|---|---|
| u | $\varphi(0), \varphi(1), \ldots, \varphi(5)$ | | | | | |
| 17 | 1 | -1 | 3 | -3 | 3 | 3 |
| 18 | 1 | 3 | 1 | 1 | -3 | 3 |
| 19 | -1 | -3 | -1 | -1 | 3 | -3 |
| 20 | 3 | -1 | -3 | -1 | -1 | -3 |
| 21 | 3 | 1 | 3 | -3 | -3 | 1 |
| 22 | 1 | 3 | -1 | -1 | 1 | -1 |
| 23 | -3 | 1 | -3 | 3 | 3 | 3 |
| 24 | 1 | 3 | -3 | 3 | -3 | 3 |
| 25 | -1 | -1 | 1 | -3 | 1 | -1 |
| 26 | 1 | -3 | -1 | -1 | 3 | 1 |
| 27 | -3 | -1 | -1 | 3 | 1 | 1 |
| 28 | -1 | 3 | -3 | -3 | -3 | 3 |
| 29 | 3 | 1 | -1 | 1 | 3 | 1 |

According to one embodiment of this aspect, the multiplexing is performed in a time domain, the DMRS and the user data being transmitted in different SC-FDMA symbols.

According to another aspect of the disclosure, a method in a network node for receiving demodulation reference signals (DMRS) over one, three or five resource blocks (RBs) with Interleaved Frequency Division Multiple Access (IFDMA) in a wireless network wherein Single Carrier Frequency Division Multiple Access (SC-OFDMA) is deployed in an uplink is provided. An indication of using IFDMA for DMRS transmission is signaled to the wireless device. A demodulation reference signal is received by the wireless network node from the wireless device. The indication of using IFDMA for DMRS transmission is used in the receiving. A demodulation reference signal sequence is derived from a set of base sequences. Channel estimation is performed based on the received demodulation reference signal, based on the derived demodulation reference signal sequence and based on the indication of using IFDMA for DMRS transmission.

According to one embodiment of this aspect, the set of thirty base sequences is given by: $\bar{r}_{u,v}(n)=e^{j\varphi(n)\pi/4}$, $0\le n\le M_{sc}^{RS}-1$, $M_{sc}^{RS}\in\{6,18,30\}$; $v=0, u=0, 1, \ldots, 29$.

According to one embodiment of this aspect, $\varphi(n)$ is given in the tables below:

| $\varphi(n)$ for $M_{sc}^{RS} = 6$. | | | | | | |
|---|---|---|---|---|---|---|
| u | $\varphi(0), \varphi(1), \ldots, \varphi(5)$ | | | | | |
| 0 | -1 | -3 | 3 | -3 | 3 | -3 |
| 1 | -1 | 3 | -1 | 1 | 1 | 1 |
| 2 | 3 | -1 | -3 | -3 | 1 | 3 |
| 3 | 3 | -1 | -1 | 1 | -1 | -1 |
| 4 | -1 | -1 | -3 | 1 | -3 | -1 |
| 5 | 1 | 3 | -3 | -1 | -3 | 3 |
| 6 | -3 | 3 | -1 | -1 | 1 | -3 |
| 7 | -1 | -3 | -3 | 1 | 3 | 3 |
| 8 | 3 | -1 | -1 | 3 | 1 | 3 |
| 9 | 3 | -3 | 3 | 1 | -1 | 1 |
| 10 | -3 | 1 | -3 | -3 | -3 | -3 |
| 11 | -3 | -3 | -3 | 1 | -3 | -3 |
| 12 | 3 | -3 | 1 | -1 | -3 | -3 |
| 13 | 3 | -3 | 3 | -1 | -1 | -3 |
| 14 | 3 | -1 | 1 | 3 | 3 | 1 |
| 15 | -1 | 1 | -1 | -3 | 1 | 1 |
| 16 | -3 | -1 | -3 | -1 | 3 | 3 |
| 17 | 1 | -1 | 3 | -3 | 3 | 3 |
| 18 | 1 | 3 | 1 | 1 | -3 | 3 |
| 19 | -1 | -3 | -1 | -1 | 3 | -3 |
| 20 | 3 | -1 | -3 | -1 | -1 | -3 |
| 21 | 3 | 1 | 3 | -3 | -3 | 1 |
| 22 | 1 | 3 | -1 | -1 | 1 | -1 |

-continued

φ(n) for $M_{sc}^{RS} = 6$.

| u | φ(0), φ(1), ..., φ(5) | | | | | |
|---|---|---|---|---|---|---|
| 23 | −3 | 1 | −3 | 3 | 3 | 3 |
| 24 | 1 | 3 | −3 | 3 | −3 | 3 |
| 25 | −1 | −1 | 1 | −3 | 1 | −1 |
| 26 | 1 | −3 | −1 | −1 | 3 | 1 |
| 27 | −3 | −1 | −1 | 3 | 1 | 1 |
| 28 | −1 | 3 | −3 | −3 | −3 | 3 |
| 29 | 3 | 1 | −1 | 1 | 3 | 1 |

According to one aspect of the disclosure, a method in a wireless device for transmitting demodulation reference signals (DMRS) over one, three or five resource blocks (RBs) with interleaved Frequency Division Multiple Access (IFDMA) in a wireless network wherein Single Carrier Frequency Division Multiple Access (SC-OFDMA) is deployed in an uplink is provided. An indication of using IFDMA for DMRS transmission is received from the network node. A set of base sequences is determined. The set of base sequences includes thirty quadrature phase shift keying. QPSK, sequences of length 6, 18 or 30. A demodulation reference signal sequence is derived from the set of base sequences. The demodulation reference signal sequence is time multiplexed in single carrier-orthogonal frequency division multiplexing, SC-OFDM, symbols. The multiplexed signal is transmitted by a wireless device to the wireless network node.

According to one embodiment of this aspect, the set of thirty base sequences is given by $\bar{r}_{u,v}(n) = e^{j\varphi(n)\pi/4}$, $0 \leq n \leq M_{sc}^{RS}-1$, $M_{sc}^{RS} = 6, 18, 30$; v=0, u=0, 1, ..., 29.

According to one embodiment of this aspect, φ(n) is given in the tables below:

φ(n) for $M_{sc}^{RS} = 6$.

| u | φ(0), φ(1), ..., φ(5) | | | | | |
|---|---|---|---|---|---|---|
| 0 | −1 | −3 | 3 | −3 | 3 | −3 |
| 1 | −1 | 3 | −1 | 1 | 1 | 1 |
| 2 | 3 | −1 | −3 | −3 | 1 | 3 |
| 3 | 3 | −1 | −1 | 1 | −1 | −1 |
| 4 | −1 | −1 | −3 | 1 | −3 | −1 |
| 5 | 1 | 3 | −3 | −1 | −3 | 3 |
| 6 | −3 | 3 | −1 | −1 | 1 | −3 |
| 7 | −1 | −3 | −3 | 1 | 3 | 3 |
| 8 | 3 | −1 | −1 | 3 | 1 | 3 |
| 9 | 3 | −3 | 3 | 1 | −1 | 1 |
| 10 | −3 | 1 | −3 | −3 | −3 | −3 |
| 11 | −3 | −3 | −3 | 1 | −3 | −3 |
| 12 | 3 | −3 | 1 | −1 | −3 | −3 |
| 13 | 3 | −3 | 3 | −1 | −1 | −3 |
| 14 | 3 | −1 | 1 | 3 | 3 | 1 |
| 15 | −1 | 1 | −1 | −3 | 1 | 1 |
| 16 | −3 | −1 | −3 | −1 | 3 | 3 |
| 17 | 1 | −1 | 3 | −3 | 3 | 3 |
| 18 | 1 | 3 | 1 | 1 | −3 | 3 |
| 19 | −1 | −3 | −1 | 1 | 3 | −3 |
| 20 | 3 | −1 | −3 | −1 | −1 | −3 |
| 21 | 3 | 1 | 3 | −3 | −3 | 1 |
| 22 | 1 | 3 | −1 | −1 | 1 | −1 |
| 23 | −3 | 1 | −3 | 3 | 3 | 3 |
| 24 | 1 | 3 | −3 | 3 | −3 | 3 |
| 25 | −1 | −1 | 1 | −3 | 1 | −1 |
| 26 | 1 | −3 | −1 | −1 | 3 | 1 |
| 27 | −3 | −1 | −1 | 3 | 1 | 1 |
| 28 | −1 | 3 | −3 | −3 | −3 | 3 |
| 29 | 3 | 1 | −1 | 1 | 3 | 1 |

According to one embodiment of this aspect, the deriving of the demodulation reference signal sequence from the set of base sequences includes decimating the set of base sequences comprises applying a cyclic shift to the base sequences and an orthogonal cover code.

According to another aspect of the disclosure, a method of switching between reference signal sequences to one of enhance multiplexing capacity or reduce required sequence transmission power is provided. An indication is received. A reference signal type is selected from one of a first or a second reference signal sequence type, based on the indication. A reference signal having the selected reference signal type is transmitted.

According to one embodiment of this aspect, the first reference signal type comprises reference signals sequences that are transmitted on a first subset of a set of subcarriers and that are orthogonal to a second reference signal transmitted on the set of subcarriers, and the second reference signal type comprises reference signals sequences that are transmitted on the first subset of a set of subcarriers and have a lower required transmission power metric than the first reference signal type.

According to one embodiment of this aspect, the transmission power metric is a cubic metric. CM, that is in units of decibels and is given by:

$$CM = \frac{20\log_{10}\{rms[v_{norm}^3(t)]\} - 1.52}{1.56} \text{ dB},$$

where $$rms(x) = \sqrt{\frac{(x'x)}{N}}, \quad v_{norm}(t) = \frac{|v(t)|}{rms[v(t)]},$$

and v(t) is the value of the first or second reference signal type at time t.

According to one embodiment of this aspect, the reference signal is a Demodulation Reference Signal, DMRS, signal. According to one embodiment of this aspect, the indication is at least one value in a downlink control field that corresponds to one of the first or the second reference signal sequence type. According to one embodiment of this aspect, the indication is at least one value in a downlink control field that indicates a parameter for transmission in an uplink channel, the reference signal type being selected based on whether the parameter meets a criterion. According to one embodiment of this aspect, the criterion includes one taken from the parameter corresponds to an odd number of resource blocks, the parameter corresponds to an even number resources blocks, the parameter is greater than a predefined number of resource blocks. According to one embodiment of this aspect, the first reference signal sequence type is a decimated signal type. According to one embodiment of this aspect, the indication is at least one value in a downlink control indictor (DCI) field.

According to another aspect of the disclosure, a wireless device configured to switch between reference signal sequences to one of enhance multiplexing capacity or reduce required sequence transmission power is provided. The wireless device includes a communications interface configured to: receive an indication selecting a reference signal type from one of a first or a second reference signal sequence type, and processing circuitry configured to determine a reference signal based on the selected reference signal type indicated in the indication. The communications interface further configured to transmit the determined reference signal having the selected reference signal type indicated in the indication.

According to one embodiment of this aspect, the first reference signal type comprises reference signals sequences that are transmitted on a first subset of a set of subcarriers and that are orthogonal to a second reference signal transmitted on the set of subcarriers, and the second reference signal type comprises reference signals sequences that are transmitted on the first subset of a set of subcarriers and have a lower required transmission power metric than the first reference signal type.

According to one embodiment of this aspect, the reference signal type is a Demodulation Reference Signal, DMRS, signal type. According to one embodiment of this aspect, the indication is at least one value in a downlink control field that corresponds to one of the first or the second reference signal type. According to one embodiment of this aspect, the indication is at least one value in a downlink control field that indicates a parameter for transmission in an uplink channel, the reference signal type being selected based on whether the parameter meets a criterion. According to one embodiment of this aspect, the criterion includes one taken from the parameter corresponds to an odd number of resource blocks, the parameter corresponds to an even number resources blocks, the parameter is greater than a predefined number of resource blocks. According to one embodiment of this aspect, the first reference signal type is a decimated signal type. The indication is at least one value in a downlink control indictor (DCI) field.

According to another aspect of the disclosure, a wireless device configured to designate a reference signal sequence at a reduced power level is provided. The wireless device includes a memory module configured to store first signal sequences and second signal sequences, and a signal identification module configured to: identify a first set of signal sequences from the stored first signal sequences having at least one of a peak to average power ratio, PAPR, and cubic metric, CM, below a corresponding threshold value, and identify a second set of signal sequences from the stored second signal sequences by iteratively eliminating sequences of the first set of signal sequences having the highest cross correlation magnitude statistics, the second set being a subset of the first set, and designate the second set of signal sequences as the reference signal sequence.

According to another aspect of the disclosure, a wireless device configured to multiplex reference signals occupying different numbers of subcarriers is provided. The wireless device includes processing circuitry configured to: determine a first reference signal sequence with length L. and a communications interface configured to: transmit a subset of the first reference signal sequence on a first subset of a set of L subcarriers and transmit zero magnitude signals on subcarriers that are not in the first subset of subcarriers.

According to another aspect of the disclosure, a wireless device for transmitting demodulation reference signals (DMRS) over one, three or five resource blocks (RBs) with Interleaved Frequency Division Multiple Access (IFDMA) to a wireless network node in a wireless network wherein Single Carrier Frequency Division Multiple Access (SC-OFDMA) is deployed in uplink is provided. The wireless device includes processing circuitry configured to at least one of: determine a set of base sequences comprising thirty quadrature phase shifting keying, QPSK, sequences of length 6, 18 or 30; derive a demodulation reference signal sequence from the determined set of base sequences; multiplex the demodulation reference signal sequence; and transmit the multiplexed demodulation reference signal sequence to the wireless network node.

According to one embodiment of this aspect, the set of thirty base sequences is given by:

$$\bar{r}_{u,v}(n)=e^{j\varphi(n)\pi/4}, 0 \leq n \leq M_{sc}^{RS}-1; M_{sc}^{RS}\{6,18,30\};$$
$$v=, 0 u=0,1,\ldots,29.$$

According to one embodiment of this aspect, $\varphi(n)$ is given in the tables

| $\varphi(n)$ for $M_{sc}^{RS} = 6$. | | |
|---|---|---|
| u | $\varphi(0), \varphi(1), \ldots, \varphi(5)$ | |
| 0 | −1  −3  3  −3  3  −3 | |
| 1 | −1  3  −1  1  1  1 | |
| 2 | 3  −1  −3  −3  1  3 | |
| 3 | 3  −1  −1  1  −1  −1 | |
| 4 | −1  −1  −3  1  −3  −1 | |
| 5 | 1  3  −3  −1  −3  3 | |
| 6 | −3  3  −1  −1  1  −3 | |
| 7 | −1  −3  −3  1  3  3 | |
| 8 | 3  −1  −1  3  1  3 | |
| 9 | 3  −3  3  1  −1  1 | |
| 10 | −3  1  −3  −3  −3  −3 | |
| 11 | −3  −3  −3  1  −3  −3 | |
| 12 | 3  −3  1  −1  −3  −3 | |
| 13 | 3  −3  3  −1  −1  −3 | |
| 14 | 3  −1  1  3  3  1 | |
| 15 | −1  1  −1  −3  1  1 | |
| 16 | −3  −1  −3  −1  3  3 | |
| 17 | 1  −1  3  −3  3  3 | |
| 18 | 1  3  1  1  −3  3 | |
| 19 | −1  −3  −1  −1  3  −3 | |
| 20 | 3  −1  −3  −1  −1  −3 | |
| 21 | 3  1  3  −3  −3  1 | |
| 22 | 1  3  −1  −1  1  −1 | |
| 23 | −3  1  −3  3  3  3 | |
| 24 | 1  3  −3  3  −3  3 | |
| 25 | −1  −1  1  −3  1  −1 | |
| 26 | 1  −3  −1  −1  3  1 | |
| 27 | −3  −1  −1  3  1  1 | |
| 28 | −1  3  −3  −3  −3  3 | |
| 29 | 3  1  −1  1  3  1 | |

According to one embodiment of this aspect, the multiplexing is performed in a time domain, the DMRS being transmitted in different SC-FDMA symbols.

According to another aspect of the disclosure, a network node for receiving demodulation reference signals (DMRS) over one, three or five resource blocks (RBs) with Interleaved Frequency Division Multiple Access (IFDMA) in a wireless network wherein Single Carrier Frequency Division Multiple Access (SC-OFDMA) is deployed in an uplink is provided. The network node includes processing circuitry configured to: signal, to the wireless device, an indication of using IFDMA for DMRS transmission; receive a demodulation reference signal from the wireless device, the indication of using IFDMA for DMRS transmission being used in the receiving: derive a demodulation reference signal sequence from a set of base sequences; and perform channel estimation based on the received demodulation reference signal, based on the derived demodulation reference signal sequence and based on the indication of using IFDMA for DMRS transmission.

According to one embodiment of this aspect, the set of thirty base sequences is given by:

$$\bar{r}_{u,v}(n)=e^{j\varphi(n)\pi/4}, 0 \leq n \leq M_{sc}^{RS}-1; M_{sc}^{RS} \in \{6,18,30\};$$
$$v=, 0 u=0,1 \ldots ,29.$$

According to one embodiment of this aspect, $\varphi(n)$ is given in the tables below:

| $\varphi(n)$ for $M_{sc}^{RS} = 6$. | | | | | | |
|---|---|---|---|---|---|---|
| u | $\varphi(0), \varphi(1), \ldots, \varphi(5)$ | | | | | |
| 0 | −1 | −3 | 3 | −3 | 3 | −3 |
| 1 | −1 | 3 | −1 | 1 | 1 | 1 |
| 2 | 3 | −1 | −3 | −3 | 1 | 3 |
| 3 | 3 | −1 | −1 | 1 | −1 | −1 |
| 4 | −1 | −1 | −3 | 1 | −3 | −1 |
| 5 | 1 | 3 | −3 | −1 | −3 | 3 |
| 6 | −3 | 3 | −1 | −1 | 1 | −3 |
| 7 | −1 | −3 | −3 | 1 | 3 | 3 |
| 8 | 3 | −1 | −1 | 3 | 1 | 3 |
| 9 | 3 | −3 | 3 | 1 | −1 | 1 |
| 10 | −3 | 1 | −3 | −3 | −3 | −3 |
| 11 | −3 | −3 | −3 | 1 | −3 | −3 |
| 12 | 3 | −3 | 1 | −1 | −3 | −3 |
| 13 | 3 | −3 | 3 | −1 | −1 | −3 |
| 14 | 3 | −1 | 1 | 3 | 3 | 1 |
| 15 | −1 | 1 | −1 | −3 | 1 | 1 |
| 16 | −3 | −1 | −3 | −1 | 3 | 3 |
| 17 | 1 | −1 | 3 | −3 | 3 | 3 |
| 18 | 1 | 3 | 1 | 1 | −3 | 3 |
| 19 | −1 | −3 | −1 | −1 | 3 | −3 |
| 20 | 3 | −1 | −3 | −1 | −1 | −3 |
| 21 | 3 | 1 | 3 | −3 | −3 | 1 |
| 22 | 1 | 3 | −1 | −1 | 1 | −1 |
| 23 | −3 | 1 | −3 | 3 | 3 | 3 |
| 24 | 1 | 3 | −3 | 3 | −3 | 3 |
| 25 | −1 | −1 | 1 | −3 | 1 | −1 |
| 26 | 1 | −3 | −1 | −1 | 3 | 1 |
| 27 | −3 | −1 | −1 | 3 | 1 | 1 |
| 28 | −1 | 3 | −3 | −3 | −3 | 3 |
| 29 | 3 | 1 | −1 | 1 | 3 | 1 |

According to another aspect of the disclosure, a wireless device for transmitting demodulation reference signals (DMRS) over one, three or five resource blocks (RBs) with interleaved Frequency Division Multiple Access (IFDMA) in a wireless network wherein Single Carrier Frequency Division Multiple Access (SC-OFDMA) is deployed in an uplink is provided. The wireless device includes processing circuitry configured to: receive, from the network node, an indication of using IFDMA for DMRS transmission; determine a set of base sequences, the set of base sequences comprising thirty quadrature phase shift keying, QPSK, sequences of length 6, 18 or 30; derive a demodulation reference signal sequence from the set of base sequences; time multiplex the demodulation reference signal sequence in single carrier-orthogonal frequency division multiplexing, SC-OFDM, symbols; and transmit the multiplexed signal to the wireless network node.

According to one embodiment of this aspect, the set of thirty base sequences is given by $$\bar{r}_{u,v}(n) = e^{j\varphi(n)\pi/4}, 0 \leq n \leq M_{sc}^{RS}-1, M_{sc}^{RS} \in \{6,18,30\};$$
$$v=0, u=0,1,\ldots,29.$$

According to one embodiment of this aspect, $\varphi(n)$ is given in the tables below:

| $\varphi(n)$ for $M_{sc}^{RS} = 6$. | | | | | | |
|---|---|---|---|---|---|---|
| u | $\varphi(0), \varphi(1), \ldots, \varphi(5)$ | | | | | |
| 0 | −1 | −3 | 3 | −3 | 3 | −3 |
| 1 | −1 | 3 | −1 | 1 | 1 | 1 |
| 2 | 3 | −1 | −3 | −3 | 1 | 3 |
| 3 | 3 | −1 | −1 | 1 | −1 | −1 |
| 4 | −1 | −1 | −3 | 1 | −3 | −1 |
| 5 | 1 | 3 | −3 | −1 | −3 | 3 |
| 6 | −3 | 3 | −1 | −1 | 1 | −3 |
| 7 | −1 | −3 | −3 | 1 | 3 | 3 |
| 8 | 3 | −1 | −1 | 3 | 1 | 3 |

| $\varphi(n)$ for $M_{sc}^{RS} = 6$. | | | | | | |
|---|---|---|---|---|---|---|
| u | $\varphi(0), \varphi(1), \ldots, \varphi(5)$ | | | | | |
| 9 | 3 | −3 | 3 | 1 | −1 | 1 |
| 10 | −3 | 1 | −3 | −3 | −3 | −3 |
| 11 | −3 | −3 | −3 | 1 | −3 | −3 |
| 12 | 3 | −3 | 1 | −1 | −3 | −3 |
| 13 | 3 | −3 | 3 | −1 | −1 | −3 |
| 14 | 3 | −1 | 1 | 3 | 3 | 1 |
| 15 | −1 | 1 | −1 | −3 | 1 | 1 |
| 16 | −3 | −1 | −3 | −1 | 3 | 3 |
| 17 | 1 | −1 | 3 | −3 | 3 | 3 |
| 18 | 1 | 3 | 1 | 1 | −3 | 3 |
| 19 | −1 | −3 | −1 | −1 | 3 | −3 |
| 20 | 3 | −1 | −3 | −1 | −1 | −3 |
| 21 | 3 | 1 | 3 | −3 | −3 | 1 |
| 22 | 1 | 3 | −1 | −1 | 1 | −1 |
| 23 | −3 | 1 | −3 | 3 | 3 | 3 |
| 24 | 1 | 3 | −3 | 3 | −3 | 3 |
| 25 | −1 | −1 | 1 | −3 | 1 | −1 |
| 26 | 1 | −3 | −1 | −1 | 3 | 1 |
| 27 | −3 | −1 | −1 | 3 | 1 | 1 |
| 28 | −1 | 3 | −3 | −3 | −3 | 3 |
| 29 | 3 | 1 | −1 | 1 | 3 | 1 |

According to one embodiment of this aspect, the deriving of the demodulation reference signal sequence from the set of base sequences includes decimating the set of base sequences comprises applying a cyclic shift to the base sequences and an orthogonal cover code.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

The following are the main design goals for uplink DMRS:
- Constant amplitude over transmitted subcarriers for uniform channel excitation and estimation;
- Low peak to average power ratio (PAPR) or cubic metric (CM) in time domain for efficient Power Amplifier (PA) utilization; and
- Low cross correlation between different DMRS sequences for low inter-cell interference where different sequences are used in different cells.

The above goals were achieved in LTE by using a combination of computer generated (CG) highly optimized base sequences for 1 RB and 2 RBs and cyclically extended Zadoff-Chu sequences for 3 RBs or larger.

Figure 1:
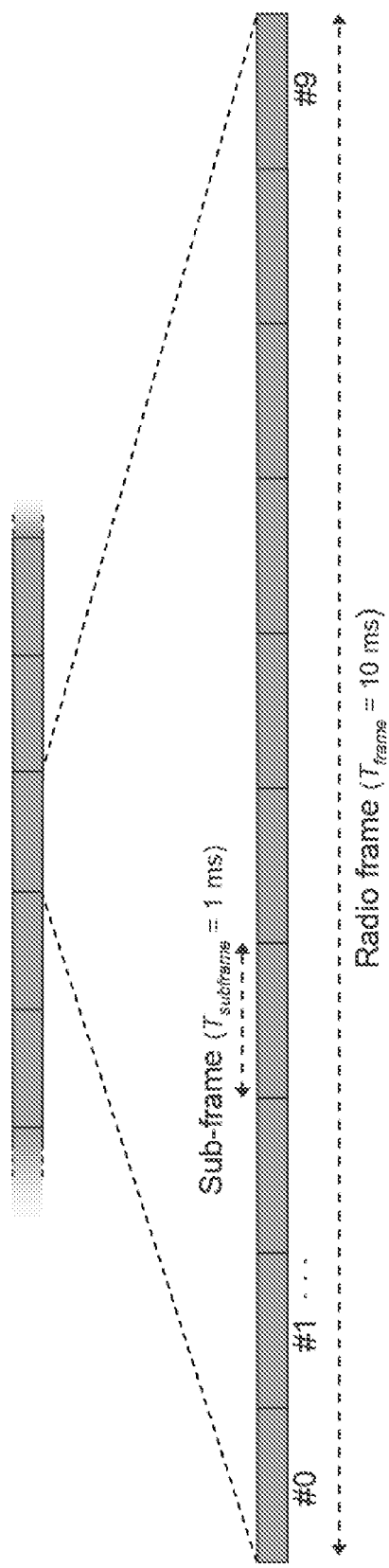
FIG. 1 illustrates an LTE time domain structure.
Figure 2:
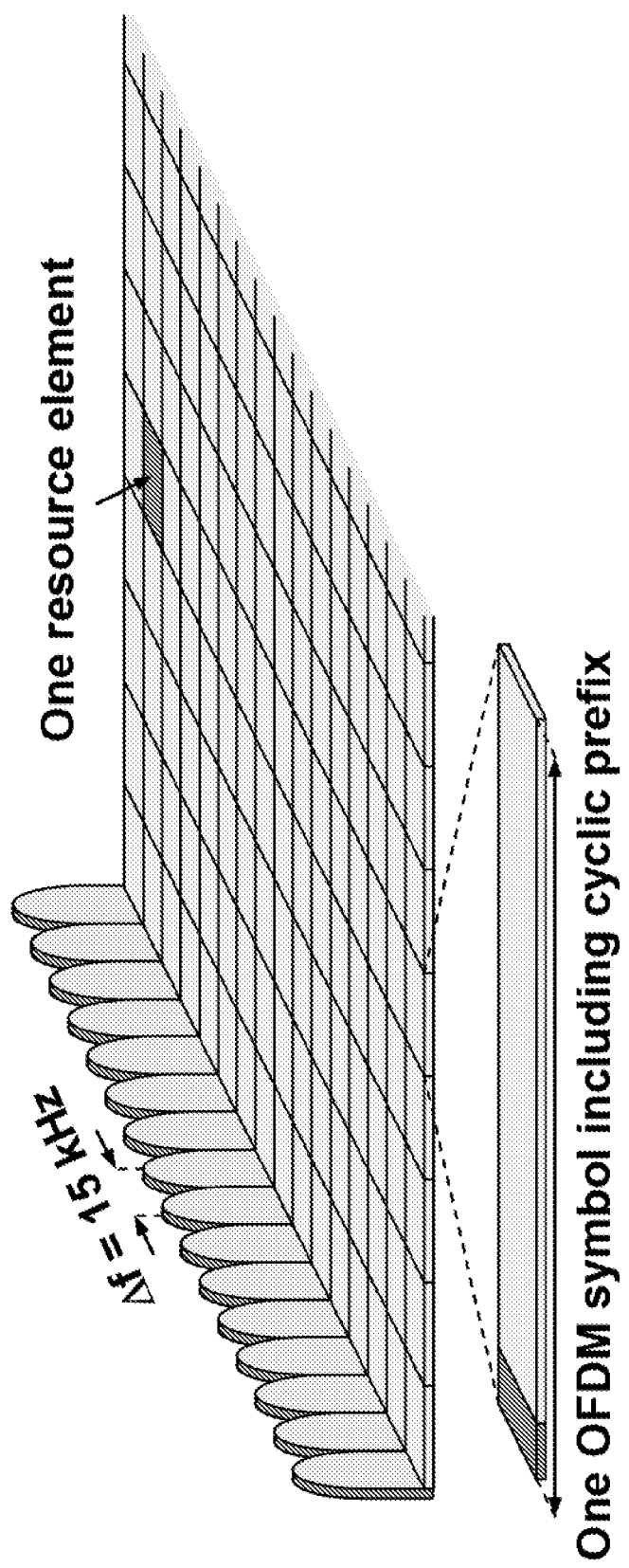
FIG. 2 is a time-frequency grid illustrating a basic LTE downlink physical resource.
Figure 3:
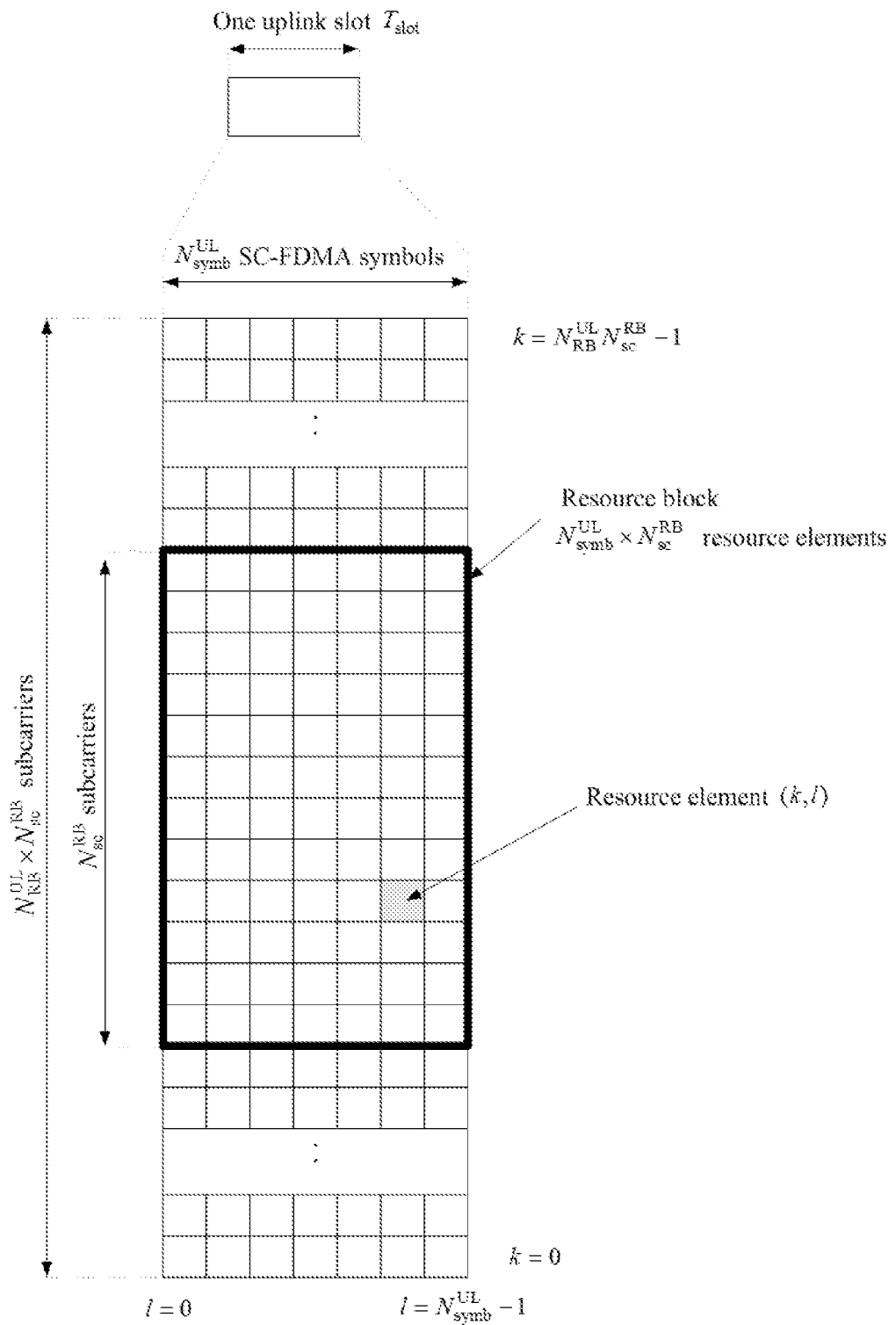
FIG. 3 illustrates an LTE uplink resource grid.
Figure 4:
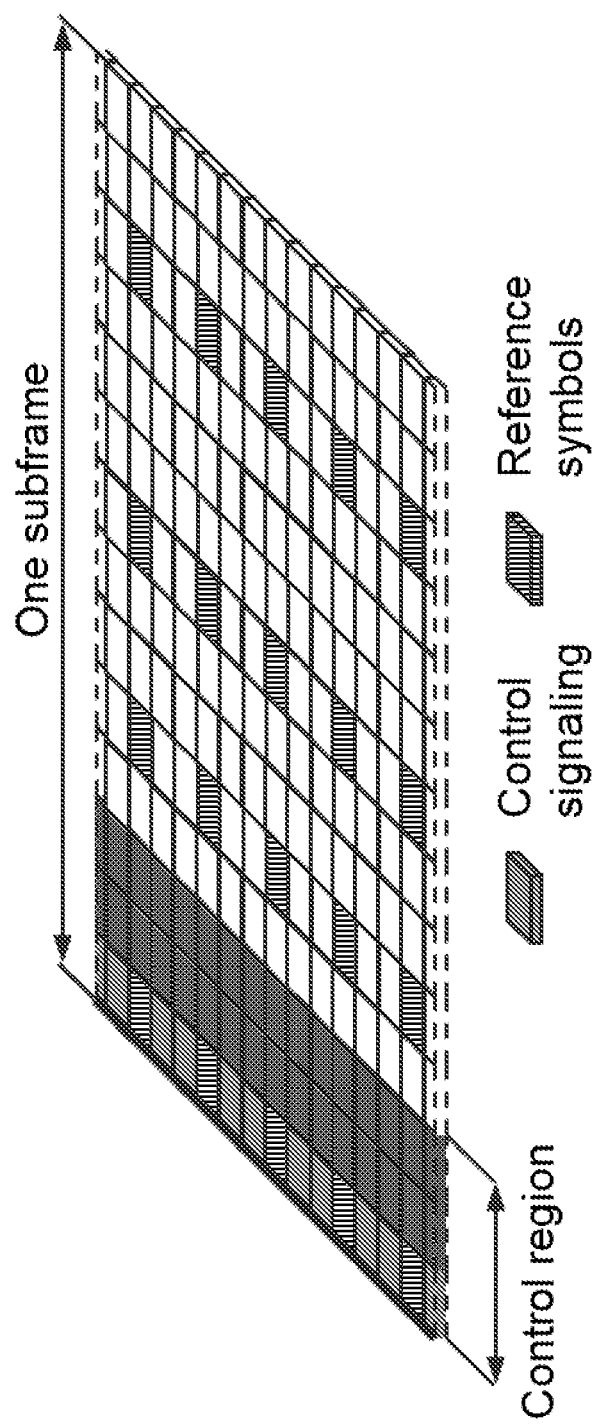
FIG. 4 illustrates a downlink subframe with 3 OFDM symbols as control.
Figure 5:
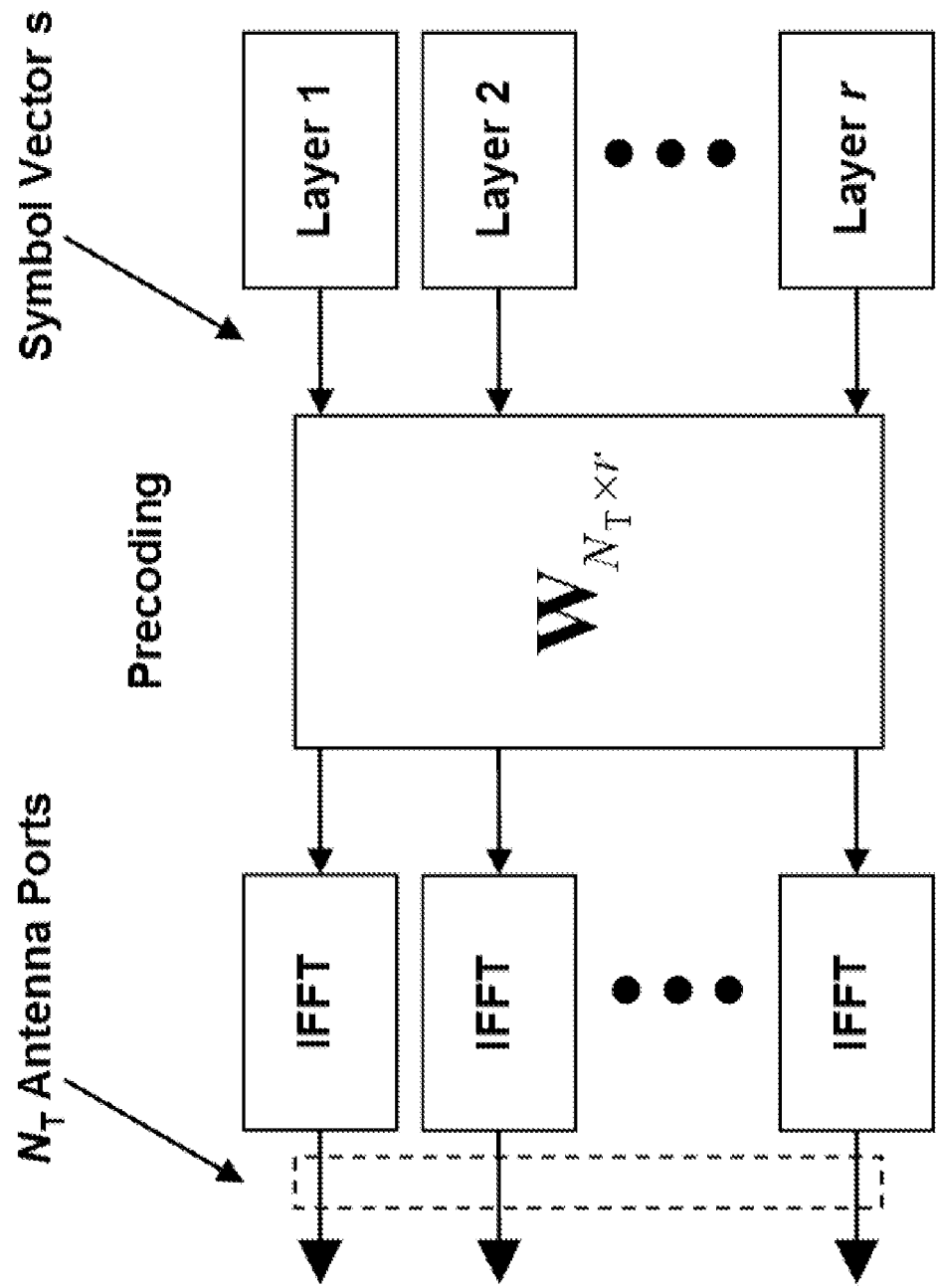
FIG. 5 illustrates a transmission structure of precoded spatial multiplexing mode in LTE.
Figure 6:
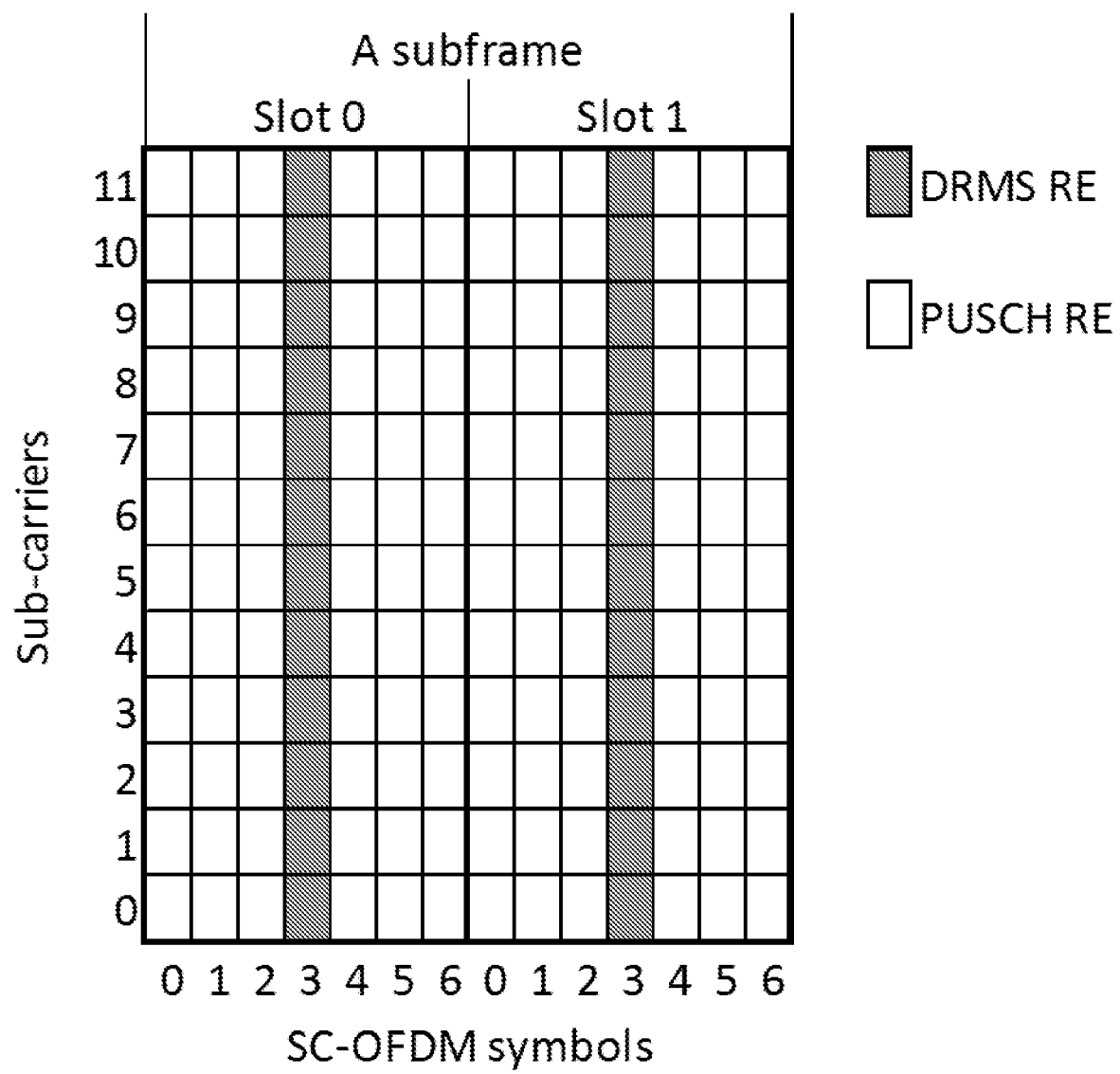
FIG. 6 illustrates DMRS allocation in a RB of a subframe.

For example, let $r_{PUSCH}^{(\lambda)}(\cdot)$ be the DMRS sequence associated with an uplink MIMO layer $\lambda$, then the DMRS sequence in LTE is defined as:

$$r_{PUSCH}^{(\lambda)}(m_s \cdot M_{sc}^{RS}+n)=w^{(\lambda)}(m_s)r_{u,v}^{(\alpha\alpha_\lambda)}(n) \quad (1)$$

where $m_s=0, 1$ corresponding to, respectively, slot 0 and slot 1 as shown in FIG. 6. $n=0, \ldots, M_{sc}^{RS}-1$ and $M_{sc}^{RS}=M_{sc}^{PUSCH}$ is the number of subcarriers of the RBs scheduled for the associated PUSCH. $w^{(\lambda)}$ is an orthogonal cover code and can be configured with $[w^{(\lambda)}(0)w^{(\lambda)}(1)]=[1\ 1]$, or $[1\ -1]$ according to Table 4 below. $\alpha^\lambda$ is a cyclic shift configured for a MIMO layer 1.

The cyclic shift $\alpha_\lambda$ in a slot $n_s$ ($n_s \in \{0, 1, \ldots, 9\}$) is given as $\alpha_\lambda=2\pi n_{cs,\lambda}/12$ with:

$$n_{cs,\lambda}=(n_{DMRS}^{(1)}+n_{DMRS\lambda}^{(2)}+n_{PN}(n_s))\bmod 12 \quad (2)$$

where the values of $n_{DMRS}^{(1)}$ are configured by higher layer, $n_{DMRS\lambda}^{(2)}$ are given by the cyclic shift for DMRS field in most recent uplink-related DCI for the transport block associated with the corresponding PUSCH transmission where the value of $n_{DMRS\lambda}^{(2)}$ is given in Table 4 below. $n_{PN}(n_s)$ is a cell-specific number generated pseudo-randomly in a slot by slot basis. $r_{u,v}^{(\alpha)}(n)$ is a reference signal sequence and is defined by a cyclic shift $\alpha$ of a base sequence $\bar{r}_{u,v}(n)$ according to:

$$r_{u,v}^{(\alpha)}(n)=e^{j\alpha n}\bar{r}_{u,v}(n), 0 \leq n \leq M_{sc}^{RS} \quad (3)$$

where $M_{sc}^{RS}=mN_{sc}^{RB}$ is the length of the reference signal sequence and m is the number of RBs scheduled for PUSCH. Multiple reference signal sequences are defined from a single base sequence $\bar{r}_{u,v}(n)$ through different values of $\alpha$.

Base sequences $\bar{r}_{u,v}(n)$ are divided into groups, where $u \in \{0, 1, \ldots, 29\}$ is the group number and v is the base sequence number within the group. So there are 30 groups of base sequences for each sequence length. For $M_{sc}^{RS}=mN_{sc}^{RB}$, $1 \leq m \leq 5$ each group contains one base sequence (v=0). For $M_{sc}^{RS}=m_{sc}^{RB}$, $m \geq 6$, there are two base sequences (v=0, 1) in each group.

The definition of the base sequence $\bar{r}_{u,v}(0) \ldots \bar{r}_{u,v}(M_{sc}^{RS}-1)$ depends on the sequence length $M_{sc}^{RS}$. For base sequences of length $3N_{sc}^{RB}$ or larger, $\bar{r}_{u,v}(n)$ is generated through cyclic extension of a Zadoff-Chu (ZC) sequence $x_q(m)$ as follows:

$$\bar{r}_{u,v}(n)=x_q(n \bmod N_{ZC}^{RS}), 0 \leq n \leq M_{sc}^{RS} \quad (4)$$

where the $q^{th}$ root Zadoff-Chu sequence is defined by:

$$x_q(m) = e^{-j\frac{\pi qm(m+1)}{N_{ZC}^{RS}}}, 0 \leq m \leq N_{ZC}^{RS} - 1 \quad (5)$$

with q given by $$q=\lfloor \bar{q}+\frac{1}{2} \rfloor+v \cdot (-1)^{\lfloor 2\bar{q} \rfloor}$$

$$\bar{q}=N_{ZC}^{RS} \cdot (u+1)/31$$

The length $N_{sc}^{RS}$ of the Zadoff-Chu sequence is given by the largest prime number such that $N_{ZC}^{RS} < M_{sc}^{RS}$.

By using cyclic extension of the Zadoff-Chu sequences, the base sequences have a constant amplitude over frequency and also maintain the zero auto-correlation cyclic shift orthogonality property of the Zadoff-Chu sequences, which allows generating multiple orthogonal sequences by using different cyclic shifts on a single base sequence. Using extension, not truncation, in general, provides better CM for 3 and more RBs. In addition, at least 30 base sequences can be generated this way.

For one and two RBs, however, only a small number of extended Zadoff-Chu sequences with low CMs are available. To achieve similar inter-cell interference randomization as in the case of 3 or more PRBs, 30 base sequences are desirable. Thus, base sequences for one and two RBs were obtained by computer searches. Only quadrature phase shifting keying (QPSK) based sequences were selected to reduce memory size for storage and computational complexity. The base sequences for one and two RBs (i.e., $M_{sc}^{RS}=N_{sc}^{RB}$ and $M_{sc}^{RS}=2N_{sc}^{RB}$) are defined as:

$$\bar{r}_{u,v}(n)=e^{j\varphi(n)\pi/4}, 0 \leq n \leq M_{sc}^{RS}-1 \quad (6)$$

where the value of $\varphi(n)$ is given by Table 1 below for $M_{sc}^{RS}=N_{sc}^{RB}$, and by Table 2 below for $M_{sc}^{RS}=2N_{sc}^{RB}$.

Definition of $\varphi(n)$ for $M_{sc}^{RS}=N_{sc}^{RB}$ in LTE

TABLE 1

| u | $\varphi(0), \ldots, \varphi(11)$ |
|---|---|
| 0 | -1  1  3 -3  3  3  1  1  3  1 -3  3 |
| 1 |  1  1  3  3  3 -1  1 -3 -3  1 -3  3 |
| 2 |  1  1 -3 -3 -3 -1 -3 -3  1 -3  1 -1 |
| 3 | -1  1  1  1  1 -1 -3 -3  1 -3  3 -1 |

TABLE 1-continued

| u | $\varphi(0), \ldots, \varphi(11)$ |
|---|---|
| 4  | -1  3  1 -1  1 -1 -3 -1  1 -1  1  3 |
| 5  |  1 -3  3 -1 -1  1  1 -1 -1  3 -3  1 |
| 6  | -1  3 -3 -3 -3  3  1 -1  3  3 -3  1 |
| 7  | -3 -1 -1 -1  1 -3  3 -1  1 -3  3  1 |
| 8  |  1 -3  3  1 -1 -1 -1  1  1  3 -1  1 |
| 9  |  1 -3 -1  3  3 -1 -3  1  1  1  1  1 |
| 10 | -1  3 -1  1  1 -3 -3 -1 -3 -3  3 -1 |
| 11 |  3  1 -1 -1  3  3 -3  1  3  1  3  3 |
| 12 |  1 -3  1  1 -3  1  1  1 -3 -3 -3  1 |
| 13 |  3  3 -3  3 -3  1  1  3 -1 -3  3  3 |
| 14 | -3  1 -1 -3 -1  3  1  3  3  3 -1  1 |
| 15 |  3 -1  1 -3 -1 -1  1  1  3  1 -1 -3 |
| 16 |  1  3  1 -1  1  3  3  3 -1 -1  3 -1 |
| 17 | -3  1  1  3 -3  3 -3 -3  3  1  3 -1 |
| 18 | -3  3  1  1 -3  1 -3 -3 -1 -1  1 -3 |
| 19 | -1  3  1  3  1 -1 -1  3 -3 -1 -3 -1 |
| 20 | -1 -3  1  1  1  1  3  1 -1  1 -3 -1 |
| 21 | -1  3 -1  1 -3 -3 -3 -3 -3  1 -1 -3 |
| 22 |  1  1 -3 -3 -3 -3 -1  3 -3  1 -3  3 |
| 23 |  1  1 -1 -3 -1 -3  1 -1  1  3 -1  1 |
| 24 |  1  1  3  1  3  3 -1  1 -1 -3 -3  1 |
| 25 |  1 -3  3  3  1  3  3  1 -3 -1 -1  3 |
| 26 |  1  3 -3 -3  3 -3  1 -1 -1  3 -1 -3 |
| 27 | -3 -1 -3 -1 -3  3  1 -1  1  3 -3 -3 |
| 28 | -1  3 -3  3 -1  3  3 -3  3  3 -1 -1 |
| 29 |  3 -3 -3 -1 -1 -3 -1  3 -3  3  1 -1 |

Definition of $\varphi(n)$ for $M_{sc}^{RS}=2N_{sc}^{RB}$ in LTE

TABLE 2

| u | $\varphi(0), \ldots, \varphi(23)$ |
|---|---|
| 0  | -1  3  1 -3  3 -1  1  3 -3  3  1  3 -3  3  1  1 -1  1  3 -3  3 -3 -1 -3 |
| 1  | -3  3 -3 -3 -3  1 -3 -3  3 -1  1  1  1  3  1 -1  3 -3 -3  1  3  1  1 -3 |
| 2  |  3 -1  3  3  1  1 -3  3  3  3  3  1 -1  3 -1  1  1 -1 -3 -1 -1  1  3  3 |
| 3  | -1 -3  1  1  3 -3  1  1 -3 -1 -1  1  3  1  3  1 -1  3  1  1 -3 -1 -3 -1 |
| 4  | -1 -1 -1 -3 -3 -1  1  1  3  3 -1  3 -1  1 -1 -3  1 -1 -3 -3  1 -3 -1 -1 |
| 5  | -3  1  1  3 -1  1  3  1 -3  1 -3  1  1 -1 -1  3 -1 -3  3 -3 -3 -3  1  1 |
| 6  |  1  1 -1 -1  3 -3 -3  3 -3  1 -1 -1  1 -1  1  1 -1 -3 -1  1 -1  3 -1 -3 |
| 7  | -3  3  3 -1 -1 -3 -1  3  1  3  1  3  1  1 -1  3  1 -1  1  3 -3 -1 -1  1 |
| 8  | -3  1  3 -3  1 -1 -3  3 -3  3 -1 -1 -1 -1  1 -3 -3 -3  1 -3 -3 -3  1 -3 |
| 9  |  1  1 -3  3  3 -1 -3 -1  3 -3  3  3  3 -1  1  1 -3  1 -1  1  1 -3  1  1 |
| 10 | -1  1 -3 -3  3 -1  3 -1 -1 -3 -3 -3 -1 -3 -3  1 -1  1  3  3 -1  1 -1  3 |
| 11 |  1  3  3 -3 -3  1  3  1 -1 -3 -3  3  3  3 -3  3  3 -1 -3  3 -1  1 -3  1 |
| 12 |  1  3  3  1  1  1 -1 -1  1 -3  3 -1  1  1 -3  3  3 -1 -3  3 -3 -1 -3 -1 |
| 13 |  3 -1 -1 -1 -1 -3 -1  3  3  1 -1  1  3  3 -1  1 -1  3  1  3 -1 -3  3 |
| 14 | -3 -3  3  1  3  1 -3  3  1  3  1  1  3  3 -1 -1 -3  1 -3 -1  3  1  1  3 |
| 15 | -1 -1 -1 -3  1  3 -3  1 -1 -3 -1  3  1 -3 -3 -1 -1 -3 -3 -3 -1 |
| 16 | -1 -3  3 -1 -1 -1 -1  1  1 -3  3  1  3  3  1 -1  1 -3  1 -3  1  1 -3 -1 |
| 17 |  1  3 -1  3  3 -1 -3  1 -3  3  3  3 -1  1  1  3 -1 -3 -1  3 -1 -1 -1 |
| 18 |  1  1  1  1  1 -1  3 -1 -3  1  1  3 -3  1 -3 -1  1  1 -3 -3  3  1  1 -3 |
| 19 |  1  3  3  1 -1 -3  3 -1  3  3  3 -3  1 -1  1 -1 -3 -1  1  3 -1  3 -3 -3 |
| 20 | -1 -3  3 -3 -3 -3 -1 -1 -3 -1 -3  3  1  3 -3 -1  3 -1  1 -1  3 -3  1 -1 |
| 21 | -3 -3  1  1 -1  1 -1  1 -1  3  1 -3 -1  1 -1  1 -1 -1  3  3 -3 -1  1 -3 |
| 22 | -3 -1 -3  3  1 -1 -3 -1 -3 -3  3 -3  3 -3 -1  1  3  1 -3  1  3  3 -1 -3 |
| 23 | -1 -1 -1 -1  3  3  3  1  3  3 -3  1  3 -1  3 -1  3  3 -3  3  1 -1  3  3 |
| 24 |  1 -1  3  3 -1 -3  3 -3 -1 -1  3 -1  3 -1 -1  1  1  1  1 -1 -1 -3 -1  3 |
| 25 |  1 -1  1 -1  3 -1  3  1  1 -1 -1 -3  1  1 -3  1  3 -3  1  1 -3 -3 -1 -1 |
| 26 | -3 -1  1  3  1  1 -3 -1 -1 -3  3 -3  3  1 -3  3 -3  1 -1  1 -3  1  1  1 |
| 27 | -1 -3  3  3  1  1  3 -1 -3 -1 -1 -1  3  1 -3 -3 -1  3 -3 -1 -3 -1 -3 -1 |
| 28 | -1 -3 -1 -1  1 -3 -1 -1  1 -1 -3  1  1 -3  1 -3 -3  3  1  1 -1  3 -1 -1 |
| 29 |  1  1 -1 -1 -3 -1  3 -1  3 -1  1  3  1 -1  3  1  3 -3 -3  1 -1 -1  1  3 |

It should be noted that a phase shift of a reference signal sequence does not change its PAPR or CM. Also, the magnitude of a reference signal sequence's autocorrelation or cross correlation with other reference signal sequences does not change if the reference signal is phase shifted. Therefore, a reference signal $\bar{r}'_{u,v}(n)=e^{j\zeta}\bar{r}_{u,v}(n)$ is equivalent to $\bar{r}_{u,v}(n)$, where $\zeta$ is a real number.

A given reference sequence $\bar{r}_{u,v}(n)$ with sequence number v and sequence group number $u$ (for example, corresponding to a row in Table 1, Table 2, or Table 3 (below)) will have a given value of PAPR or CM. Also, a sequence $\bar{r}_{u_1,v}(n)$ with sequence number v and group number $u_1$ and a sequence $\bar{r}_{u_2,v}(n)$ with sequence number v and group number $u_2$ will have some cross-correlation $c_{u_1,u_2}(l_1,l_2)$, where is $l_1$ and $l_2$ are correlation lags. Good reference signal sequences should have low PAPR or CM and low cross-correlation.

Cubic Metric (CM) Definition:

The CM for a signal, v(t), with 3.84 MHz nominal bandwidth is defined according to $$CM = \frac{20\log_{10}\{\text{rms}[v_{norm}^3(t)]\} - 1.52}{1.56} \text{ dB} \quad (6)$$

where $20\log_{10}(\text{rms}[v_{norm}^3(t)])$ is called raw cubic metric (in dB) of the signal, and $$\text{rms}(x) = \sqrt{\frac{(x'x)}{N}}, \quad v_{norm}(t) = \frac{|v(t)|}{\text{rms}[v(t)]}, \quad x'$$

is the conjugate of x. This definition is used in the CM calculations in the following sections.

Cross Correlation Definition:

For a set of DMRS base sequences $\{r_{u,v}(n), n=0, 1, \ldots, M_{sc}-1\}$, the cross correlation between two sequences $r_{u1,v1}(n)$ and $r_{u2,v2}(n)$ is defined as:

$$\rho_{12} = \frac{1}{M_{sc}}\left|\sum_{n=0}^{M_{sc}-1} r_{u1,v1}(n) \cdot \text{conj}(r_{u2,v2}(n))\right| \quad (7)$$

Conj(x) represents the conjugate of x.

UL DMRS for PUSCH with Interleaved Frequency Division Multiplexing (IFDMA)

For a given PUSCH scheduling bandwidth in an uplink subframe, up to 8 orthogonal DMRS sequences, each with a unique cyclic shift, are available. These sequences can be used to support uplink MIMO transmission with 4 layers (which is the maximum number layers that are supported in uplink in LTE), each assigned with one cyclic shift, or uplink multi-user MIMO (MU-MIMO) for up to 8 UEs, each with one MIMO layer.

However, since DMRS sequences with different lengths are generally not orthogonal, wireless devices cannot generally be scheduled together for MU-MIMO transmission with different PUSCH bandwidths. In LTE Release 10, OCC2 was introduced between two DMRS symbols in two slots of an uplink subframe, i.e. $[w^{(\lambda)}(0)\ w^{(\lambda)}(1)]=[1\ 1]$ or $[1\ -1]$, so that two wireless devices with partially overlapped PUSCH bandwidth can be paired for MU-MIMO. To support more wireless devices with partially overlapped PUSCH bandwidth for MU-MIMO transmission in the uplink, it has been agreed that Interleaved Frequency Division Multiplexing (IFDMA) with repetition factor (RPF) 2 for uplink DMRS for PUSCH will be introduced in LTE Release 14, in which uplink DMRS is transmitted on only half of the subcarriers, either even numbered or odd numbered subcarriers.

Figure 7:
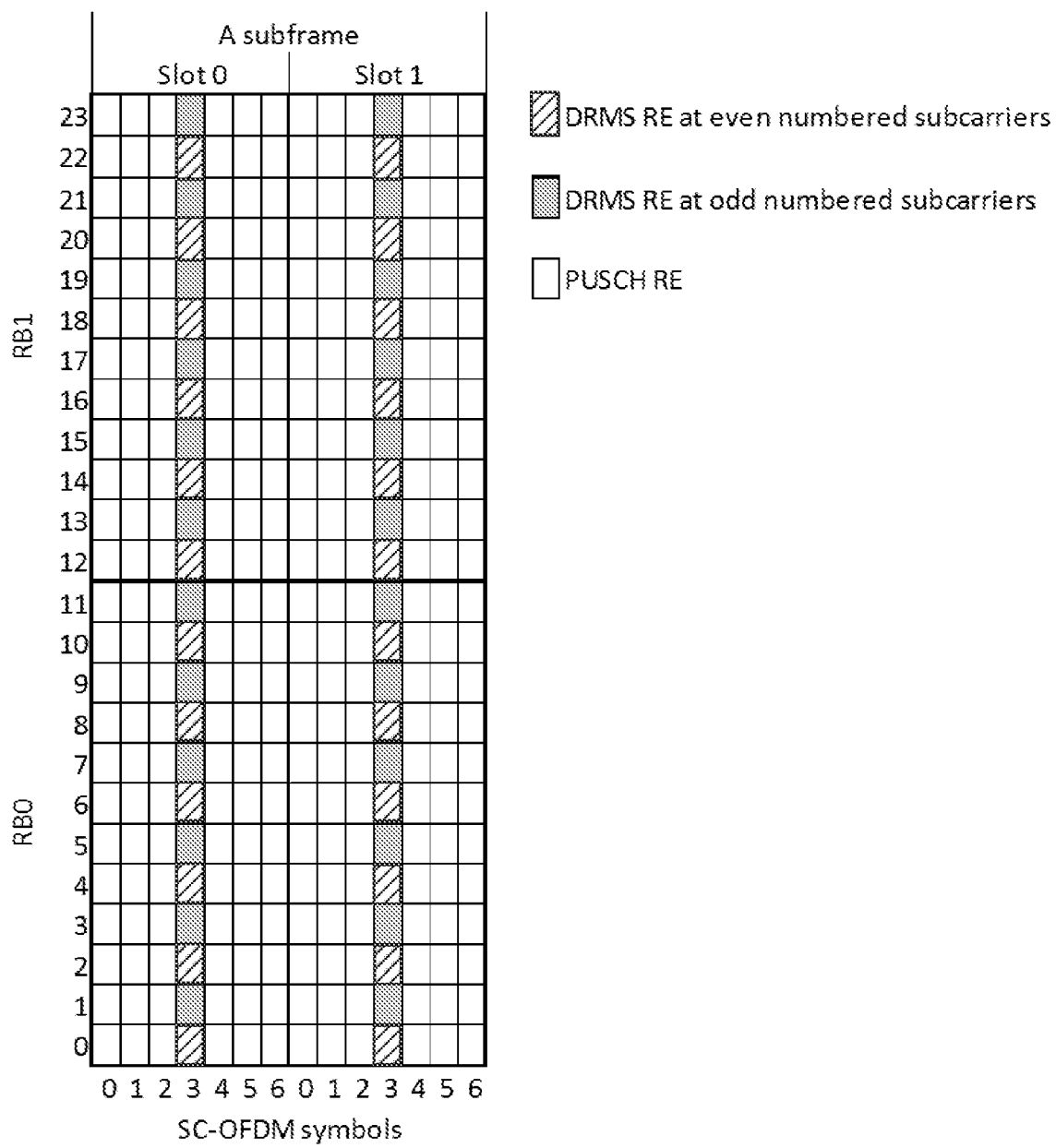
FIG. 7 illustrates uplink DMRS with IFDMA of RPF=2.

An example with 2 RBs is shown in FIG. 7, where a DMRS for one wireless device can be assigned on the DMRS REs at even numbered subcarriers while a DMRS for another wireless device can be assigned on the other half of subcarriers, i.e., DMRS REs at odd numbered subcarriers. Since the two DMRS sequences are transmitted on different subcarriers, they are orthogonal to each other. In this example, the length of each of the two DMRS sequence is 12 and thus the existing length 12 (i.e. $M_{sc}^{RS}=12$) base sequence $\bar{r}_{u,v}(n)$ can be used.

If only the existing base sequences $\bar{r}_{u,v}(n)$ are used for IFDMA with RPF=2, then the wireless devices need to be scheduled in a granularity of 2 RBs, which restricts resource allocation options in the network, and may lead to reduced data throughput when MU-MIMO wireless devices are scheduled. It has been agreed that new sequences will be introduced in Release 14 in order to support scheduling of also odd number of RBs greater than 3 RBs. The new sequences will be generated from cyclic extension of Zadoff-Chu sequences, as is done previously in LTE release 8.

However, it is still to be determined whether new sequences with length 6, 18 and 30 are supported in LTE Release 14 in order to support scheduling with 1 RB, 3 RBs and 5 RBs for IFDMA with RPF=2, respectively. The main reason is that for these sequence lengths, it is not possible to generate 30 base sequences with cyclic extension of Zadoff-Chu sequences.

Using truncated Zadoff-Chu sequences was proposed for generating the length 30 base sequences for uplink DMRS, in which a length 31 Zadoff-Chu sequence is truncated by dropping either the first or the last entry of the sequence. A set of 30 base sequences is proposed for length 18 sequences through computer search.

For length 6 sequences, it is proposed to reuse a set of 14 length-6 sequences that was agreed to be introduced for Narrow Band Internet of Things (NB-IOT) in LTE Release 14. The set of 14 length-6 sequences is a subset of the 16 sequences proposed and is shown in Table 3 below.

Length-6 DMRS base sequences to be introduced in NB-IOT:

$$r_{u,v}(n)=e^{j\varphi(n)\pi/4}, 0\leq n\leq 5.$$

TABLE 3

| $\mu$ | $\varphi(0), \varphi(1), \varphi(2),$ $\varphi(3), \varphi(4), \varphi(5),$ | | | | | |
|---|---|---|---|---|---|---|
| 0 | 1 | 1 | 1 | 1 | 3 | −3 |
| 1 | 1 | 1 | −3 | 1 | −3 | 3 |
| 2 | 1 | −1 | −1 | −1 | 1 | −3 |
| 3 | 1 | −1 | 3 | −3 | −1 | −1 |
| 4 | 1 | 3 | 1 | −1 | −1 | 3 |
| 5 | 1 | −3 | −3 | 1 | 3 | 1 |
| 6 | −1 | −1 | 1 | −3 | −3 | −1 |
| 7 | −1 | −1 | −1 | 3 | −3 | −1 |
| 8 | 3 | −1 | 1 | −3 | −3 | 3 |
| 9 | 3 | −1 | 3 | −3 | −1 | 1 |
| 10 | 3 | −3 | 3 | −1 | 3 | 3 |
| 11 | −3 | 1 | 3 | 1 | −3 | −1 |
| 12 | −3 | 1 | −3 | 3 | −3 | −1 |
| 13 | −3 | 3 | −3 | 1 | 1 | −3 |

Control Signaling for UL-DMRS

An uplink grant can be sent using either DCI format 0 or DCI format 4, depending on the uplink transmission mode configured. For wireless devices supporting uplink MIMO transmission, DCI format 4 is used. Otherwise, DCI format 0 is used. When MIMO is supported in the uplink, a separate DMRS sequence is needed for each MIMO layer. Up to 4 layers are supported in uplink MIMO, thus up to four DMRS sequences and OCC codes are needed. The cyclic shifts and OCC codes are dynamically signaled in DCI format 0 or DCI format 4 through a Cyclic Shift Field of 3 bits. This field is used to indicate a cyclic shift parameter, and a length 2 OCC code, $w^{(\lambda)}$, where $\lambda=0, 1, \ldots, v-1$ and $v$ is the number of layers to be transmitted in the PUSCH scheduled by the DCI. The exact mapping is shown in Table 4 below.

Mapping of Cyclic Shift Field in uplink-related DCI format to $n_{DMRS,\lambda}^{(2)}$ and $[w^{(\lambda)}(0)\ w^{(\lambda)}(1)]$ in LTE.

A Rel-14 UE configured with IFDMA and RPF=2 is paired with other legacy wireless devices (i.e., LTE Releases prior to Release 14 or Release 14 wireless device not configured with IFDMA).

Figure 8:
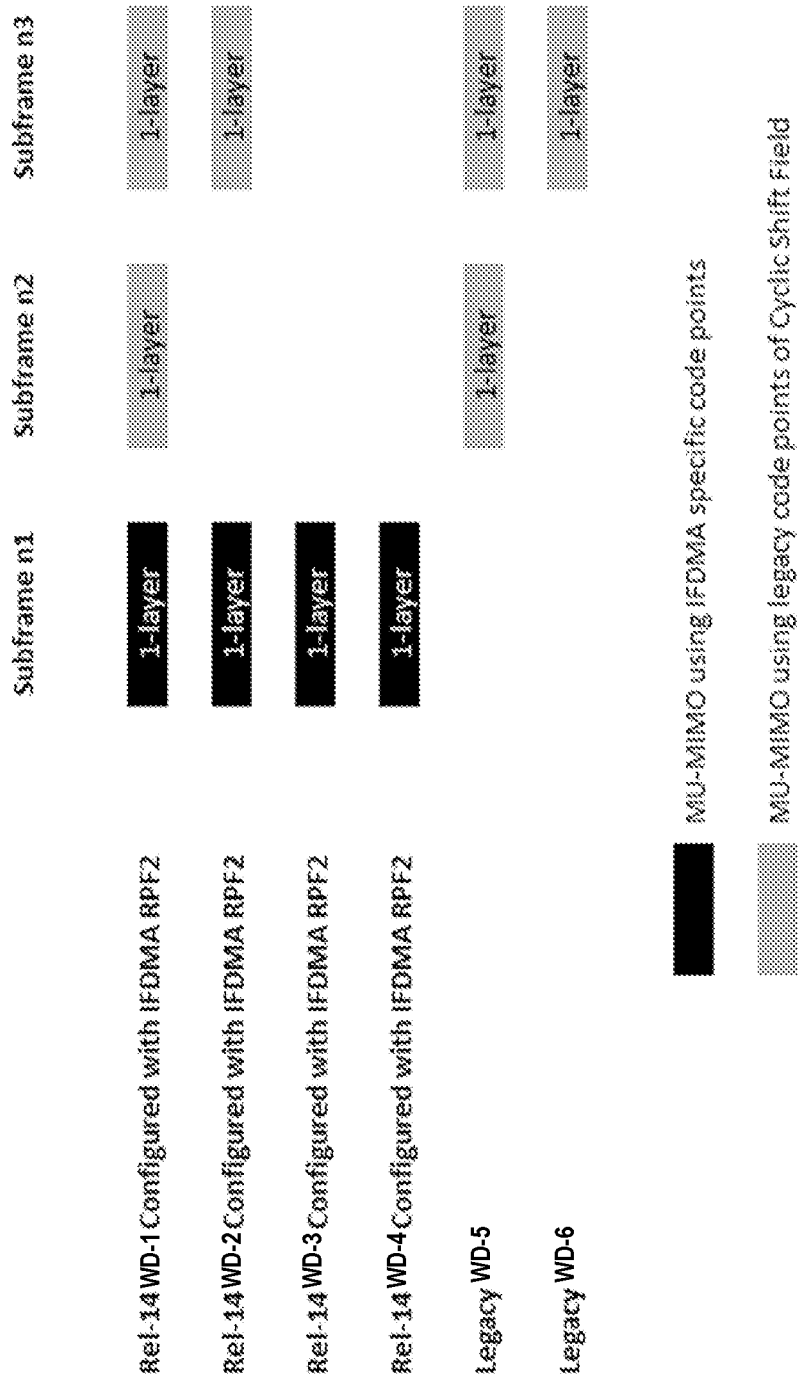
FIG. 8 illustrates an example of dynamic wireless device pairing.

An example of such dynamic wireless device pairing is shown in FIG. 8. In this example, wireless devices 1-4 support LTE Rel-14 and wireless devices 5-6 support an LTE release prior to Rel-14. In this example, in subframe n1, wireless devices 1-4 ("WD1-4") are scheduled for MU-MIMO with 1 layer each. In this subframe, wireless devices 1-4 can rely on OCC-2 and IFDMA with RPF=2 to be separated. In subframe n2, wireless device 1 and wireless device 5 are scheduled for MU-MIMO with 1-layer each. In this subframe, wireless devices 1 and 5 can be separated by OCC-2 or cyclic shift or a combination of the two. In subframe n3, wireless devices 1-2 and 5-6 are scheduled for MU-MIMO with 1-layer each. In this subframe, wireless

TABLE 4

| Cyclic Shift Field in uplink-related DCI format | $n_{DMRS,\lambda}^{(2)}$ | | | | $[w^{(\lambda)}(0)\ w^{(\lambda)}(1)]$ | | | |
|---|---|---|---|---|---|---|---|---|
| | $\lambda = 0$ | $\lambda = 1$ | $\lambda = 2$ | $\lambda = 3$ | $\lambda = 0$ | $\lambda = 1$ | $\lambda = 2$ | $\lambda = 3$ |
| 000 | 0 | 6 | 3 | 9 | [1 1] | [1 1] | [1 −1] | [1 −1] |
| 001 | 6 | 0 | 9 | 3 | [1 −1] | [1 −1] | [1 1] | [1 1] |
| 010 | 3 | 9 | 6 | 0 | [1 −1] | [1 −1] | [1 1] | [1 1] |
| 011 | 4 | 10 | 7 | 1 | [1 1] | [1 1] | [1 1] | [1 1] |
| 100 | 2 | 8 | 5 | 11 | [1 1] | [1 1] | [1 1] | [1 1] |
| 101 | 8 | 2 | 11 | 5 | [1 −1] | [1 −1] | [1 −1] | [1 −1] |
| 110 | 10 | 4 | 1 | 7 | [1 −1] | [1 −1] | [1 −1] | [1 −1] |
| 111 | 9 | 3 | 0 | 6 | [1 1] | [1 1] | [1 −1] | [1 −1] |

For a wireless device configured with IFDMA based UL-DMRS, the set of sub-carriers (i.e., even sub-carriers vs odd sub-carriers) to be used as DMRS REs should also be indicated dynamically via uplink related DCI. In order not to increase the control signaling overhead, it is preferable to reuse the same 3-bits in the Cyclic Shift Field for this dynamic indication. At the same time, to maximize the MU-MIMO pairing probability it is important to be able to dynamically pair wireless devices between the following different combinations:

A Rel-14 UE configured with IFDMA and RPF=2 is paired with other Rel-14 UEs configured with IFDMA and RPF=2 devices 1-2 and 5-6 can be separated by OCC-2 or cyclic shift or a combination of the two.

To accommodate such dynamic pairing, an alternative table is proposed for controlling signaling with 3-bits. The table is reproduced below in Table 5. In Table 4, code points (i.e., 000, 001, 011, 110) are reserved for wireless devices with no IFDMA, 2 code points (i.e., 010, 111) are reserved for IFDMA with odd subcarriers, and 2 code points (i.e., 100, 101) are reserved for IFDMA with even subcarriers.

Mapping of Cyclic Shift Field in uplink-related DCI format to support dynamic pairing.

TABLE 5

| Cyclic Shift Field in uplink-related DCI format | $n_{DMRS,\lambda}^{(2)}$ | | | | $[w^{(\lambda)}(0)\ w^{(\lambda)}(1)]$ | | | | IFDMA Configuration |
|---|---|---|---|---|---|---|---|---|---|
| | $\lambda = 0$ | $\lambda = 1$ | $\lambda = 2$ | $\lambda = 3$ | $\lambda = 0$ | $\lambda = 1$ | $\lambda = 2$ | $\lambda = 3$ | |
| 000 | 0 | 6 | 3 | 9 | [1 1] | [1 1] | [1 −1] | [1 −1] | No IFDMA |
| 001 | 6 | 0 | 9 | 3 | [1 −1] | [1 −1] | [1 1] | [1 1] | No IFDMA |
| 010 | 3 | 9 | 6 | 0 | [1 −1] | [1 −1] | [1 1] | [1 1] | Odd subcarriers |
| 011 | 4 | 10 | 7 | 1 | [1 1] | [1 1] | [1 1] | [1 1] | No IFDMA |
| 100 | 2 | 8 | 5 | 11 | [1 1] | [1 1] | [1 1] | [1 1] | Even Subcarriers |
| 101 | 8 | 2 | 11 | 5 | [1 −1] | [1 −1] | [1 −1] | [1 −1] | Even Subcarriers |

TABLE 5-continued

| Cyclic Shift Field in uplink-related DCI format | $n_{DMRS,\lambda}^{(2)}$ | | | | $[w^{(\lambda)}(0)\ w^{(\lambda)}(1)]$ | | | | IFDMA Configuration |
|---|---|---|---|---|---|---|---|---|---|
| | $\lambda=0$ | $\lambda=1$ | $\lambda=2$ | $\lambda=3$ | $\lambda=0$ | $\lambda=1$ | $\lambda=2$ | $\lambda=3$ | |
| 110 | 10 | 4 | 1 | 7 | [1 −1] | [1 −1] | [1 −1] | [1 −1] | No IFDMA |
| 111 | 9 | 3 | 0 | 6 | [1 1] | [1 1] | [1 −1] | [1 −1] | Odd Subcarriers |

For the previously proposed uplink DMRS sequences with lengths 6, 18 and 30, the corresponding cubic metrics are summarized in Table 6 below, where existing LTE base sequences with lengths 12, 24 and 36 in LTE are also included for comparison. It can be seen that the cubic metrics of the previously proposed length-6 and length-30 sequences are significantly higher than the existing base sequences of similar length.

Cubic metric characteristics of the previously proposed base sequences with lengths 6, 18 and 30.

TABLE 6

| | Cubic Metric [in dB] | | |
|---|---|---|---|
| | Mean | Max | Median |
| 14 length-6 sequences in NB-IOT | 2.3703 | 3.8134 | 2.2589 |
| 30 length-18 sequences | 0.9626 | 1.1086 | 1.0176 |
| 30 length-30 sequence from truncated Zadoff-Chu sequences | 1.2102 | 2.4371 | 1.043 |
| LTE Rel-8 length 12 sequences | 0.7105 | 1.0967 | 0.7445 |
| LTE Rel-8 length 24 sequences | 0.7971 | 1.1354 | 0.8293 |
| LTE Rel-8 length 36 sequences | 0.8958 | 1.3336 | 0.9079 |

In addition, currently 30 base sequence groups are used in LTE to reduce inter-cell interference where different base sequences are used in different cells. If the 14 length-6 base sequences defined in NB-IOT are reused, sequence collision between different cells will increase significantly and thus inter-cell interference would be increased when compared to the case where 30 base sequences are available.

The Cyclic Shift mapping to support dynamic pairing in Table 5 has one notable disadvantage. In scenarios with high Doppler spread and low delay spread, the orthogonality of the OCC-2 code cannot be guaranteed. In such scenarios, the scheduler will typically schedule wireless devices with a single layer. For the code points with no IFDMA in Table 5, the minimum cyclic shift difference for single layer (i.e., λ=0) transmission is 2 (this happens between code points 001 and 011). When orthogonality of OCC-2 code cannot be guaranteed, a higher minimum cyclic shift difference than 2 is desirable.

Note that although terminology from the third generation partnership project (3GPP), i.e., long term evolution (LTE) is used in this disclosure to as an example, this should not be seen as limiting the scope of the disclosure to only the aforementioned system. Other wireless systems, including NR (i.e., 5G), wideband code division multiple access (WCDMA). WiMax, ultra mobile broadband (UMB) and global system for mobile communications (GSM), may also benefit from exploiting the concepts and methods covered within this disclosure.

Also note that terminology such as eNodeB and wireless device should be considered non-limiting and does in particular not imply a certain hierarchical relation between the two; in general "eNodeB" could be considered as device 1 and "wireless device" as device 2, and these two devices communicate with each other over some radio channel. Also, while the disclosure focuses on wireless transmissions in the downlink, but embodiments are equally applicable in the uplink.

The term wireless device used herein may refer to any type of wireless device communicating with a network node and/or with another wireless device in a cellular or mobile communication system. Examples of a wireless device are user equipment (UE), target device, device to device (D2D) wireless device, machine type wireless device or wireless device capable of machine to machine (M2M) communication, PDA, iPAD, Tablet, mobile terminals, smart phone, laptop embedded equipped (LEE), laptop mounted equipment (LME), USB dongles etc.

The term "network node" used herein may refer to a radio network node or another network node, e.g., a core network node. Mobile Switching Center (MSC). Mobility Management Entity (MME). Operation and Maintenance (O&M), Operations Support System (OSS). Self-Organizing Network (SON), positioning node (e.g. Evolved Serving Mobile Location Center (E-SMLC)), Minimization of Drive Test (MDT) node, etc.

The term "network node" or "radio network node" used herein can be any kind of network node comprised in a radio network which may further comprise any of base station (BS), radio base station, base transceiver station (BTS), base station controller (BSC), radio network controller (RNC), evolved Node B (eNB or eNodeB), Node B, multi-standard radio (MSR) radio node such as MSR BS, relay node, donor node controlling relay, radio access point (AP), transmission points, transmission nodes, Remote Radio Unit (RRU) Remote Radio Head (RRH), nodes in distributed antenna system (DAS) etc.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Before describing in detail exemplary embodiments, it is noted that the embodiments reside primarily in combinations of apparatus components and processing steps related to creating a reference signal sequence at a reduced peak to average ratio. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom." and the like, may be used solely to distinguish one entity or element from another entity or element without necessarily requiring or implying any physical or logical relationship or order between such entities or elements.

In some embodiments, the present disclosure provides new base QPSK sequences with low CM. To mitigate the possible high inter-cell interference with 14 length-6 base sequences, a new set of 30 length-6 base sequences with low cubic metric is provided. For length-30 base sequences, instead of using truncated Zadoff-Chu sequences, a new set of 30 base sequences with lower cubic metrics is also provided. For length-18 base sequences, a new set of 30 QPSK sequences is provided, which provide lower cubic metric as well as lower cross correlation.

In another embodiment of the present disclosure, new base sequences generated from decimation of existing base sequences of larger length to facilitate MU-MIMO pairing a new wireless device configured with IFDMA and a legacy wireless device are provided. For example, length 6 base sequences $\{r'_{u,v}(n), n=0, 1, \ldots, 5\}$ are obtained by decimating the existing length 12 base sequences $\{r_{u,v}(n), n=0, 1, \ldots, 11\}$. i.e. $r'_{u,v}(n)=r_{u,v}(2n), n=0, 1, \ldots, 5$.

To mitigate the problems identified with the dynamic pairing cyclic shift mapping scheme in Table 5, the present disclosure provides a new dynamic pairing cyclic shift mapping scheme. The proposed mapping scheme achieves minimum cyclic separation of 3 when orthogonality of Orthogonal Cover Code-2 (OCC-2) code cannot be guaranteed in scenarios with high Doppler spread and low delay spread.

According to some embodiments, with the new sets of 30 length-6, length-18 and length-30 base sequences, lower inter-cell interference and higher power amplifier efficiency can be achieved, which translates to better uplink demodulation performance and lower wireless device power consumption.

In one solution, it is possible to pair a new wireless device with IFDMA and a legacy wireless device for uplink MU-MIMO. With the new cyclic shift mapping scheme for dynamic pairing, LTE Release-14 wireless devices configured with IFDMA can by dynamically paired with legacy wireless devices and other LTE Release-14 wireless devices configured with IFDMA in different subframes for MU-MIMO with good cyclic shift separation in scenarios with high Doppler spread and low delay spread.

Sequence Design Approaches and Equivalencies

Reference signal sequence design can be seen as a joint optimization, where sequences with low PAPR or CM and with low cross-correlation magnitudes are selected.

In some embodiments, a design approach can be to start with a large number of candidate sequences that have a PAPR or CM below some threshold, and then eliminating the sequences that have the highest cross correlation magnitude statistics.

In this way, a given PAPR or CM target can be reached, while minimizing cross correlation. Reference signal design can then be seen as an iterative process, wherein a sequence of the set of sequences is added or removed according to its PAPR or CM and/or to its cross correlation with other sequences in the set.

It should be noted that a phase shift of a reference signal sequence does not change its PAPR or CM. Also, the magnitude of a reference signal sequence's autocorrelation or cross correlation with other reference signal sequences does not change if the reference signal is phase shifted. Therefore, a reference signal sequence $\bar{r}'_{u,v}(n)=e^{j\zeta}\bar{r}_{u,v}(n)$ is equivalent to $\bar{r}_{u,v}(n)$, where $\zeta$ is a real number. Similarly, a common cyclic delay applied to all sequences in general does not change the PAPR, CM, or correlation statistics of a reference signal sequence set. Therefore, when the reference signal is mapped to subcarriers with index $r_i$, the reference signal sequence $\bar{r}'_{u,v}(n)=e^{j\zeta r_i}\bar{r}_{u,v}(n)$ can be equivalent to $\bar{r}_{u,v}(n)$, where $\zeta$ is a real number.

A New Set of 30 Length-6 Base Sequences with Low Cubic Metric

A set of 30 new length-6 base sequences are designed and provided in Table 7 below. The cubic metric and cross correlation properties of the sequences are shown in Table 8 below. It can be seen that the 30 new length-6 base sequences have much lower CMs (both maximum and mean) than the base sequences defined in NB-IOT. The low cubic metric properties allow more efficient power utilization at a wireless device, which translates to lower power consumption and thus longer battery life for the wireless device.

The new sequences have the same maximum cross correlation as the sequences defined in NB-IOT, with only a slightly higher mean (0.3715 vs. 0.3374) and median (0.3333 vs. 0.2845) cross correlation between different sequences. The maximum cross correlation is more important for demodulation performance. New length-6 base sequences $$r_{u,v}(n) = \exp\left(\frac{j\varphi(n)\pi}{4}\right), \quad n = 0, 1, \ldots, 5.$$

TABLE 7

| u | $\varphi(0), \varphi(1), \ldots, \varphi(5)$ | | | | | |
|---|---|---|---|---|---|---|
| 0 | −1 | −3 | 3 | −3 | 3 | −3 |
| 1 | −1 | 3 | −1 | 1 | 1 | 1 |
| 2 | 3 | −1 | −3 | −3 | 1 | 3 |
| 3 | 3 | −1 | −1 | 1 | −1 | −1 |
| 4 | −1 | −1 | −3 | 1 | −3 | −1 |
| 5 | 1 | 3 | −3 | −1 | −3 | 3 |
| 6 | −3 | 3 | −1 | −1 | 1 | −3 |
| 7 | −1 | −3 | −3 | 1 | 3 | 3 |
| 8 | 3 | −1 | 1 | 3 | 1 | 3 |
| 9 | 3 | −3 | 3 | 1 | −1 | 1 |
| 10 | −3 | 1 | −3 | −3 | −3 | −3 |
| 11 | −3 | −3 | −3 | 1 | −3 | −3 |
| 12 | 3 | −3 | 1 | −1 | −3 | −3 |
| 13 | 3 | −3 | 3 | −1 | −1 | −3 |
| 14 | 3 | −1 | 1 | 3 | 3 | 1 |
| 15 | −1 | 1 | −1 | −3 | 1 | 1 |
| 16 | −3 | −1 | −3 | −1 | 3 | 3 |
| 17 | 1 | −1 | 3 | −3 | 3 | 3 |
| 18 | 1 | 3 | 1 | 1 | −3 | 3 |
| 19 | −1 | −3 | −1 | −1 | 3 | −3 |
| 20 | 3 | −1 | −3 | −1 | −1 | −3 |
| 21 | 3 | 1 | 3 | −3 | −3 | 1 |
| 22 | 1 | 3 | −1 | −1 | 1 | −1 |
| 23 | −3 | 1 | −3 | 3 | 3 | 3 |
| 24 | 1 | 3 | −3 | 3 | −3 | 3 |
| 25 | −1 | −1 | 1 | −3 | 1 | −1 |
| 26 | 1 | −3 | −1 | −1 | 3 | 1 |
| 27 | −3 | −1 | −1 | 3 | 1 | 1 |
| 28 | −1 | 3 | −3 | −3 | −3 | 3 |
| 29 | 3 | 1 | −1 | 1 | 3 | 1 |

Cross correlation and cubic metric properties of the length 6 sequences defined in NB-IOT and in Table 7, are shown below in Table 8.

TABLE 8

|  | Mean | Max | Median |
|---|---|---|---|
| Cubic Metric [in units dB] | | | |
| NB-IOT (14 sequences of Table 3 | 2.3703 | 3.8134 | 2.2589 |
| New set of 30 sequences in Table 7 | 1.3264 | 1.5140 | 1.3511 |
| Cross Correlation [in units dB] | | | |
| NB-IOT (14 sequences) of Table 3 | 0.3374 | 0.7454 | 0.2845 |
| New 30 sequences in Table 7 | 0.3715 | 0.7454 | 0.3333 |

A New Set of Length-18 Base Sequences with Low Cubic and Cross Correlation

A new set of 30 sequences with length-18 is shown in Table 9 below. The cross correlation and cubic metric properties are summarized in Table 10 below and are compared to the set of length-18 sequences. It can be seen that the cross correlation and cubic metric of the new sequences in Table 7 are much lower than those associated with the set of length-18 sequences.

Table 9 illustrates new length-18 DMRS base sequences, $$r_{u,v}(n) = \exp\left(\frac{j\varphi(n)\pi}{4}\right), \quad n = 0, 1, \ldots, 17.$$

Table 10 below shows cross correlation and cubic metric properties of the new length-18 DMRS base sequences in Table 9.

TABLE 10

|  | Mean | Max | Median |
|---|---|---|---|
| Cubic Metric [in units dB] | | | |
| The set of sequences in Table 9 | 0.623 | 0.7395 | 0.3534 |
| The set of proposed sequences | 0.9626 | 1.1086 | 1.0176 |
| Cross Correlation [in units dB] | | | |
| The set of sequences in Table 9 | 0.1904 | 0.4969 | 0.1571 |
| The set of proposed sequences | 0.2598 | 0.5556 | 0.2485 |

A New Set of Length-30 Base Sequences with Low Cubic Metric

A new set of 30 base sequences with length-30 is shown in Table 11 below. The cross correlation and cubic metric properties of these sequences are shown in Table 12 below. It can be seen that the 30 new base sequences have lower cubic metric (mean, max and median) and lower mean and median cross correlation than the truncated ZC sequences, with slightly higher maximum cross correlation. Comparing to the truncated ZC, about 1 Kbytes of additional memories (1 byte per element) are required to store the sequences for the new sequences. However, such additional memories should not be a concern.

TABLE 9

| u | $\varphi(0), \varphi(1), \ldots, \varphi(17)$ |
|---|---|
| 0 | −1 1 −3 3 −3 −1 −1 1 −3 1 1 −3 3 3 3 3 1 1 |
| 1 | −3 −1 −1 1 −3 1 −3 −1 −1 −3 −1 −1 3 1 −1 −3 3 3 |
| 2 | −1 1 3 −1 −1 3 1 3 −3 3 −3 3 1 1 1 3 1 |
| 3 | 1 −3 1 1 −3 1 −1 −1 −1 1 −3 −3 −3 1 1 −1 −1 3 |
| 4 | −1 −3 −1 −3 3 −3 −3 −3 −1 1 −3 −1 1 −3 3 1 1 −3 |
| 5 | −1 −3 1 −1 −3 −3 −3 1 1 1 3 1 −3 1 3 −1 1 3 |
| 6 | 3 −3 3 −3 −3 −3 −3 3 1 1 1 −3 −3 −1 1 −3 3 −1 |
| 7 | −3 1 −3 −1 −1 −3 −3 −3 −1 3 1 −3 −3 1 −1 −1 −1 3 |
| 8 | −1 −1 −1 −1 −1 −3 3 −3 1 −1 1 −3 −3 1 1 −3 1 3 |
| 9 | −1 3 3 −1 −3 −3 −1 3 −3 −3 −3 −1 1 −1 3 −3 |
| 10 | −1 −1 3 −3 3 −1 1 3 1 −3 1 −1 −3 −1 1 −1 −1 1 |
| 11 | −1 −3 −1 −3 1 3 1 3 3 1 −3 3 1 1 3 −3 −1 1 |
| 12 | 3 −3 3 −1 −3 3 −1 1 −3 1 1 1 −1 −1 −3 −1 1 1 |
| 13 | −3 −3 −3 −1 −3 −3 3 3 −1 1 −1 1 −3 3 −1 3 3 −1 |
| 14 | −1 −1 −1 −1 1 −1 −3 3 3 −1 3 −1 3 −3 −1 1 1 −3 |
| 15 | −1 3 1 3 1 −1 3 3 −3 −3 1 1 −1 1 3 −1 1 −1 |
| 16 | 1 1 −1 −3 −3 −3 −1 −3 1 3 −1 3 −1 1 3 −1 −1 1 |
| 17 | 3 −3 −3 −1 −1 −3 1 −3 3 −1 3 −3 1 −3 3 3 1 |
| 18 | 3 −3 1 3 −3 −1 −1 3 1 3 1 1 −1 −3 3 −1 |
| 19 | 1 1 −1 1 −3 3 −1 3 3 1 −1 3 −3 −1 −1 −1 1 −3 |
| 20 | 1 3 −3 −1 −3 −1 1 −1 3 −1 1 −1 −1 −3 −3 |
| 21 | −3 3 −3 −1 −1 1 −3 1 −1 −1 −3 1 −3 −3 1 −3 −3 |
| 22 | −3 1 1 1 −3 −3 −1 3 1 −1 3 −3 −1 −3 −3 −1 −3 |
| 23 | −3 −3 3 −1 3 1 −1 3 1 −3 −3 1 3 −3 3 −3 |
| 24 | 1 −3 −3 3 1 −1 −1 −1 1 −1 3 −1 −3 −1 1 3 −3 |
| 25 | 1 −3 −1 −1 3 −3 −3 −1 −3 3 1 3 3 1 −3 −3 3 −3 |
| 26 | −1 3 −3 3 −1 3 1 −3 −3 −1 −1 −1 1 3 −1 −1 −3 |
| 27 | 3 −3 −1 1 1 3 1 1 3 1 −1 −3 −3 3 1 −3 1 −3 |
| 28 | 1 3 1 1 3 −1 −1 1 1 3 −3 1 −3 3 3 1 −1 −3 |
| 29 | −1 3 1 1 1 1 1 −1 3 −1 3 −3 −1 1 3 −3 3 −1 |

Table 11 shows length-30 computer generated sequences, $$r_{u,v}(n) = \exp\left(\frac{j\varphi(n)\pi}{4}\right), \quad n = 0, 1, \ldots, 29.$$  (5)

TABLE 11

| u | \multicolumn{16}{c}{φ(0), φ(1), . . . , φ(15)} |
|---|---|---|---|---|---|---|---|---|---|---|---|---|---|---|---|---|
| 0 | 1 | 3 | -3 | 3 | -3 | -1 | -3 | -3 | 1 | -3 | 1 | -3 | -1 | -1 | 1 | -3 |
| 1 | 1 | -3 | 1 | -3 | -3 | 3 | -1 | 1 | -1 | 3 | -3 | -3 | 1 | 3 | -1 | -3 |
| 2 | 1 | -3 | -1 | -1 | -3 | 1 | 1 | 3 | 1 | 1 | -3 | -3 | 3 | 3 | 1 | -3 |
| 3 | 3 | 3 | -1 | 1 | 3 | -1 | -3 | 1 | 3 | -1 | -1 | 1 | -1 | 3 | 1 | 1 |
| 4 | -3 | -3 | -3 | 3 | -1 | -1 | -1 | 1 | -1 | -1 | -3 | -3 | -1 | -1 | 3 | -1 |
| 5 | 3 | 1 | 3 | -1 | -3 | 1 | -3 | -1 | 3 | -3 | 1 | 3 | 1 | -3 | -3 | -1 |
| 6 | 1 | -1 | -3 | 3 | -3 | -3 | 3 | 3 | 3 | 3 | -3 | -1 | 1 | 3 | 3 | 3 |
| 7 | 1 | 1 | -1 | -1 | -1 | -3 | -1 | 1 | -1 | 1 | 1 | -3 | -1 | 1 | 1 | -3 |
| 8 | -3 | -3 | -3 | 3 | -3 | 3 | -3 | -3 | -1 | 1 | 1 | 1 | -3 | -3 | 1 | 3 |
| 9 | -3 | 1 | 3 | 3 | -3 | -1 | 3 | 1 | 3 | 3 | 3 | 1 | 3 | -1 | -3 |
| 10 | -3 | -3 | -1 | -1 | 1 | 1 | -1 | -3 | 1 | -3 | 1 | -1 | -1 | -1 | -1 | -3 |
| 11 | -1 | 1 | -1 | 3 | 3 | -1 | -3 | 3 | 1 | -1 | -1 | -1 | 1 | 1 | 1 | 1 |
| 12 | 1 | 1 | 3 | 1 | -3 | 1 | -1 | -1 | 1 | 1 | 3 | -1 | 3 | -3 | -1 | 1 |
| 13 | -3 | -3 | 3 | 1 | -3 | 3 | -3 | -3 | -1 | -3 | 1 | 3 | -3 | -1 | -3 | 1 |
| 14 | 3 | -3 | 1 | 1 | 1 | -3 | -1 | -1 | -3 | -3 | 1 | -1 | -3 | -1 | 1 | -3 |
| 15 | 3 | -3 | 1 | 3 | 3 | -3 | 1 | 3 | -3 | -3 | -3 | -1 | 1 | 3 | 1 | -3 |
| 16 | -3 | -1 | -3 | -3 | 1 | -3 | 1 | 3 | -3 | 3 | -1 | -3 | -3 | -3 | -3 | 3 |
| 17 | -3 | -1 | 1 | 3 | -1 | 1 | -1 | 1 | 3 | 3 | -3 | -1 | -3 | 1 | -1 |
| 18 | -1 | 3 | -3 | 1 | 3 | 1 | 1 | -1 | -3 | 3 | 3 | -3 | -1 | 3 | -3 | -3 |
| 19 | 1 | -1 | 1 | 3 | 3 | 3 | -3 | 3 | -1 | -3 | 3 | -3 | -3 | 1 | -3 | -1 |
| 20 | -3 | 3 | 1 | -3 | 1 | -1 | 1 | 3 | -3 | -1 | -1 | 1 | 1 | 1 | -1 | 3 |
| 21 | -3 | 1 | -1 | 1 | 1 | -3 | -3 | -3 | -1 | 3 | 1 | -1 | 1 | 3 | 1 | -1 |
| 22 | -3 | -1 | 1 | -3 | -3 | -1 | -3 | -1 | -3 | 1 | -1 | 1 | -3 | -1 | 1 | 1 |
| 23 | -3 | -1 | -1 | 1 | -1 | -1 | -1 | -1 | -1 | -1 | 3 | 3 | -1 | -3 | 3 | 1 |
| 24 | 1 | -3 | -1 | 1 | -3 | 3 | -3 | -1 | 3 | 3 | 1 | -3 | -3 | 3 | 1 | 3 |
| 25 | -1 | -1 | -1 | -1 | 3 | -1 | 1 | -1 | 1 | 3 | -1 | 3 | 3 | -3 | -3 | 1 |
| 26 | 1 | 1 | 1 | -1 | 1 | 1 | -1 | -3 | 3 | 3 | -1 | -3 | 1 | -3 | -3 | 1 |
| 27 | 3 | 1 | 1 | -1 | 3 | 3 | 3 | -1 | -3 | -3 | -3 | -3 | 3 | 1 | 1 |
| 28 | 1 | -3 | 3 | -1 | 1 | 3 | -1 | 3 | 1 | 3 | 3 | -1 | 1 | 1 | 3 |
| 29 | -1 | 3 | -3 | 1 | -3 | -1 | 3 | 3 | -1 | -3 | -3 | 3 | 1 | 3 | 1 |

| u | \multicolumn{14}{c}{φ(16), φ(17), . . . , φ(29)} |
|---|---|---|---|---|---|---|---|---|---|---|---|---|---|---|
| 0 | -1 | 1 | 1 | -1 | -3 | -3 | -3 | 1 | -3 | 3 | -1 | -3 | 3 | 1 |
| 1 | -3 | -1 | 1 | -1 | -1 | -1 | 1 | -1 | -3 | -3 | 3 | -3 | -3 | 1 |
| 2 | -3 | 1 | -3 | -1 | -3 | -3 | -1 | 3 | -3 | -3 | -3 | 1 | 3 | 3 |
| 3 | 1 | 3 | -1 | -3 | -3 | 1 | 3 | -3 | -3 | 3 | 1 | 1 | 3 | 3 |
| 4 | 3 | 3 | -3 | -1 | 1 | -3 | -3 | 3 | -1 | 1 | 3 | -1 | -3 | 3 |
| 5 | -1 | 3 | 3 | -3 | 1 | -1 | -3 | -1 | 1 | 1 | -1 | -1 | -1 | -1 |
| 6 | -3 | 1 | -3 | -1 | -3 | -1 | 1 | 1 | -1 | 3 | 3 | 3 | 1 | -3 |
| 7 | 3 | -3 | 3 | 3 | -3 | -3 | -1 | 1 | 1 | -1 | 3 | 3 | -1 | -3 |
| 8 | -1 | 1 | -1 | 3 | -3 | 1 | -3 | -3 | 1 | -1 | -3 | -1 | 3 | 1 |
| 9 | -1 | -3 | -3 | -1 | 1 | -3 | 1 | 3 | -3 | 3 | 1 | -1 | -1 | -3 |
| 10 | -1 | 3 | -3 | 1 | 3 | -1 | 3 | 3 | -1 | -3 | 3 | -3 | 1 |
| 11 | -3 | -1 | 3 | 1 | 3 | 1 | -3 | -1 | -1 | -3 | -3 | -1 | 3 | -3 |
| 12 | -3 | -3 | -1 | -1 | 1 | -1 | -1 | -3 | 1 | 3 | 3 | 1 | 1 | -1 |
| 13 | -3 | -1 | 3 | 1 | 3 | 1 | 1 | 3 | 3 | 1 | -3 | -1 | -1 | -3 |
| 14 | 1 | -3 | -1 | 1 | 1 | -3 | 3 | -3 | 3 | -1 | -3 | 1 | -1 | 1 |
| 15 | -1 | -1 | -3 | -1 | -3 | 3 | -3 | 3 | 1 | -1 | -3 | 3 | 1 | -1 |
| 16 | -1 | 1 | 1 | 3 | -1 | -1 | 1 | 3 | 1 | -1 | -1 | 1 | 3 |
| 17 | 3 | -1 | -1 | -3 | 1 | -1 | -1 | -3 | -1 | -3 | -3 | 3 | 1 |
| 18 | -1 | -1 | -3 | 3 | 1 | 3 | 3 | 3 | -3 | 1 | -1 | 3 | 1 | -3 |
| 19 | 3 | -3 | -3 | 3 | 3 | 3 | -3 | 1 | 1 | 1 | -1 | -1 | 3 | 3 |
| 20 | 1 | 1 | -1 | -1 | 3 | -3 | 1 | -3 | -3 | -3 | 1 | -3 | 1 | 1 |
| 21 | -3 | 3 | -3 | -3 | -1 | -3 | -3 | -3 | 3 | -3 | -1 | 3 | -3 | 3 |
| 22 | -3 | -3 | -3 | -3 | 1 | -1 | -3 | 3 | -1 | 3 | 3 | 1 | -1 | -1 |
| 23 | -3 | 1 | -1 | 1 | -3 | 3 | -3 | 1 | -1 | -1 | 3 | -3 | 1 | 3 |
| 24 | -1 | -1 | 1 | -1 | -3 | 1 | -3 | -1 | -1 | 1 | 1 | 3 | -1 |
| 25 | 1 | 3 | 3 | -1 | 3 | -1 | -3 | 1 | 3 | -1 | -3 | 3 | 3 | 1 |
| 26 | -1 | 1 | -1 | 1 | 3 | -3 | 1 | -1 | 3 | -1 | -1 | 1 | 3 |
| 27 | 3 | -3 | -1 | 1 | 3 | 1 | -3 | 3 | 1 | -1 | -1 | 1 | 1 |
| 28 | 1 | -3 | -1 | -3 | -1 | -1 | 3 | -1 | 1 | 1 | 1 | -1 | -3 | 3 |
| 29 | 3 | 1 | -1 | -1 | 3 | -3 | -3 | 1 | 1 | 1 | 1 | 1 | 3 | 3 |

Table 12 below shows the new length-30 base sequences vs. truncated Zadoff-Chu sequences.

TABLE 12

|  | Mean | Max | Median |
|---|---|---|---|
| Cubic Metric [in units dB] | | | |
| Truncated from length 31 ZC | 1.2102 | 2.4371 | 1.043 |
| New QPSK sequences in Table 11 | 0.8719 | 0.9998 | 0.9109 |
| Cross Correlation [in units dB] | | | |
| Truncated from length 31 ZC | 0.1809 | 0.2172 | 0.1768 |
| New QPSK sequences in Table 11 | 0.1568 | 0.359 | 0.1491 |

Sequences Allowing Orthogonal Multiplexing of RPF=2 and RPF=1

In some embodiments, optimizing for minimum CM or PAPR or for low correlation magnitudes may not be essential. This design flexibility can be used to improve compatibility with "RPF=1" Rel-13 wireless devices that transmit DMRS without repetition or IFDMA.

First, it is recalled that IFDMA, wireless devices using RPF=2 transmit their sequence on every other subcarrier, as described above. More generally, IFDMA with D repetitions ('RPF=D'), can be written as follows. Note that D=2 for the case with RPF=2.

$$re(Dk, l) = r'_{u,v}(\alpha)(n) \quad (8)$$

where:

re(Dk,l) is a resource element with subcarrier index Dk in uplink SC-OFDM symbol l. $r'_{u,v}{}^{(\alpha)}(n)$ is the $n^{th}$ element of a new DMRS reference sequence to be used for RPF=D with group index u and sequence index v with cyclic shift α.

If the RPF=D, wireless devices use the same reference sequence element values on their occupied resource elements as the Rel-13 wireless devices do, then cyclic shift orthogonality can be maintained for all provided that the RPF=D sequence length is at least length 12. Then the new RPF=D sequence $r'_{u,v}(n)$ can be defined as a decimated version of the Rel-13 DMRS sequence. i.e., decimated signal type, which can be expressed:

$$r'_{u,v}(n) = r_{u,v}(Dn + \Delta_r) \quad (9)$$

where:

$r_{u,v}(n)$ is the $n^{th}$ element of the Rel-13 DMRS base sequence with group index u, group sequence index v. $\Delta_r \in \{0, 1 \ldots, D\}$ is an offset used to select which portion of the Rel-13 DMRS base sequence is used.

Figure 9:
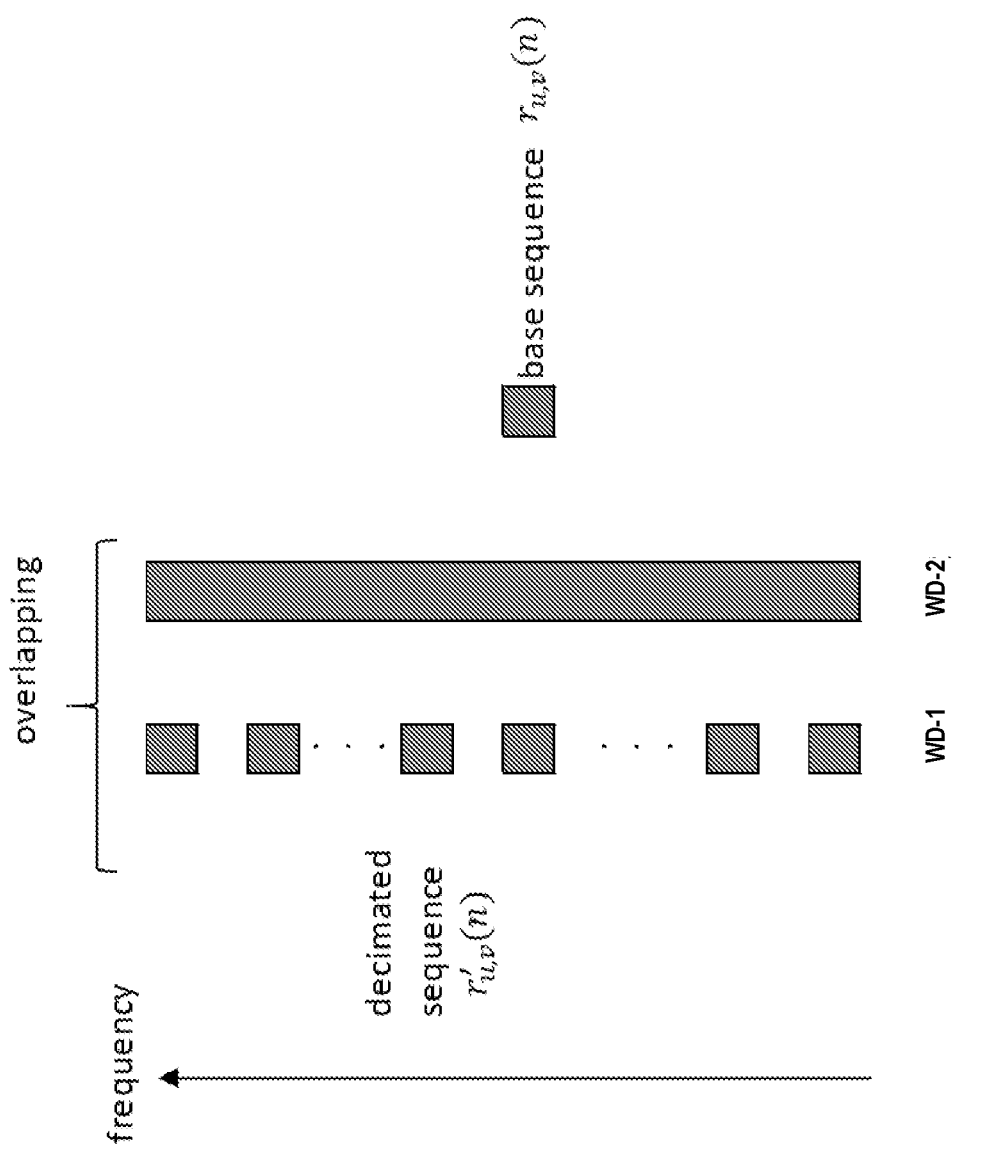
FIG. 9 illustrates an example of using decimated existing base sequences.

FIG. 9 illustrates an example of using decimated existing base sequences, i.e., decimated base sequences, where wireless device 1 (WD1) is a new wireless configured with IFDMA and wireless device 2 (WD2) is a legacy wireless device with base sequence 2. The new reference symbol sequence for RPF=D with cyclic shift is then determined somewhat differently than for Rel-13 using the following equation. Note that a factor of D is used in the exponent so that the Rel-13 and new reference signal have the same values when mapped to the same subcarriers.

$$r'_{u,v}{}^{(\alpha)}(n) = e^{jD\alpha n} r'_{u,v}(n), 0 \le n < M'_{sc}{}^{RS} \quad (10)$$

Where $M'_{sc}{}^{RS} = \lfloor M_{sc}{}^{RS}/D \rfloor$ is the length of the new reference signal sequence and $M_{sc}{}^{RS}$ is the length of the Rel-13 sequence from which it is decimated.

The RPF=D sequence may alternatively be constructed by setting elements of the Rel-13 sequence to zero, and transmitting the modified sequence in the same REs as the Rel-13 sequence. This RE mapping can be expressed:

$$re(k, l) = \begin{cases} r_{u,v}^{(\alpha)}(n); & k = \lfloor n/D \rfloor + \Delta_r \\ 0; & \text{otherwise} \end{cases} \quad (11)$$

where:

$r_{u,v}{}^{(\alpha)}(n)$ is the $n^{th}$ element of a Rel-13 DMRS reference sequence with group index u and group sequence index v with cyclic shift α. $\Delta_r \in \{0, 1, \ldots, D\}$ is an offset used to select which portion of the Rel-13 DMRS subcarriers are nonzero and contain values of the Rel-13 sequence.

Figure 10:
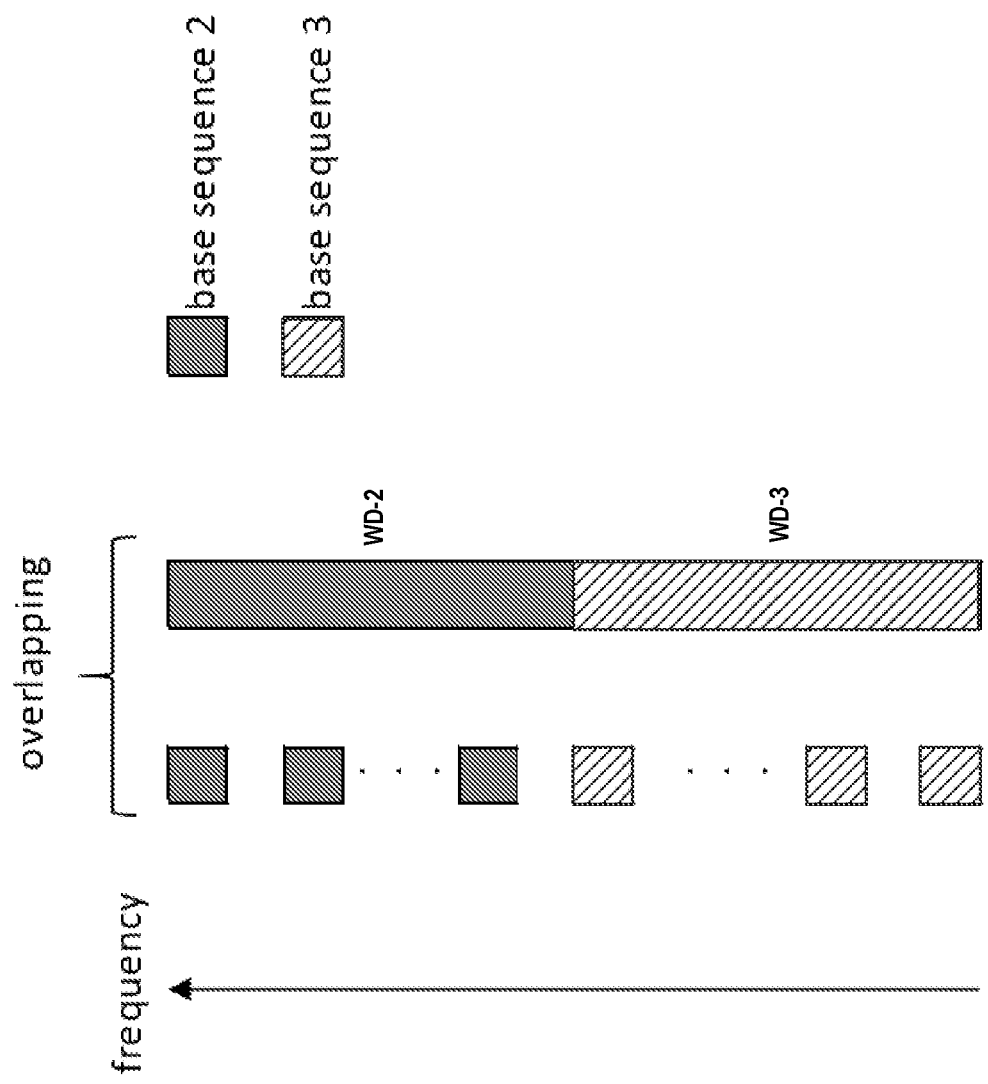
FIG. 10 illustrates a pairing of a new wireless device with IFDMA with two legacy wireless devices.

The approach can be extended to scenarios where a new wireless device configured with IFDMA may be paired with more than one legacy wireless devices, where each occupies a different part of the bandwidth scheduled for the new wireless device. An example is shown in FIG. 10. In this case, the base sequence for the new wireless device may be a decimated version of the two base sequences, i.e., decimated signal type, associated with the two legacy wireless devices.

Dynamic Switching Between DMRS Sequence Types

Since the above construction ensures that a Rel-13 sequence value and a new sequence value are the same in the REs in which the new sequence is transmitted, then a receiver operating in the same part of the bandwidth can use the same set of cyclic shifts to multiplex the Rel-13 and new sequence. That is, if a Rel-13 sequence is transmitted with cyclic shift $\alpha_1$ in a set of REs and a new sequence is transmitted with cyclic shift $\alpha_2$ once every D REs of the set of REs, if $\alpha_1 \ne \alpha_2$, then the sequences will not mutually interfere in a radio propagation channel with sufficiently low delay spread.

As mentioned above, this sequence design is not optimized, and so may not have as low CM, PAPR, or correlation magnitudes as a sequence optimized for a given sequence length. This can be seen in the examples below, where CM and cross correlation are evaluated for length 6 and length 12 sequences. Mean and median CM for lengths 6 and 12 are about 0.7-0.8 and 1.6 dB or so greater for the decimated design compared to the optimized sequence design. Maximum CM differences are considerably higher, although infrequent. Cross correlation magnitudes are relatively close, except for the length 12 maximum cross correlation value, which is about 0.3 dB higher.

Table 13 below illustrates length 6 decimated Rel-13 sequences vs. optimized sequence design

TABLE 13

|  | Mean | Max | Median |
|---|---|---|---|
| Cubic Metric [in units dB] | | | |
| New set of 30 sequences in Table 7 | 1.3264 | 1.5140 | 1.3511 |
| Decimated Rel-13 sequence (with $\Delta_r = 0$) | 2.0126 | 3.1783 | 2.1729 |
| Cross Correlation [in units dB] | | | |
| New 30 sequences in Table 7 | 0.3715 | 0.7454 | 0.3333 |
| Decimated Rel-13 sequence (with $\Delta_r = 0$) | 0.3788 | 0.8498 | 0.3333 |

Table 14 below illustrates length 12 decimated Rel-13 sequences vs. Rel-8 sequence.

TABLE 14

|  | Mean | Max | Median |
|---|---|---|---|
| Cubic Metric [in units dB] | | | |
| Rel-8 Length 24 Sequence | 0.7971 | 1.1354 | 0.8293 |
| Decimated Rel-13 sequence (with $\Delta_r = 0$) | 2.3620 | 3.3430 | 2.4277 |
| Cross Correlation [in units dB] | | | |
| Truncated from length 31 ZC | 0.1829 | 0.4751 | 0.1717 |
| Decimated Rel-13 sequence (with $\Delta_r = 0$) | 0.2492 | 0.7454 | 0.2427 |

Since there is a tradeoff between being able to multiplex Rel-13 wireless devices with wireless devices using the new decimated reference sequences vs. the higher CM and correlation magnitudes when the decimated sequence is used, it may be desirable to switch between sequences. Therefore, in an embodiment DCI, i.e., downlink control field, can indicate to a wireless device if it should use one of two sequence types to generate an uplink reference sequence in a given subframe. In one or more embodiments, DCI is a parameter for transmission in an uplink channel. The sequence types can be for example the decimated Rel-13 sequence and a second sequence with lower CM or autocorrelation magnitude properties. The DCI can directly indicate which sequence type to use through a field that selects the sequence type. Alternatively, a resource allocation parameter in DCI, such as the number of RBs to transmit PUSCH with, can select the sequence type. For example, in one embodiment, if the number of RBs is even, then a Rel-13 sequence is used, where the sequence has low CM or autocorrelation properties. If the number of RBs is odd, then the decimated reference sequence, i.e., decimated signal type, is used. In another example, when the number of RBs is smaller than a certain threshold or predefined number of RBs defined by a criterion. e.g. 6 RBs, the low CM QPSK sequences are used, otherwise, the decimated sequences are used. If less rapid switching between types is acceptable, RRC signaling or MAC control elements may be used to identify the sequence type.

A New Mapping for Cyclic Shift Field to Facilitate Dynamic MU-MIMO Pairing

In order to guarantee the best possible cyclic shift separation in scenarios with high Doppler spread and low delay spread, the cyclic shifts with the highest minimum separation for the first layer are chosen in this embodiment. From the legacy cyclic shift field mapping in Table 4, the cyclic shifts possible for the $1^{st}$ layer (i.e., $\lambda=0$) are $\{0, 2, 3, 4, 6, 8, 9, 10\}$. For IFDMA with RPF2, the minimum number of orthogonal layers is 4 (2 orthogonal layers from OCC-2 and 2 orthogonal layers from IFDMA RPF-2). Hence, it is natural to allocate 4 code points from a 3-bit table for IFDMA and the remaining 4 code points for no IFDMA. This means that from the set $\{0, 2, 3, 4, 6, 8, 9, 10\}$, four cyclic shifts with the highest minimum cyclic shift difference need to be chosen. The subset $\{0, 3, 6, 9\}$ provides the best possible minimum cyclic shift difference of 3 for the $1^{st}$ layer. This corresponds to code points 000, 001, 010, and 111 in Table 4, and thus these code points are reserved for no IFDMA.

From the remaining 4 code points (i.e., 011, 100, 101, 110), two code points each need to be reserved for IFDMA RPF-2 in odd and even subcarriers. The two code points within odd subcarriers need to be separated by OCC-2 (a similar separation is needed for even subcarriers). Among the remaining code points, the code point pair (011, 101) can be separated by OCC-2. This pair can be reserved for IFDMA RPF-2 in odd subcarriers. The remaining code point pair (100, 110) which can also be separated by OCC-2 can be reserved for IFDMA RPF-2 in even subcarriers. The resulting cyclic shift field mapping table is shown in Table 15 below. In an alternate embodiment, the code pair point (011, 101) can be reserved for IFDMA RPF-2 in even subcarriers and the code pair point (100, 110) can be reserved for IFDMA RPF-2 in odd subcarriers. The cyclic shift field mapping table corresponding to this embodiment is shown in Table 16 below.

Table 15 shows mapping of Cyclic Shift Field in uplink-related DCI format to support dynamic pairing.

TABLE 15

| Cyclic Shift Field in uplink-related DCI format | $n_{DMRS,\lambda}^{(2)}$ | | | | $[w^{(\lambda)}(0)\ w^{(\lambda)}(1)]$ | | | | IFDMA Configuration |
|---|---|---|---|---|---|---|---|---|---|
| | $\lambda = 0$ | $\lambda = 1$ | $\lambda = 2$ | $\lambda = 3$ | $\lambda = 0$ | $\lambda = 1$ | $\lambda = 2$ | $\lambda = 3$ | |
| 000 | 0 | 6 | 3 | 9 | [1 1] | [1 1] | [1 −1] | [1 −1] | No IFDMA |
| 001 | 6 | 0 | 9 | 3 | [1 −1] | [1 −1] | [1 1] | [1 1] | No IFDMA |
| 010 | 3 | 9 | 6 | 0 | [1 −1] | [1 −1] | [1 1] | [1 1] | No IFDMA |
| 011 | 4 | 10 | 7 | 1 | [1 1] | [1 1] | [1 1] | [1 1] | Odd subcarriers |
| 100 | 2 | 8 | 5 | 11 | [1 1] | [1 1] | [1 1] | [1 1] | Even subcarriers |
| 101 | 8 | 2 | 11 | 5 | [1 −1] | [1 −1] | [1 −1] | [1 −1] | Odd subcarriers |
| 110 | 10 | 4 | 1 | 7 | [1 −1] | [1 −1] | [1 −1] | [1 −1] | Even subcarriers |
| 111 | 9 | 3 | 0 | 6 | [1 1] | [1 1] | [1 −1] | [1 −1] | No IFDMA |

Table 16 shows a mapping of Cyclic Shift Field in uplink-related DCI format to support dynamic pairing.

TABLE 16

| Cyclic Shift Field in uplink-related DCI format | $n_{DMRS,\lambda}^{(2)}$ | | | | $[w^{(\lambda)}(0)\ w^{(\lambda)}(1)]$ | | | | IFDMA Configuration |
|---|---|---|---|---|---|---|---|---|---|
| | $\lambda=0$ | $\lambda=1$ | $\lambda=2$ | $\lambda=3$ | $\lambda=0$ | $\lambda=1$ | $\lambda=2$ | $\lambda=3$ | |
| 000 | 0 | 6 | 3 | 9 | [1 1] | [1 1] | [1 -1] | [1 -1] | No IFDMA |
| 001 | 6 | 0 | 9 | 3 | [1 1] | [1 1] | [1 1] | [1 1] | No IFDMA |
| 010 | 3 | 9 | 6 | 0 | [1 -1] | [1 -1] | [1 1] | [1 1] | No IFDMA |
| 011 | 4 | 10 | 7 | 1 | [1 1] | [1 1] | [1 1] | [1 1] | Even subcarriers |
| 100 | 2 | 8 | 5 | 11 | [1 1] | [1 1] | [1 1] | [1 1] | Odd subcarriers |
| 101 | 8 | 2 | 11 | 5 | [1 -1] | [1 -1] | [1 -1] | [1 -1] | Even subcarriers |
| 110 | 10 | 4 | 1 | 7 | [1 -1] | [1 -1] | [1 -1] | [1 -1] | Odd subcarriers |
| 111 | 9 | 3 | 0 | 6 | [1 1] | [1 1] | [1 -1] | [1 -1] | No IFDMA |

It should also be noted that the code point pair (011, 110) can be separated by OCC-2. Hence, in yet another alternative embodiment, this pair can be reserved for IFDMA RPF-2 in odd subcarriers. The remaining code point pair (100, 101) which can also be separated by OCC-2 can be reserved for IFDMA RPF-2 in even subcarriers. The resulting cyclic shift field mapping table is shown in Table 17 below. In an alternate embodiment, the code pair point (011, 110) can be reserved for IFDMA RPF-2 in even subcarriers and the code pair point (100, 101) can be reserved for IFDMA RPF-2 in odd subcarriers. The cyclic shift field mapping table corresponding to this embodiment is shown in Table 18 below.

Table 17 shows a mapping of Cyclic Shift Field in uplink-related DCI format to support dynamic pairing.

TABLE 17

| Cyclic Shift Field in uplink-related DCI format | $n_{DMRS,\lambda}^{(2)}$ | | | | $[w^{(\lambda)}(0)\ w^{(\lambda)}(1)]$ | | | | IFDMA Configuration |
|---|---|---|---|---|---|---|---|---|---|
| | $\lambda=0$ | $\lambda=1$ | $\lambda=2$ | $\lambda=3$ | $\lambda=0$ | $\lambda=1$ | $\lambda=2$ | $\lambda=3$ | |
| 000 | 0 | 6 | 3 | 9 | [1 1] | [1 1] | [1 -1] | [1 -1] | No IFDMA |
| 001 | 6 | 0 | 9 | 3 | [1 -1] | [1 -1] | [1 1] | [1 1] | No IFDMA |
| 010 | 3 | 9 | 6 | 0 | [1 -1] | [1 -1] | [1 1] | [1 1] | No IFDMA |
| 011 | 4 | 10 | 7 | 1 | [1 1] | [1 1] | [1 1] | [1 1] | Odd subcarriers |
| 100 | 2 | 8 | 5 | 11 | [1 1] | [1 1] | [1 1] | [1 1] | Even subcarriers |
| 101 | 8 | 2 | 11 | 5 | [1 -1] | [1 -1] | [1 -1] | [1 -1] | Even subcarriers |
| 110 | 10 | 4 | 1 | 7 | [1 -1] | [1 -1] | [1 -1] | [1 -1] | Odd subcarriers |
| 111 | 9 | 3 | 0 | 6 | [1 1] | [1 1] | [1 -1] | [1 -1] | No IFDMA |

Table 18 shows a mapping of Cyclic Shift Field in uplink-related DCI format to support dynamic pairing.

TABLE 18

| Cyclic Shift Field in uplink-related DCI format | $n_{DMRS,\lambda}^{(2)}$ | | | | $[w^{(\lambda)}(0)\ w^{(\lambda)}(1)]$ | | | | IFDMA Configuration |
|---|---|---|---|---|---|---|---|---|---|
| | $\lambda=0$ | $\lambda=1$ | $\lambda=2$ | $\lambda=3$ | $\lambda=0$ | $\lambda=1$ | $\lambda=2$ | $\lambda=3$ | |
| 000 | 0 | 6 | 3 | 9 | [1 1] | [1 1] | [1 -1] | [1 -1] | No IFDMA |
| 001 | 6 | 0 | 9 | 3 | [1 -1] | [1 -1] | [1 1] | [1 1] | No IFDMA |
| 010 | 3 | 9 | 6 | 0 | [1 -1] | [1 -1] | [1 1] | [1 1] | No IFDMA |
| 011 | 4 | 10 | 7 | 1 | [1 1] | [1 1] | [1 1] | [1 1] | Even subcarriers |
| 100 | 2 | 8 | 5 | 11 | [1 1] | [1 1] | [1 1] | [1 1] | Odd subcarriers |
| 101 | 8 | 2 | 11 | 5 | [1 -1] | [1 -1] | [1 -1] | [1 -1] | Odd subcarriers |
| 110 | 10 | 4 | 1 | 7 | [1 -1] | [1 -1] | [1 -1] | [1 -1] | Even subcarriers |
| 111 | 9 | 3 | 0 | 6 | [1 1] | [1 1] | [1 -1] | [1 -1] | No IFDMA |

In another embodiment, the number of code points reserved for no IFDMA can be fewer than 4 following a similar minimum possible cyclic shift separation criterion. The remaining code points can be distributed among IFDMA RPF-2 even and odd subcarriers based on the criterion of being able to separate by OCC-2.

In another embodiment, the allocation of code points can be depending on the signaling of an IFDMA indicator parameter. If the wireless device is not configured with IFDMA, the cyclic shift field table is indicated in table 19. If IFDMA is configured, the cyclic shift field table is indicated in tables 20 to 23, where each table shows a different possible mapping of carriers to cyclic shift field index.

Table 19 shows a mapping of Cyclic Shift Field in uplink-related DCI format to support dynamic pairing with signaled IFDMA indicator parameter signaling "no IFDMA."

TABLE 19

| Cyclic Shift Field in uplink-related DCI format | $n_{DMRS,\lambda}^{(2)}$ | | | | $[w^{(\lambda)}(0)\ w^{(\lambda)}(1)]$ | | | | IFDMA Configuration |
|---|---|---|---|---|---|---|---|---|---|
| | $\lambda=0$ | $\lambda=1$ | $\lambda=2$ | $\lambda=3$ | $\lambda=0$ | $\lambda=1$ | $\lambda=2$ | $\lambda=3$ | |
| 000 | 0 | 6 | 3 | 9 | [1 1] | [1 1] | [1 -1] | [1 -1] | No IFDMA |
| 001 | 6 | 0 | 9 | 3 | [1 -1] | [1 -1] | [1 1] | [1 1] | No IFDMA |
| 010 | 3 | 9 | 6 | 0 | [1 -1] | [1 -1] | [1 1] | [1 1] | No IFDMA |
| 011 | 4 | 10 | 7 | 1 | [1 1] | [1 1] | [1 1] | [1 1] | No IFDMA |
| 100 | 2 | 8 | 5 | 11 | [1 1] | [1 1] | [1 1] | [1 1] | No IFDMA |
| 101 | 8 | 2 | 11 | 5 | [1 -1] | [1 -1] | [1 -1] | [1 -1] | No IFDMA |
| 110 | 10 | 4 | 1 | 7 | [1 -1] | [1 -1] | [1 -1] | [1 -1] | No IFDMA |
| 111 | 9 | 3 | 0 | 6 | [1 1] | [1 1] | [1 -1] | [1 -1] | No IFDMA |

Table 20 shows a mapping of Cyclic Shift Field in uplink-related DCI format to support dynamic pairing with signaled IFDMA indicator parameter signaling "IFDMA configured."

TABLE 20

| Cyclic Shift Field in uplink-related DCI format | $n_{DMRS,\lambda}^{(2)}$ | | | | $[w^{(\lambda)}(0)\ w^{(\lambda)}(1)]$ | | | | IFDMA Configuration |
|---|---|---|---|---|---|---|---|---|---|
| | $\lambda = 0$ | $\lambda = 1$ | $\lambda = 2$ | $\lambda = 3$ | $\lambda = 0$ | $\lambda = 1$ | $\lambda = 2$ | $\lambda = 3$ | |
| 000 | 0 | 6 | 3 | 9 | [1 1] | [1 1] | [1 -1] | [1 -1] | Odd subcarriers |
| 001 | 6 | 0 | 9 | 3 | [1 -1] | [1 -1] | [1 1] | [1 1] | Even subcarriers |
| 010 | 3 | 9 | 6 | 0 | [1 -1] | [1 -1] | [1 1] | [1 1] | Odd subcarriers |
| 011 | 4 | 10 | 7 | 1 | [1 1] | [1 1] | [1 1] | [1 1] | Even subcarriers |
| 100 | 2 | 8 | 5 | 11 | [1 1] | [1 1] | [1 1] | [1 1] | Odd subcarriers |
| 101 | 8 | 2 | 11 | 5 | [1 -1] | [1 -1] | [1 -1] | [1 -1] | Even subcarriers |
| 110 | 10 | 4 | 1 | 7 | [1 -1] | [1 -1] | [1 -1] | [1 -1] | Odd subcarriers |
| 111 | 9 | 3 | 0 | 6 | [1 1] | [1 1] | [1 -1] | [1 -1] | Even subcarriers |

Table 21 shows a mapping of Cyclic Shift Field in uplink-related DCI format to support dynamic pairing with signaled IFDMA indicator parameter signaling "IFDMA configured."

TABLE 21

| Cyclic Shift Field in uplink-related DCI format | $n_{DMRS,\lambda}^{(2)}$ | | | | $[w^{(\lambda)}(0)\ w^{(\lambda)}(1)]$ | | | | IFDMA Configuration |
|---|---|---|---|---|---|---|---|---|---|
| | $\lambda = 0$ | $\lambda = 1$ | $\lambda = 2$ | $\lambda = 3$ | $\lambda = 0$ | $\lambda = 1$ | $\lambda = 2$ | $\lambda = 3$ | |
| 000 | 0 | 6 | 3 | 9 | [1 1] | [1 1] | [1 -1] | [1 -1] | Even subcarriers |
| 001 | 6 | 0 | 9 | 3 | [1 -1] | [1 -1] | [1 1] | [1 1] | Odd subcarriers |
| 010 | 3 | 9 | 6 | 0 | [1 -1] | [1 -1] | [1 1] | [1 1] | Even subcarriers |
| 011 | 4 | 10 | 7 | 1 | [1 1] | [1 1] | [1 1] | [1 1] | Odd subcarriers |
| 100 | 2 | 8 | 5 | 11 | [1 1] | [1 1] | [1 1] | [1 1] | Even subcarriers |
| 101 | 8 | 2 | 11 | 5 | [1 -1] | [1 -1] | [1 -1] | [1 -1] | Odd subcarriers |
| 110 | 10 | 4 | 1 | 7 | [1 -1] | [1 -1] | [1 -1] | [1 -1] | Even subcarriers |
| 111 | 9 | 3 | 0 | 6 | [1 1] | [1 1] | [1 -1] | [1 -1] | Odd subcarriers |

Table 22 shows a mapping of Cyclic Shift Field in uplink-related DCI format to support dynamic pairing with signaled IFDMA indicator parameter signaling "IFDMA configured."

TABLE 22

| Cyclic Shift Field in uplink-related DCI format | $n_{DMRS,\lambda}^{(2)}$ | | | | $[w^{(\lambda)}(0)\ w^{(\lambda)}(1)]$ | | | | IFDMA Configuration |
|---|---|---|---|---|---|---|---|---|---|
| | $\lambda=0$ | $\lambda=1$ | $\lambda=2$ | $\lambda=3$ | $\lambda=0$ | $\lambda=1$ | $\lambda=2$ | $\lambda=3$ | |
| 000 | 0 | 6 | 3 | 9 | [1 1] | [1 1] | [1 -1] | [1 -1] | Odd subcarriers |
| 001 | 6 | 0 | 9 | 3 | [1 -1] | [1 -1] | [1 1] | [1 1] | Odd subcarriers |
| 010 | 3 | 9 | 6 | 0 | [1 -1] | [1 -1] | [1 1] | [1 1] | Even subcarriers |
| 011 | 4 | 10 | 7 | 1 | [1 1] | [1 1] | [1 1] | [1 1] | Even subcarriers |
| 100 | 2 | 8 | 5 | 11 | [1 1] | [1 1] | [1 1] | [1 1] | Odd subcarriers |
| 101 | 8 | 2 | 11 | 5 | [1 -1] | [1 -1] | [1 -1] | [1 -1] | Odd subcarriers |
| 110 | 10 | 4 | 1 | 7 | [1 -1] | [1 -1] | [1 -1] | [1 -1] | Even subcarriers |
| 111 | 9 | 3 | 0 | 6 | [1 1] | [1 1] | [1 -1] | [1 -1] | Even subcarriers |

Table 23 shows a mapping of Cyclic Shift Field in uplink-related DCI format to support dynamic pairing with signaled IFDMA indicator parameter signaling "IFDMA configured."

TABLE 23

| Cyclic Shift Field in uplink-related DCI format | $n_{DMRS,\lambda}^{(2)}$ | | | | $[w^{(\lambda)}(0)\ w^{(\lambda)}(1)]$ | | | | IFDMA Configuration |
|---|---|---|---|---|---|---|---|---|---|
| | $\lambda=0$ | $\lambda=1$ | $\lambda=2$ | $\lambda=3$ | $\lambda=0$ | $\lambda=1$ | $\lambda=2$ | $\lambda=3$ | |
| 000 | 0 | 6 | 3 | 9 | [1 1] | [1 1] | [1 -1] | [1 -1] | Even subcarriers |
| 001 | 6 | 0 | 9 | 3 | [1 -1] | [1 -1] | [1 1] | [1 1] | Even subcarriers |
| 010 | 3 | 9 | 6 | 0 | [1 -1] | [1 -1] | [1 1] | [1 1] | Odd subcarriers |
| 011 | 4 | 10 | 7 | 1 | [1 1] | [1 1] | [1 1] | [1 1] | Odd subcarriers |
| 100 | 2 | 8 | 5 | 11 | [1 1] | [1 1] | [1 1] | [1 1] | Even subcarriers |
| 101 | 8 | 2 | 11 | 5 | [1 -1] | [1 -1] | [1 -1] | [1 -1] | Even subcarriers |
| 110 | 10 | 4 | 1 | 7 | [1 -1] | [1 -1] | [1 -1] | [1 -1] | Odd subcarriers |
| 111 | 9 | 3 | 0 | 6 | [1 1] | [1 1] | [1 -1] | [1 -1] | Odd subcarriers |

In one embodiment, the present disclosure provides a method of transmitting a reference signal at a reduced peak to average power ratio while maintaining its identifiability among other reference signals. The method includes selecting a reference signal sequence of length L from a plurality of reference signal sequences of length L, wherein the plurality of reference signals of length L comprises at least one sequence equivalent to a sequence in one of Tables 7, 9, or 11.

In another embodiment, a method of multiplexing reference signals occupying different numbers of subcarriers is provided. The method includes determining a first reference signal sequence, wherein the values of the first reference signal sequence are selected from a subset of values of a second reference signal sequence, and transmitting the first reference signal sequence in a first set of subcarriers, wherein the first set of subcarriers is a subset of the subcarriers used to transmit the second sequence, and the values of the first and second sequences that are transmitted in the first set of subcarriers are the same.

In another embodiment, the first and second reference sequences are determined using a first and a second cyclic shift factor. In one embodiment, the first DMRS reference sequence is proportional to $e^{jD\ \alpha_1 n}$, wherein $$\alpha_1 = \frac{2\pi n_{cs,1}}{12}$$

is the first cyclic shift factor and $n_{cs,1} \in \{0, 1, \ldots, 11\}$ is given by equation (2); $n=0, 1, \ldots, M_{sc}^{RS}/D-1$. In another embodiment, the second DMRS reference sequence is proportional to $e^{j\alpha_2 n}$, wherein $$\alpha_2 = \frac{2\pi n_{cs,2}}{12}$$

is the second cyclic shift factor and $n_{cs,2} \in \{0, 1, \ldots, 11\}$ is given by equation (2), $n=0, 1, \ldots, M_{sc}^{SR}-1$. In another embodiment, D is a number of subcarriers used to transmit the second sequence divided by a number of subcarriers used to transmit the first sequence.

In another embodiment of the present disclosure, a method of multiplexing reference signals occupying different numbers of subcarriers is provided. The method includes determining a first reference signal sequence with length L, transmitting a subset of the reference signal sequence on a first subset of a set of L subcarriers, and transmitting zero magnitude signals on subcarriers of the set that are not in the first subset.

In another embodiment, a method of switching between reference signal sequences to either enhance multiplexing capacity or reduce required sequence transmission power is provided. The method includes receiving an indication selecting either a first or a second reference signal sequence type, wherein the first reference signal type comprises reference signals sequences that are transmitted on a first subset of a set of subcarriers and are orthogonal to a second reference signal transmitted on the entire set of subcarriers. The second reference signal type includes reference signals sequences that are transmitted on a first subset of a set of subcarriers and have a lower required transmission power metric than the first reference signal type. The method of this embodiment further includes transmitting a reference signal having the reference signal type in the first subset of the set of subcarriers.

In one embodiment, the set of base sequences of length 6 is given in Table 7. In one embodiment, the set of base sequences of length 18 is given in Table 9. In one embodiment, the set of base sequences of length 30 is given in Table 11

In another embodiment, a method of transmitting a reference signal at a reduced peak to average power ratio (or CM) while maintaining its identifiability among other reference signals is provided. The method includes constructing a sequence of QPSK symbols where the predetermined set of sequences includes the sequences the wireless device may transmit; and transmitting the sequence of QPSK symbols. In one embodiment, the sequence has a cubic metric of smaller than 2.0 and where the maximum cross correlation between the sequence and a predetermined set of sequences is at most 0.8.

In another embodiment, a method of transmitting demodulation reference signals in a wireless network is provided. The method includes determining a set of base sequences of one of the lengths 6 or 18 and 30, and deriving a demodulation reference signal sequence from the set of base sequences, time-multiplexing the demodulation reference signal sequence and user data in SC-OFDM symbols, receiving, from a wireless device, the multiplexed signal, receiving, by a network node, the demodulation reference signal, and performing channel estimation based on the demodulation reference signal. In one embodiment, the set of base sequences consists of 30 QPSK sequences.

In another embodiment, a method of dynamically switching the pairing of multiple users from one subframe to another subframe to improve multi-user pairing probability is provided. The method includes providing an indication from a set of indications identifying at least one of a cyclic shift, which subcarriers should be used for transmission, and an orthogonal cover sequence. In some embodiments, the indication from a set of indications is an indication of using IFDMA for DMRS transmission. The set of indications include at least one of: a first indication that a wireless device should transmit on all subcarriers of a set of subcarriers and using a cyclic shift value from the set of cyclic shift values $\{0, 3, 6, 9\}$; a second indication that a wireless device should transmit on a first subset of a set of subcarriers using an orthogonal cover sequence and a cyclic shift value from one of the sets of cyclic shift values among two sets of cyclic shift values $\{1, 7, 4, 10\}$ and $\{2, 5, 8, 11\}$; and a third indication that a wireless device should transmit on a second subset of a set of subcarriers using the orthogonal cover sequence and a cyclic shift value from the set of cyclic shift values not used by another wireless device transmitting on the first subset of the set of subcarriers.

In one embodiment, a wireless device receives is semi-statically configured by higher layers to either use the existing table shown in Table 4 and one of the new tables shown in Tables 15-23. This configuration could be a binary higher layer configured parameter. Depending on the value of the binary higher layer configured parameter, the wireless device will interpret the 3 bits received in the Cyclic Shift filed using either Table 4 or one of Tables 15-23.

Figure 11:
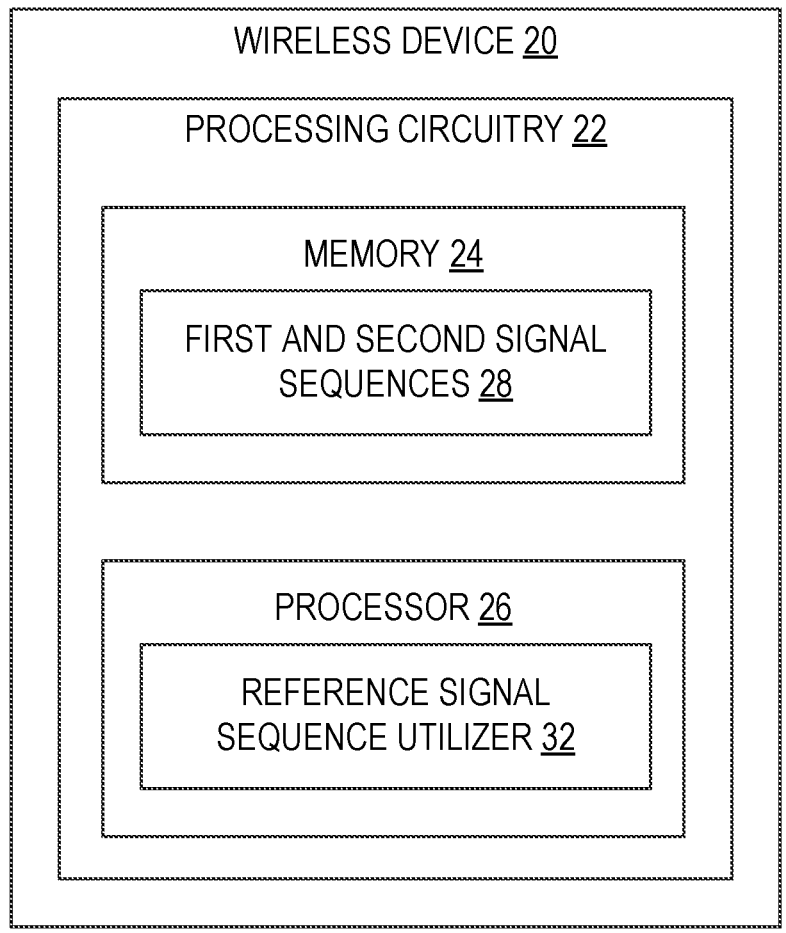
FIG. 11 illustrates an exemplary wireless device for determining a reference signal sequence at a reduced peak to average power ratio constructed in accordance with principles described herein.

FIG. 11 is an exemplary wireless device 20 configured to use a reference signal sequence at a predetermined or reduced peak to average power ratio constructed in accordance with principles described herein. Wireless device 20 includes processing circuitry 22, which includes memory 24 in communication with processor 26. Memory 24 is configured to store first signal sequences and second signal sequences 28. Memory 34 has instructions that, when executed by processor 26, configure processor 26, and, specifically, reference signal sequence utilizer 32, to use the reference signal sequence at the predetermined power level. A first set of signal sequences has been identified, the first set of signal sequences having at least one of a peak to average power ratio (PAPR) and cubic metric (CM) below a corresponding threshold value. A second set of signal sequences has been identified as the first set or a subset of the first set, wherein, optionally, the second set has been identified by eliminating sequences of the first set of candidate signal sequences having the highest cross correlation magnitude statistics, wherein, optionally the eliminating is iterative. The second set of signal sequences has been designated as the reference signal sequence. In addition to a traditional processor and memory, processing circuitry 22 may include integrated circuitry for processing and/or control, e.g., one or more processors and/or processor cores and/or FPGAs (Field Programmable Gate Array) and/or ASICs (Application Specific Integrated Circuitry).

Processing circuitry 22 may include and/or be connected to and/or be configured for accessing (e.g., writing to and/or reading from) memory 24, which may comprise any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 24 may be configured to store code executable by control circuitry and/or other data, e.g., data pertaining to communication, e.g., configuration and/or address data of nodes, etc. Processing circuitry 22 may be configured to control any of the methods described herein and/or to cause such methods to be performed. e.g., by processor 26. Corresponding instructions may be stored in the memory 24, which may be readable and/or readably connected to the processing circuitry 22. In other words, processing circuitry 22 may include a controller, which may comprise a microprocessor and/or microcontroller and/or FPGA (Field-Programmable Gate Array) device and/or ASIC (Application Specific Integrated Circuit) device. It may be considered that processing circuitry 22 includes or may be connected or connectable to memory, which may be configured to be accessible for reading and/or writing by the controller and/or processing circuitry 22.

In one embodiment, the values of the first set of signal sequences and the second set of signal sequences are the same. In another embodiment, the first set of signal sequences is adapted to be transmitted in a first set of subcarriers and the second set of signal sequences is adapted to be transmitted in a second set of subcarriers, where processor 26 is further configured to multiplex the first set of signal sequences and the second set of signal sequences. In another embodiment, the second set of subcarriers is a subset of subcarriers used to transmit the first set of signal sequences.

In another embodiment, the first set of sequences is determined using a first cyclic shift factor and the second set of sequences is determined using a second cyclic shift factor. In some embodiments, the first DMRS reference sequence is proportional to $e^{jD\alpha n}$, wherein $$\alpha_1 = \frac{2\pi n_{cs,1}}{12}$$

is the first cyclic shift factor and $n_{cs,1} \in \{0, 1, \ldots, 11\}$ is given by equation (2); n=0, 1, ..., $M_{sc}^{RS}/D-1$, where D is a number of subcarriers used to transmit the second set of signal sequences divided by a number of subcarriers used to transmit the first set of signal sequences. In some embodiments, the second the second DMRS reference sequence is proportional to $e^{j\alpha n}$, wherein $$\alpha_2 = \frac{2\pi n_{cs,2}}{12}$$

is the second cyclic shift factor and $n_{cs,2} \in \{0, 1, \ldots, 11\}$ is given by equation (2), n=0, 1, ..., $M_{sc}^{RS}-1$.

In another embodiment, processor 26 is further configured to construct a sequence of quadrature phase shifting keying (QPSK) symbols and communications interface 36 is configured to transmit the sequence of QPSK symbols. In another embodiment, the sequence of QPSK symbols has a cubic metric less than a predetermined threshold. In another embodiment, a maximum cross correlation between the sequence of QPSK symbols and a predetermined set of sequences is less than a predetermined threshold.

Figure 12:
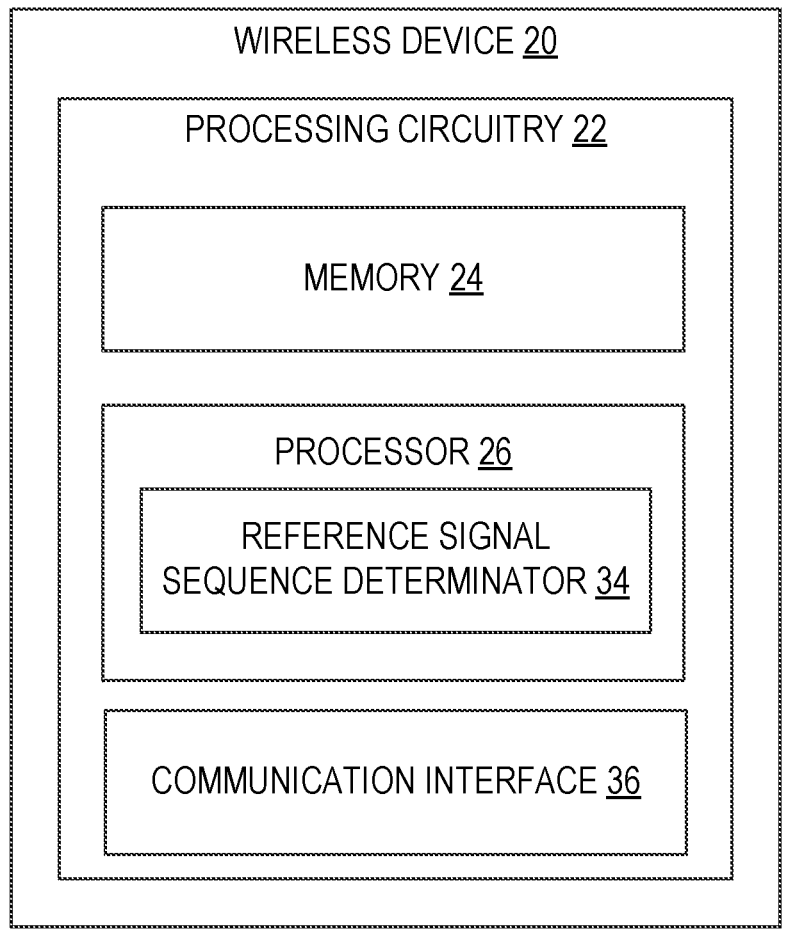
FIG. 12 illustrates an alternate embodiment of a wireless device for determining references signals occupying a different number of subcarriers in accordance with principles described herein.

FIG. 12 is an alternate embodiment of a wireless device 20 for determining references signals occupying a different number of subcarriers in accordance with principles described herein. Specifically, wireless device 20 is configured to multiplex reference signals occupying different numbers of subcarriers. Wireless device 20 includes processing circuitry 22, which includes memory 24 in communication with processor 26. Memory 24 memory includes instructions that, when executed by processor 26, configure processor 26, and specifically, reference signal sequence determinator 34, to determine a first reference signal sequence with length L. Communications interface 37 of wireless device 20 is configured to transmit a subset of the first reference signal sequence on a first subset of a set of L subcarriers, and transmit zero magnitude signals on subcarriers that are not in the first subset of subcarriers.

Figure 13:
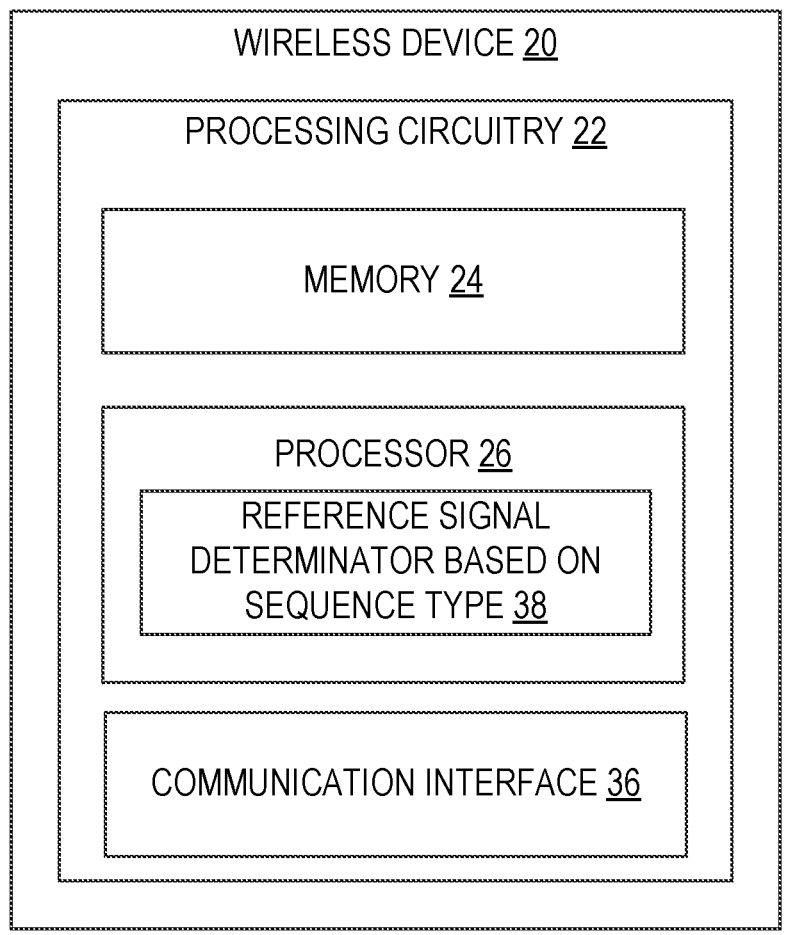
FIG. 13 illustrates an exemplary wireless device for switching between reference signal sequences constructed in accordance with principles described herein.

FIG. 13 is an exemplary wireless device 20 for switching between reference signal sequences constructed in accordance with principles described herein. Specifically, wireless device 20 is configured to switch between reference signal sequences to one of enhance multiplexing capacity or reduce required sequence transmission power. Wireless device 20 includes a communications interface 36 configured to receive an indication selecting a reference signal type from one of a first or a second reference signal sequence type, and processing circuitry 22 including memory 24 in communications with a processor. 26, memory 24 having instructions that, when executed by processor 26, configure processor 26, and specifically, reference signal determinator 38, to determine a reference signal based on the selected reference signal type. Communications interface 36 is further configured to transmit the determined reference signal.

In one embodiment, the first reference signal type includes reference signals sequences that are transmitted on a first subset of a set of subcarriers and that are orthogonal to a second reference signal transmitted on the set of subcarriers and the second reference signal type includes reference signals sequences that are transmitted on the first subset of a set of subcarriers and have a lower required transmission power metric than the first reference signal type.

Figure 14:
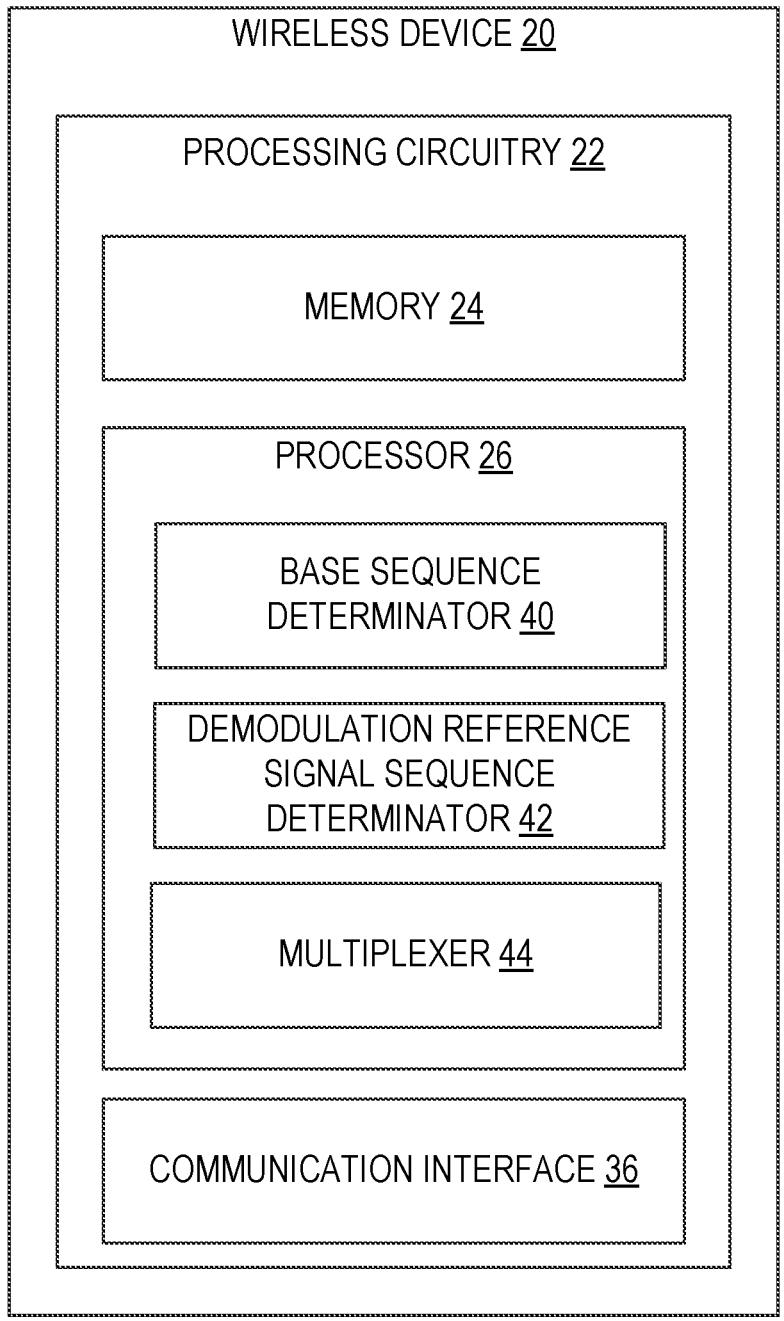
FIG. 14 illustrates an exemplary wireless device for transmitting demodulation reference signals constructed in accordance with principles described herein.

FIG. 14 is an exemplary wireless device 20 for transmitting demodulation reference signals in a wireless network constructed in accordance with principles described herein. Wireless device 20 includes processing circuitry 22 which includes a memory 24 in communications with a processor 26. Memory 24 has instructions that, when executed by processor 26, configure processor 26, and specifically, base sequence determinator 40, to determine a set of base sequences. Processor 26, and specifically, demodulation reference signal sequence determinator 42, is configured to derive a demodulation reference signal sequence from the set of base sequences. Processor 26 and specifically, multiplexer 44, is configured to time multiplex the demodulation reference signal sequence and user data in single carrier-orthogonal frequency division multiplexing (SC-OFDM) symbols. Wireless device 20 also includes a communications interface 36 configured to transmit the multiplexed signal.

Figure 15:
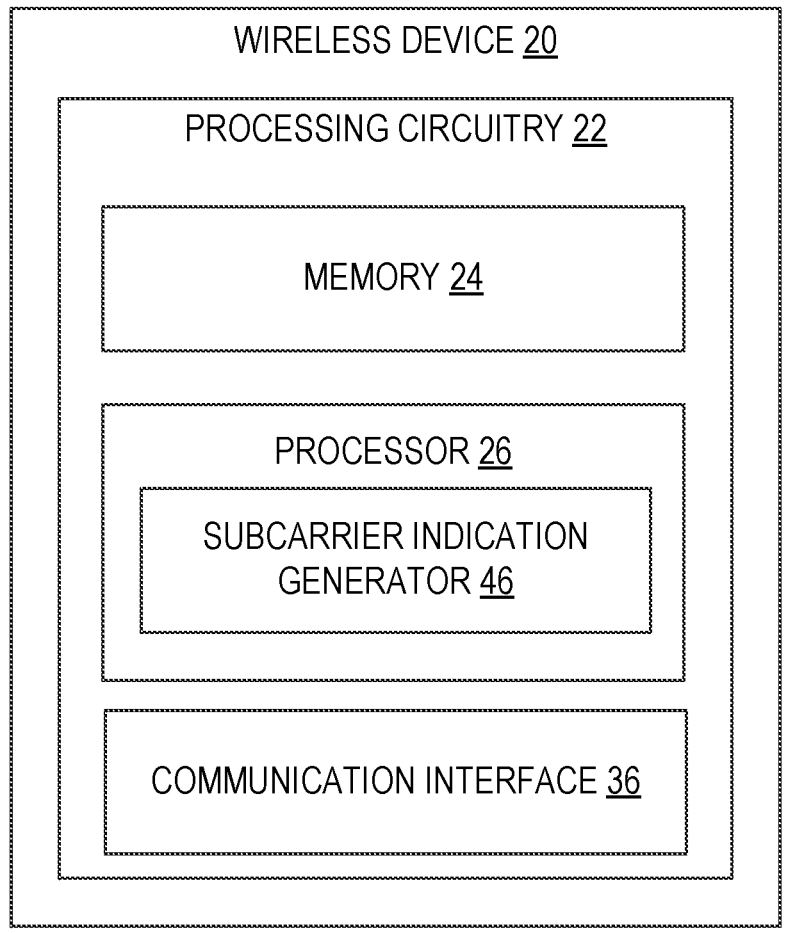
FIG. 15 illustrates an exemplary wireless device for identifying optimal subcarriers for users to improve multi-user pairing probability constructed in accordance with principles described herein.

FIG. 15 is an exemplary wireless device 20 for identifying optimal subcarriers for users to improve multi-user pairing probability constructed in accordance with principles described herein. Specifically, wireless device 20 is configured to dynamically switch a pairing of multiple users from one subframe to another subframe to improve multi-user pairing probability. Wireless device 20 includes processing circuitry 22, which includes a memory 24 in communications with a processor 26. Wireless device 20 also includes communications interface 36. Memory 24 includes instructions that, when executed by processor 26, configure processor 26, and specifically subcarrier indication generator 46, provide an indication from a set of indications identifying at least one of a cyclic shift, which subcarriers should be used for transmission, and an orthogonal cover sequence. In some embodiments, this indication is an indication of using IFDMA for DMRS transmission.

In one embodiment, the set of indications includes at least one of a first indication that wireless device 20 should transmit on all subcarriers of a set of subcarriers, a second indication that wireless device 20 should transmit on a first subset of the set of subcarriers, and a third indication that wireless device 20 should transmit on a second subset of the set of subcarriers.

In one embodiment, communications interface 36 of wireless device 20 transmits on all subcarriers of a set of subcarriers using a cyclic shift value from the set of cyclic shift values {0, 3, 6, 9}.

In another embodiment, communications interface 36 of wireless device 20 transmits on the first subset of the set of subcarriers using an orthogonal cover sequence and a cyclic shift value from one of the sets of cyclic shift values among two sets of cyclic shift values {1, 7, 4, 10} and {2, 5, 8, 11}.

In another embodiment, communications interface 36 of wireless device 20 transmits on the second subset of the set of subcarriers using an orthogonal cover sequence and a cyclic shift value from the set of cyclic shift values not used by another wireless device transmitting on the first subset of the set of subcarriers, wherein the second subset does not contain subcarriers in the first subset.

Figure 16:
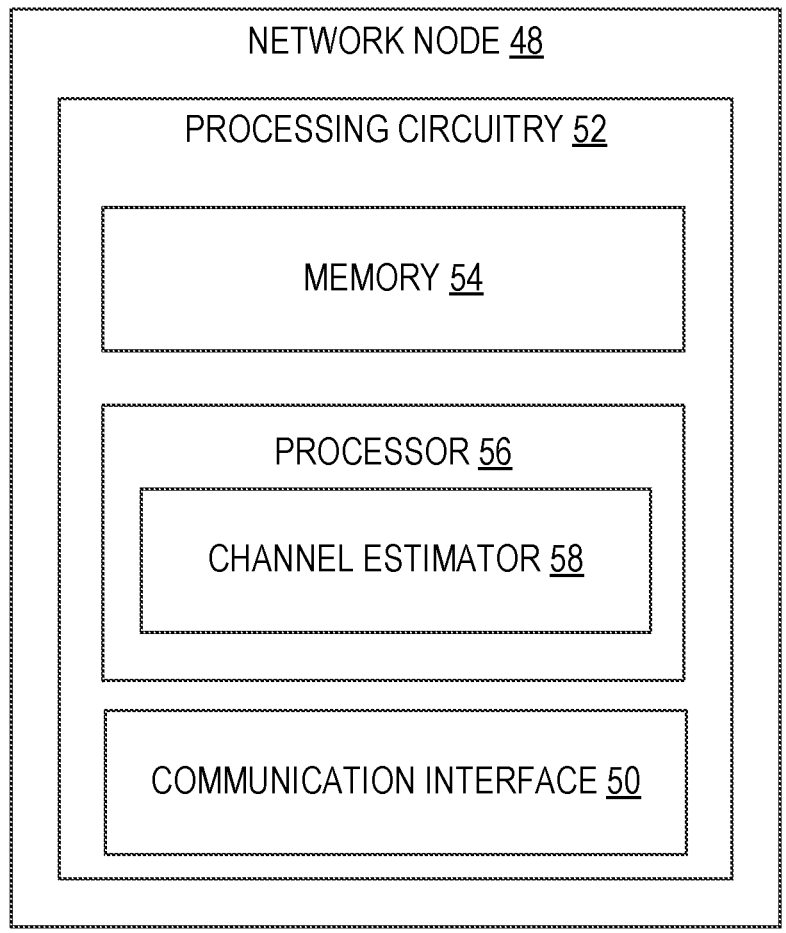
FIG. 16 illustrates an exemplary network node configured to utilize a reference signal sequence received from a wireless device for channel estimation constructed in accordance with principles described herein.

FIG. 16 is an exemplary network node 48 configured to utilize a demodulation reference signal sequence received from wireless device 20 for channel estimation constructed in accordance with principles described herein. Network node 48 includes a communications interface 50 configured to receive, from wireless device 20, a demodulated reference signal, the demodulated reference signal derived from a set of base sequences, the demodulated reference signal and user data time-multiplexed in single carrier-orthogonal frequency division multiplexing (SC-OFDM) symbols. Network node 48 also includes processing circuitry 52 including a memory 54 in communication with a processor 56. Memory 54 includes instructions that, when executed by processor 56, and specifically channel estimator 58, configure processor 56 to perform channel estimation based on the demodulation reference signal.

In addition to a traditional processor and memory, processing circuitry 52 may include integrated circuitry for processing and/or control, e.g., one or more processors and/or processor cores and/or FPGAs (Field Programmable Grate Array) and/or ASICs (Application Specific Integrated Circuitry).

Processing circuitry 52 may include and/or be connected to and/or be configured for accessing (e.g., writing to and/or reading from) memory 54, which may comprise any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 54 may be configured to store code executable by control circuitry and/or other data, e.g., data pertaining to communication, e.g., configuration and/or address data of nodes, etc. Processing circuitry 52 may be configured to control any of the methods described herein and/or to cause such methods to be performed, e.g., by processor 56. Corresponding instructions may be stored in the memory 54, which may be readable and/or readably connected to the processing circuitry 52. In other words, processing circuitry 52 may include a controller, which may comprise a microprocessor and/or microcontroller and/or FPGA (Field-Programmable Gate Array) device and/or ASIC (Application Specific Integrated Circuit) device. It may be considered that processing circuitry 52 includes or may be connected or connectable to memory, which may be configured to be accessible for reading and/or writing by the controller and/or processing circuitry 52.

Figure 17:
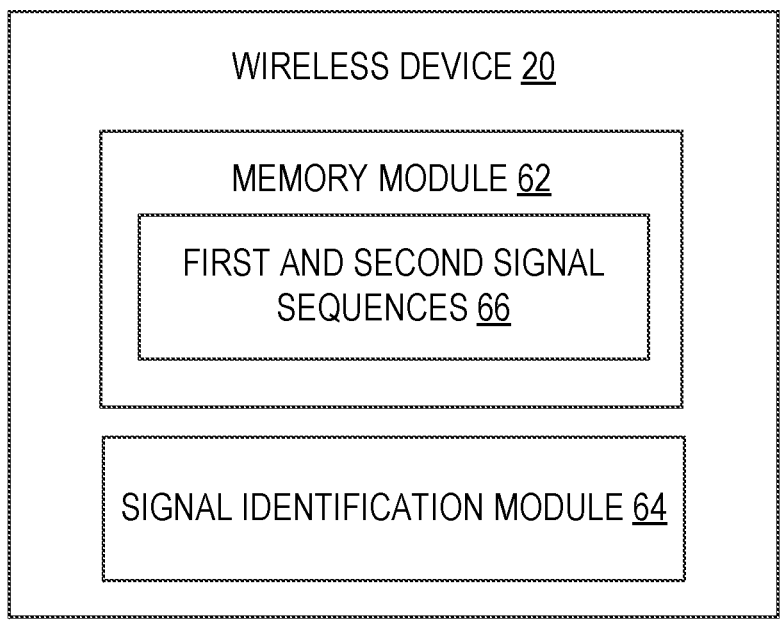
FIG. 17 illustrates yet another exemplary wireless device for determining a reference signal sequence at a reduced power level constructed in accordance with principles described herein.

FIG. 17 is yet another exemplary wireless device 20 for determining a reference signal sequence at a reduced peak to average power ratio constructed in accordance with principles described herein. Wireless device 20 includes a memory module 62 configured to store first signal sequences and second signal sequences.

Wireless device 20 also includes a signal identification module 64 configured to identify a first set of signal sequences from the stored first signal sequences having at least one of a peak to average power ratio (PAPR) and cubic metric (CM) below a corresponding threshold value, and to identify a second set of signal sequences from the stored second signal sequences by iteratively eliminating sequences of the first set of signal sequences having the highest cross correlation magnitude statistics, the second set being a subset of the first set. Signal identification module 64 is also configured to designate the second set of signal sequences as the reference signal sequence.

Figure 18:
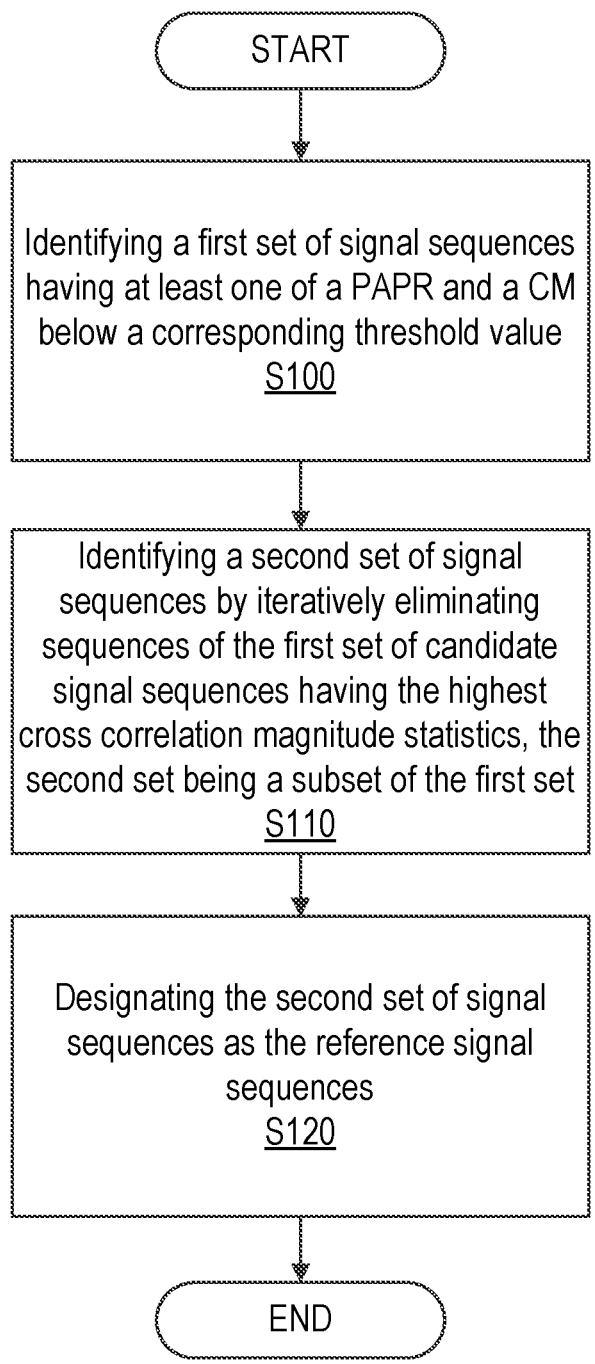
FIG. 18 is a flowchart of an exemplary process in a wireless device for using a reference signal sequence at a reduced power level constructed in accordance with principles described herein.

FIG. 18 is a flowchart of an exemplary process for using a reference signal sequence at a reduced peak to average power ratio constructed in accordance with principles described herein. Such a process may be performed, for example, by processing circuitry 22 in which, in one embodiment, memory 24 stores executable program code that, when executed by processor 26, causes the processing circuitry to perform the functions described herein. The process includes using, by processor 26, and, specifically, reference signal sequence utilizer 32 of wireless device 20, a reference signal sequence at a predetermined power level (Block S100). A first set of signal sequences has been identified, the first set of signal sequences having at least one of a peak to average power ratio (PAPR) and cubic metric (CM) below a corresponding threshold value (Block S110). A second set of signal sequences has been identified as the first set or a subset of the first set, wherein, optionally, the second set has been identified by eliminating sequences of the first set of candidate signal sequences having the highest cross correlation magnitude statistics, wherein, optionally the eliminating is iterative (Block S120). The second set of signal sequences has been designated as the reference signal sequence (Block S130).

In one embodiment, values of the first set of signal sequences and the second set of signal sequences are the same. In one embodiment, the first set of signal sequences is adapted to be transmitted, by communications interface 36, in a first set of subcarriers and the second set of signal sequences is adapted to be transmitted, by communications interface 36, in a second set of subcarriers where processor 26, and, specifically, multiplexer 44 is configured to multiplex the first set of signal sequences and the second set of signal sequences.

In one embodiment, the second set of subcarriers is a subset of subcarriers used to transmit the first set of signal sequences. In one embodiment, the first set of signal sequences is determined, by processor 26, using a first cyclic shift factor and the second set of signal sequences is determined using a second cyclic shift factor. In one embodiment, a first demodulation reference signal (DMRS) reference sequence is proportional to $e^{j D \alpha n}$, wherein $$\alpha_1 = \frac{2\pi n_{cs,1}}{12}$$

and is the first cyclic shift factor and $n_{cs,1} \in \{0, 1, \ldots, 11\}$ is given by $n_{cs,\lambda} = (n_{DMRS}^{(1)} + n_{DMRS\lambda}^{(2)} + n_{PN}(n_s)) \bmod 12$, $n=0, 1, \ldots, M_{sc}^{RS}/D-1$, where D is a number of subcarriers used to transmit the second set of signal sequences divided by a number of subcarriers used to transmit the first set of signal sequences. In some embodiments, the second the second DMRS reference sequence is proportional to $e^{j\alpha n}$, wherein $$\alpha_2 = \frac{2\pi n_{cs,2}}{12}$$

is the second cyclic shift factor and $n_{cs,2} \in \{0, 1, \ldots, 11\}$ is given by equation (2), $n=0, 1, \ldots, M_{sc}^{RS}-1$.

In one embodiment, processor 26 constructs a sequence of quadrature phase shifting keying (QPSK) symbols and transmitting the sequence of QPSK symbols. In one embodiment, the sequence of QPSK symbols has a cubic metric less than a predetermined threshold. In one embodiment, a maximum cross correlation between the sequence of QPSK symbols and a predetermined set of sequences is less than a predetermined threshold.

Figure 19:
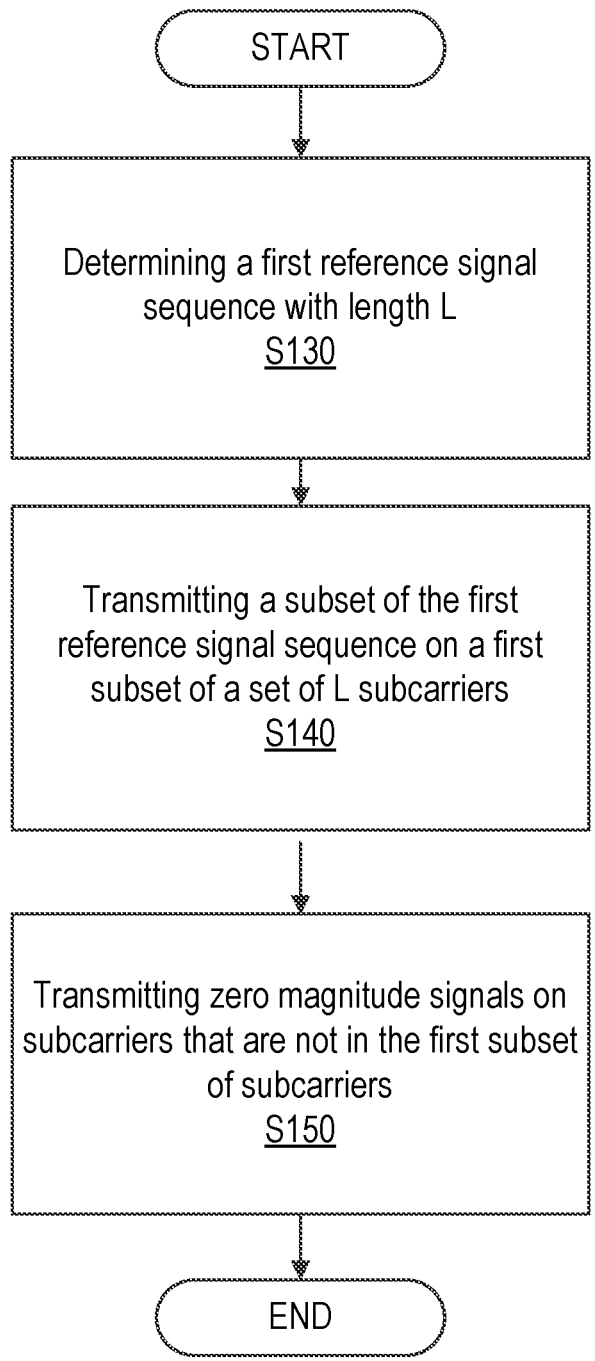
FIG. 19 is a flowchart of an alternate process in a wireless device for determining references signals occupying a different number of subcarriers in accordance with principles described herein.

FIG. 19 is a flowchart of an alternate process in a wireless device for determining references signals occupying a different number of subcarriers in accordance with principles described subset of the first reference signal. Such a process may be performed, for example, by processing circuitry 22 in which, in one embodiment, memory 24 stores executable program code that, when executed by processor 26, causes the processing circuitry to perform the functions described herein. Initially, a first reference signal sequence of length L is determined by processor 26 (Block S130). A subset of the first reference signal sequence on a first subset of a set of L subcarriers is transmitted by communications interface 36 (Block S140). Communications interface 36 transmits zero magnitude signals on subcarriers that are not in the first subset of subcarriers (Block S150).

Figure 20:
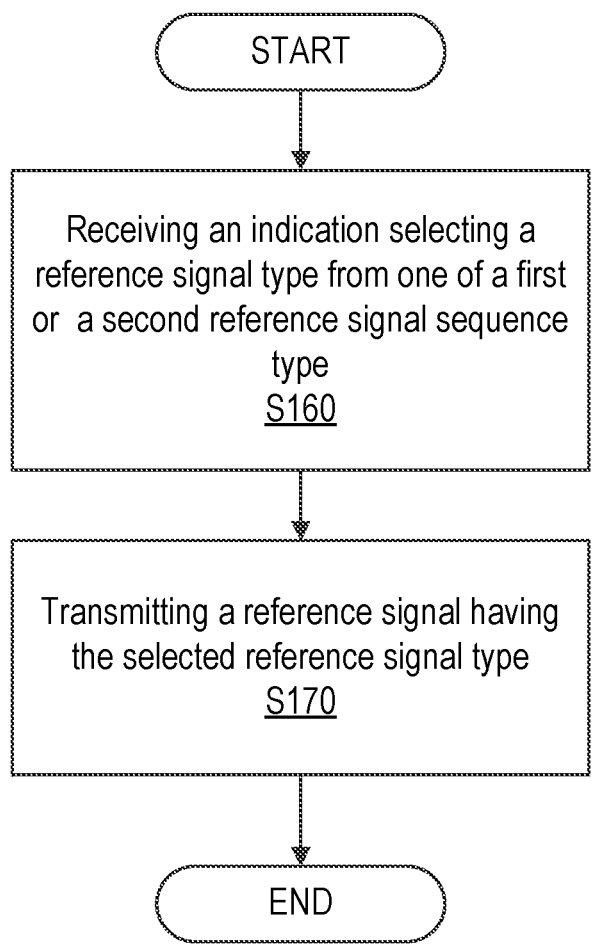
FIG. 20 is a flowchart of a process in a wireless device for switching between reference signal sequences constructed in accordance with principles described herein.

FIG. 20 is a flowchart of a process in a wireless device 20 for switching between reference signal sequences constructed in accordance with principles described herein. Such a process may be performed, for example, by processing circuitry 22 in which, in one embodiment, memory 24 stores executable program code that, when executed by processor 26, causes the processing circuitry to perform the functions described herein. Communications interface 36 receives an indication selecting a reference signal type from one of a first or a second reference signal sequence type (Block S160). Communications interface 36 then transmits a reference signal having the selected reference signal type (Block S170).

In one embodiment, the first reference signal type includes reference signals sequences that are transmitted on a first subset of a set of subcarriers and that are orthogonal to a second reference signal transmitted on the set of subcarriers and the second reference signal type includes reference signals sequences that are transmitted on the first subset of a set of subcarriers and have a lower required transmission power metric than the first reference signal type.

Figure 21:
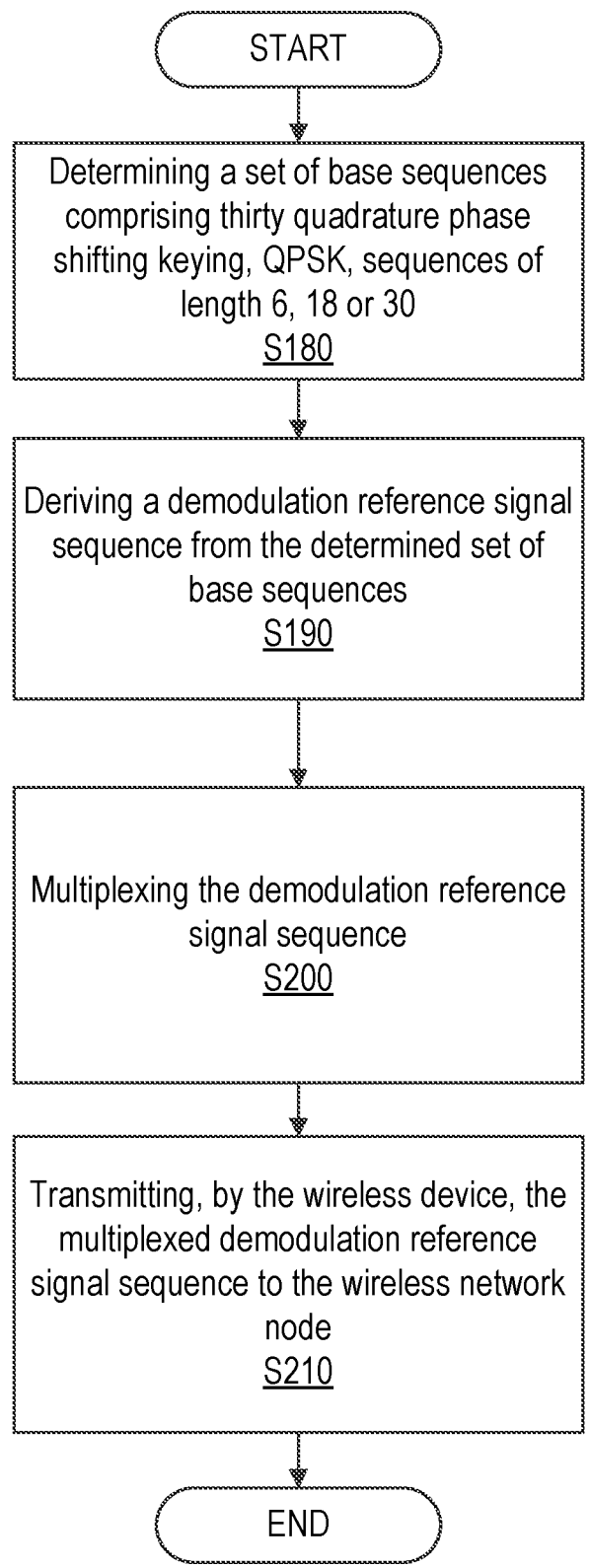
FIG. 21 is a flowchart of a process in a wireless device for transmitting demodulation reference signals constructed in accordance with principles described herein.

FIG. 21 is a flowchart of a process in a wireless device 20 for transmitting demodulation reference signals constructed in accordance with principles described herein. Such a process may be performed, for example, by processing circuitry 22 in which, in one embodiment, memory 24 stores executable program code that, when executed by processor 26, causes the processing circuitry to perform the functions described herein. Processor 26 and, specifically, base sequence determinator 40, determines a set of basic sequences (Block S180). In one or more embodiments, the determining includes determining a set of base sequences including thirty quadrature phase shifting keying. QPSK, sequences of length 6, 18 or 30. In one or more embodiments, the set of thirty base sequences has low cubic metric and cross correlation when compared to other base sequences as discussed herein, and is given by:

$$\bar{r}_{u,v}(n) = e^{j\varphi(n)\pi/4}, 0 \le n \le M_{sc}^{RS}-1; M_{sc}^{RS} \in \{6,18,30\};$$
$$v=0, u=0,1,\ldots,29.$$

wherein $\varphi(n)$ is given in the Table 7, discussed herein. Processor 26, and, specifically, demodulation references signal sequence determinator 42 derives a demodulation reference signal sequence from the set of base sequences (Block S190). Processor 26, and, specifically, multiplexer 44 time multiplexes the demodulation reference signal sequence and user data in SC-OFDM symbols (Block S200). In one or more embodiments, the multiplexing includes multiplexing the demodulation reference signal sequence and user data. Communications interface 36 transmits the multiplexed signal (Block S210). In one embodiment, the set of base sequences comprises 30 quadrature phase shifting keying (QPSK) sequences. In one or more embodiments, communication interface 36 transmits the demodulation reference signal sequence together with user data to wireless network node 48.

Figure 22:
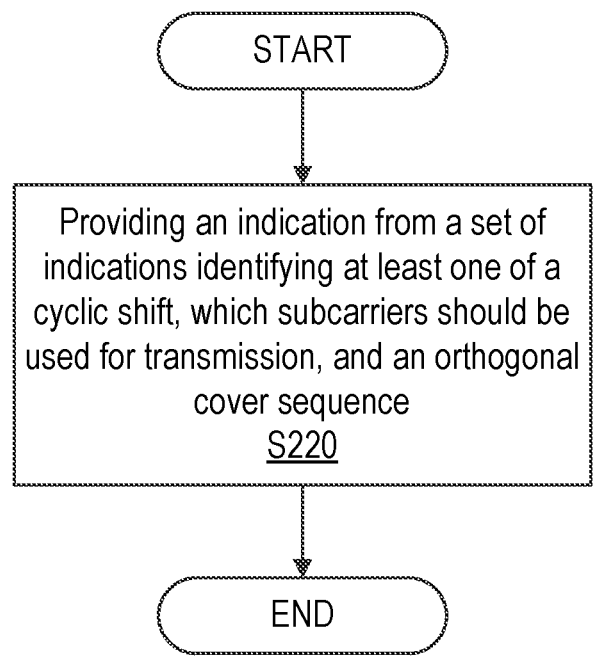
FIG. 22 is a flowchart of a process in a wireless device for identifying optimal subcarriers for users to improve multi-user pairing probability constructed in accordance with principles described herein.

FIG. 22 is a flowchart of a process in a wireless device 20 for identifying optimal subcarriers for users to improve multi-user pairing probability constructed in accordance with principles described herein. Such a process may be performed, for example, by processing circuitry 22 in which, in one embodiment, memory 24 stores executable program code that, when executed by processor 26, causes the processing circuitry to perform the functions described herein. Processor 26, and, specifically, subcarrier indication generator 46, provides an indication from a set of indications identifying at least one of a cyclic shift, which subcarriers should be used for transmission, and an orthogonal cover sequence (Block S220). In some embodiments, this indication is an indication of using IFDMA for DMRS transmission. In one embodiment, the set of indications includes a first indication that wireless device 20 should transmit on all subcarriers of a set of subcarriers. In another embodiment, the set of indications includes a second indication that wireless device 20 should transmit on a first subset of the set of subcarriers. In another embodiment, the set of indications includes a third indication that wireless device 20 should transmit on a second subset of the set of subcarriers.

In one embodiment, communications interface 36 of wireless device 20 transmits on all subcarriers of a set of subcarriers using a cyclic shift value from the set of cyclic shift values $\{0, 3, 6, 9\}$. In one embodiment, communications interface 36 of wireless device 20 transmits on the first subset of the set of subcarriers using an orthogonal cover sequence and a cyclic shift value from one of the sets of cyclic shift values among two sets of cyclic shift values $\{1, 7, 4, 10\}$ and $\{2, 5, 8, 11\}$. In one embodiment, communications interface 36 of wireless device 20 transmits on the second subset of the set of subcarriers using the orthogonal cover sequence and a cyclic shift value from the set of cyclic shift values not used by another wireless device transmitting on the first subset of the set of subcarriers, wherein the second subset does not contain subcarriers in the first subset.

Figure 23:
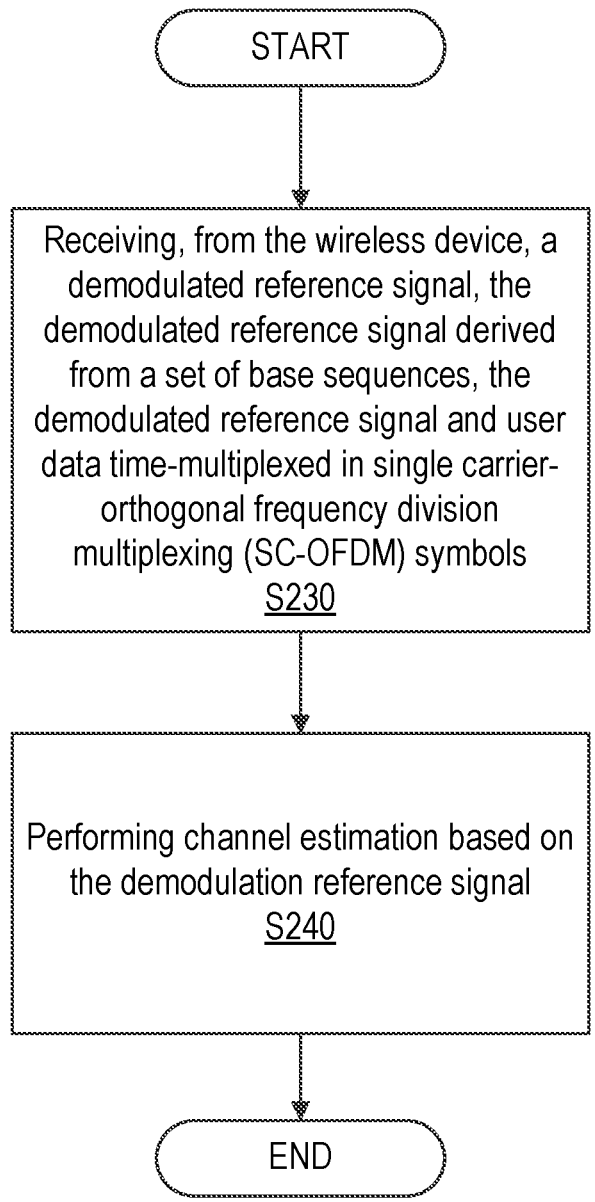
FIG. 23 is a flowchart of an exemplary process performed by a network node to utilize a demodulation reference signal sequence received from a wireless device for channel estimation constructed in accordance with principles described herein.

FIG. 23 is a flowchart of an exemplary process performed by network node 48 to utilize a demodulation reference signal sequence received from wireless device 20 for channel estimation constructed in accordance with principles described herein. The communications interface 50 of network node 48 receives, from wireless device 20, a demodulated reference signal, the demodulated reference signal derived from a set of base sequences, the demodulated reference signal and user data time-multiplexed in single carrier-orthogonal frequency division multiplexing (SC-OFDM) symbols (Block S230). Memory 54 of network node 48 includes instructions that, when executed by processor 56, and specifically channel estimator 58, configure processor 56 to perform channel estimation based on the demodulation reference signal (Block S240).

Figure 24:
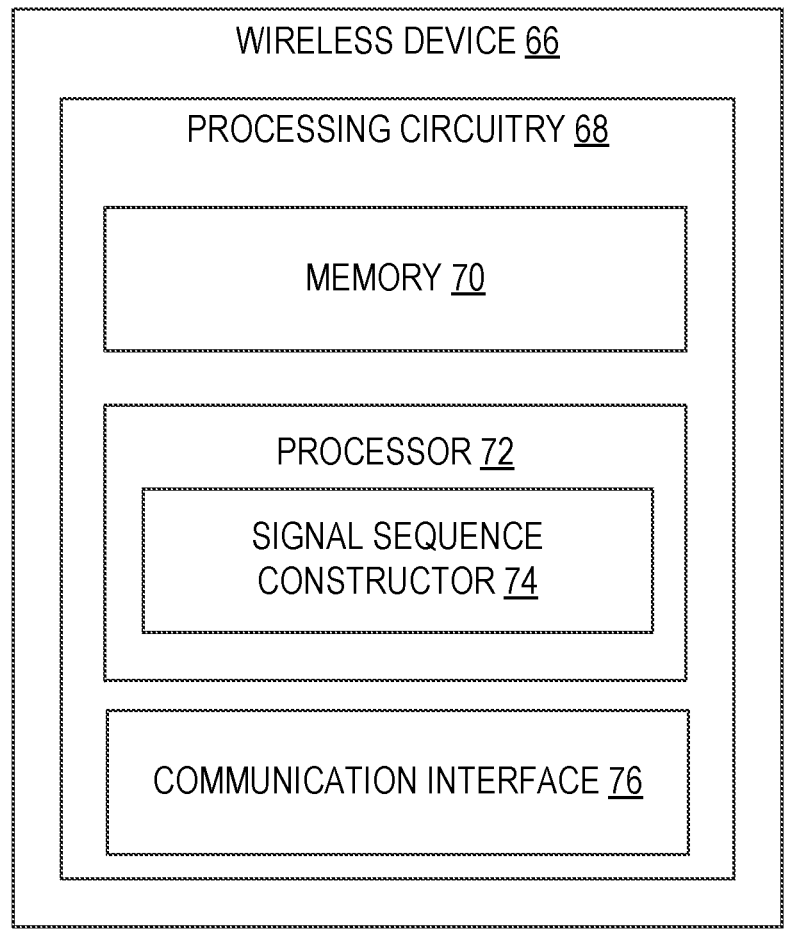
FIG. 24 is an exemplary wireless device configured to transmit a reference signal at a reduced power level while maintaining the reference signal's identifiability among other reference signals in accordance with principles described herein.

FIG. 24 is an exemplary wireless device 66 configured to transmit a reference signal at a reduced power level while maintaining the reference signal's identifiability among other reference signals. Wireless device 66 includes processing circuitry 68, which includes a memory 70 in communication with a processor 72. Memory 70 includes instructions that, when executed by processor 72, configure processor 72, and, specifically, signal sequence constructor 74, to construct a sequence of quadrature phase shifting keying (QPSK) symbols, where the sequence has a cubic metric less than a first predefined threshold, and where a maximum cross correlation between the sequence and a predetermined set of sequences is less than a second predefined threshold, where the predetermined set of sequences comprises sequences the wireless device may transmit. Wireless device 66 also has a communications interface 76 configured to transmit the sequence of QPSK symbols. In addition to a traditional processor and memory, processing circuitry 68 may include integrated circuitry for processing and/or control, e.g., one or more processors and/or processor cores and/or FPGAs (Field Programmable Gate Array) and/or ASICs (Application Specific Integrated Circuitry).

Processing circuitry 68 may include and/or be connected to and/or be configured for accessing (e.g., writing to and/or reading from) memory 70, which may comprise any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 70 may be configured to store code executable by control circuitry and/or other data, e.g., data pertaining to communication, e.g., configuration and/or address data of nodes, etc. Processing circuitry 68 may be configured to control any of the methods described herein and/or to cause such methods to be performed, e.g., by processor 72. Corresponding instructions may be stored in the memory 70, which may be readable and/or readably connected to the processing circuitry 68. In other words, processing circuitry 68 may include a controller, which may comprise a microprocessor and/or microcontroller and/or FPGA (Field-Programmable Gate Array) device and/or ASIC (Application Specific Integrated Circuit) device. It may be considered that processing circuitry 68 includes or may be connected or connectable to memory, which may be configured to be accessible for reading and/or writing by the controller and/or processing circuitry 68.

Figure 25:
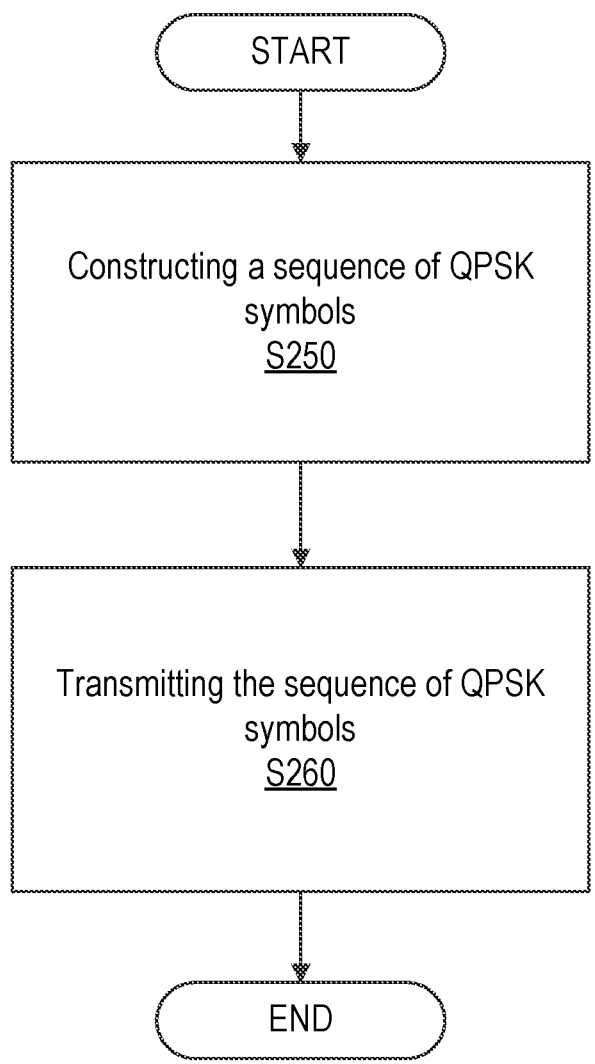
FIG. 25 is a flowchart of an exemplary process performed by a wireless device to transmit a reference signal at a reduced power level while maintaining the reference signal's identifiability among other reference signals in accordance with principles described herein.

FIG. 25 is a flowchart of an exemplary process performed by wireless device 66 to transmit a reference signal at a reduced power level while maintaining the reference signal's identifiability among other reference signals. Such a process may be performed, for example, by processing circuitry 68 in which, in one embodiment, memory 70 stores executable program code that, when executed by processor 72, causes the processing circuitry to perform the functions described herein. The process includes constructing, by processor 72 of wireless device 66, a sequence of quadrature phase shifting keying (QPSK) symbols (Block S250), where the sequence has a cubic metric less than a first predefined threshold, and where a maximum cross correlation between the sequence and a predetermined set of sequences is less than a second predefined threshold, where the predetermined set of sequences comprises sequences a wireless device may transmit. The process further includes transmitting, by communications interface 76 of wireless device 66, the sequence of QPSK symbols (Block S260).

Figure 26:
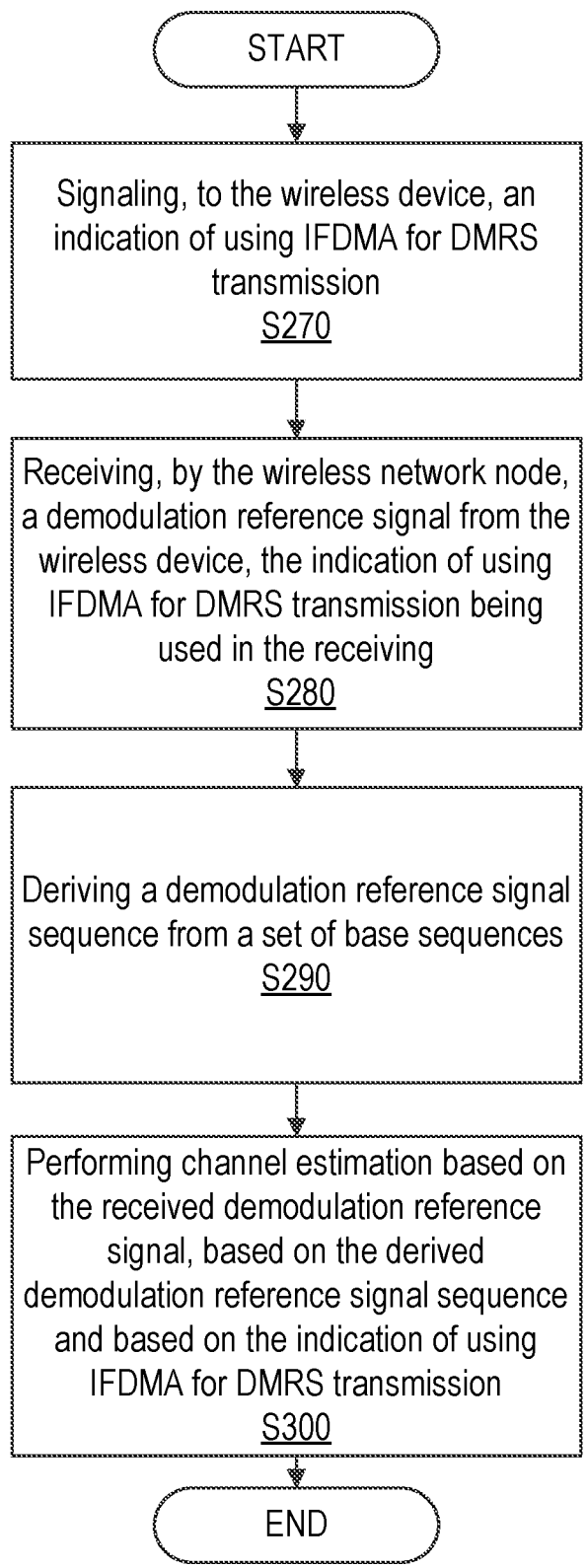
FIG. 26 is a flow chart of an exemplary process performed by the network node in accordance with the principles described herein.

FIG. 26 is an exemplary flow chart for performing channel estimation in accordance with the principles described herein. Processing circuitry 52 is configured to signal, to wireless device 20, an indication of using IFDMA for DMRS transmission, as described herein (Block S270). Processing circuitry 52 is configured to receiving, by wireless network node 48, a demodulation reference signal from wireless device 20, as described herein (Block S280). In one or more embodiments, the indication of using IFDMA for DMRS transmission is used in the receiving. Processing circuitry 52 is configured to derive a demodulation reference signal sequence from a set of base sequences, as described herein (Block S290). Processing circuitry 52 is configured to perform channel estimation based on the received demodulation reference signal, based on the derived demodulation reference signal sequence and based on the indication of using IFDMA for DMRS transmission, as described herein (Block S300).

Figure 27:
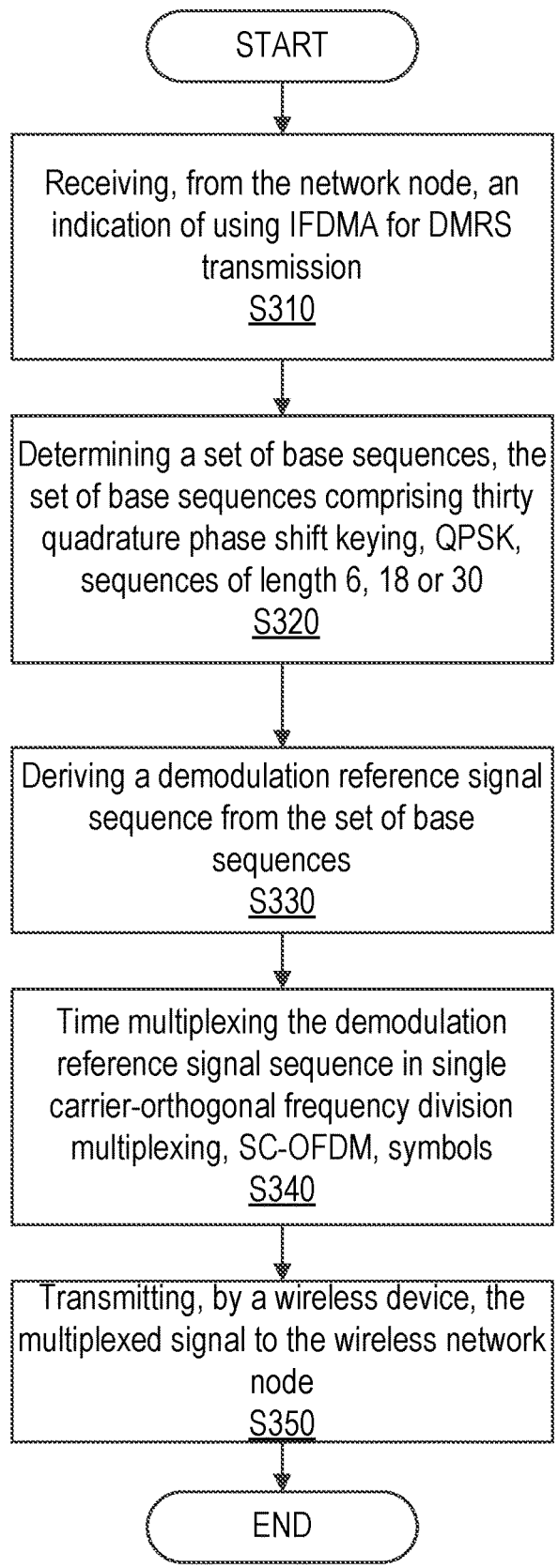
FIG. 27 is a flow chart of an exemplary process performed by the wireless device in accordance with the principles described herein.

FIG. 27 a flowchart of another embodiment of a process in wireless device 20 for transmitting demodulation reference signals constructed in accordance with principles described herein. Processing circuitry 22 is configured to receive, from the network node, an indication of using IFDMA for DMRS transmission, as described herein (Block S310). Processing circuitry 22 is configured to determine a set of base sequences, the set of base sequences comprising thirty quadrature phase shift keying, QPSK, sequences of length 6, 18 or 30, as described herein (Block S320). Processing circuitry 22 is configured derive a demodulation reference signal sequence from the set of base sequences, as described herein (Block S330). Processing circuitry 22 is configured to time multiplex the demodulation reference signal sequence in single carrier-orthogonal frequency division multiplexing, SC-OFDM, symbols, as described herein (Block S340). Processing circuitry 22 is configured to transmitting, by a wireless device 20, the multiplexed signal to the wireless network node 48, as described herein (Block S350).

Some Embodiments

Embodiment 0A. A method of transmitting a reference signal at a reduced power level while maintaining the reference signal's identifiability among other reference signals, the method comprising:

constructing a sequence of quadrature phase shifting keying, QPSK, symbols;

where the sequence has a cubic metric less than a first predefined threshold;

and where a maximum cross correlation between the sequence and a predetermined set of sequences is less than a second predefined threshold, where the predetermined set of sequences comprises sequences a wireless device may transmit; and transmitting the sequence of QPSK symbols.

Embodiment 1A. A method of operating a wireless device 20, the method comprising using a reference signal sequence at a predetermined power level, wherein:

a first set of signal sequences has been identified, the first set of signal sequences having at least one of a peak to average power ratio, PAPR, and cubic metric, CM, below a corresponding threshold value;

a second set of signal sequences has been identified as the first set or a subset of the first set, wherein, optionally, the second set has been identified by eliminating sequences of the first set of candidate signal sequences having the highest cross correlation magnitude statistics, wherein, optionally the eliminating is iterative; and the second set of signal sequences has been designated as the reference signal sequence.

Embodiment 2A. The method of Embodiment 1A, wherein values of the first set of signal sequences and the second set of signal sequences are the same.

Embodiment 3A. The method of Embodiment 1A, wherein the first set of signal sequences is adapted to be transmitted in a first set of subcarriers and the second set of signal sequences is adapted to be transmitted in a second set of subcarriers, the method further comprising multiplexing the first set of signal sequences and the second set of signal sequences.

Embodiment 4A. The method of Embodiment 3A, wherein the second set of subcarriers is a subset of subcarriers used to transmit the first set of signal sequences.

Embodiment 5A. The method of Embodiment 1A, wherein the first set of signal sequences is determined using a first cyclic shift factor and the second set of signal sequences is determined using a second cyclic shift factor.

Embodiment 6A. The method of Embodiment 5A, wherein a first demodulation reference signal, DMRS reference sequence is proportional to $e^{jD \alpha n}$, wherein $$\alpha_1 = \frac{2\pi n_{cs,1}}{12}$$

and is the first cyclic shift factor and $n_{cs,1} \in \{0, 1, \ldots, 11\}$ is given by $n_{cs,\lambda} = (n_{DMRS}^{(1)} + n_{DMRS\lambda}^{(2)} + n_{PN}(n_s)) \mod 12$, $n=0, 1, \ldots, M_{sc}^{RS}/D-1$, where D is a number of subcarriers used to transmit the second set of signal sequences divided by a number of subcarriers used to transmit the first set of signal sequences.

Embodiment 7A. The method of Embodiment 5A, wherein a second demodulation reference signal, DMRS, reference sequence is proportional to $e^{j\alpha n}$, wherein $$\alpha_2 = \frac{2\pi n_{cs,2}}{12}$$

is the second cyclic shift factor and $n_{cs,2} \lambda \{0, 1, \ldots, 11\}$ is given by $n_{cs,\lambda} \leq (n_{DMRS}^{(1)} + n_{DRMS\lambda}^{(2)} + n_{PN}(n_s)) \mod 12$, $n=0, 1, \ldots, M_{sc}^{RS}-1$.

Embodiment 8A. The method of Embodiment 1A, further comprising constructing a sequence of quadrature phase shifting keying, QPSK, symbols and transmitting the sequence of QPSK symbols.

Embodiment 9A. The method of Embodiment 8A, where the sequence of QPSK symbols has a cubic metric less than a predetermined threshold.

Embodiment 10A. The method of Embodiment 8A, where a maximum cross correlation between the sequence of QPSK symbols and a predetermined set of sequences is less than a predetermined threshold.

Embodiment 11A. A method of multiplexing reference signals occupying different numbers of subcarriers, the method comprising:

determining a first reference signal sequence with length L;

transmitting a subset of the first reference signal sequence on a first subset of a set of L subcarriers; and transmitting zero magnitude signals on subcarriers that are not in the first subset of subcarriers.

Embodiment 12A. A method of switching between reference signal sequences to one of enhance multiplexing capacity or reduce required sequence transmission power, the method comprising:

receiving an indication selecting a reference signal type from one of a first or a second reference signal sequence type; and transmitting a reference signal having the selected reference signal type.

Embodiment 13A. The method of Embodiment 12A, wherein the first reference signal type comprises reference signals sequences that are transmitted on a first subset of a set of subcarriers and that are orthogonal to a second reference signal transmitted on the set of subcarriers, and the second reference signal type comprises reference signals sequences that are transmitted on the first subset of a set of subcarriers and have a lower required transmission power metric than the first reference signal type.

Embodiment 14A. A method of transmitting demodulation reference signals in a wireless network, the method comprising:

determining a set of base sequences;

deriving a demodulation reference signal sequence from the set of base sequences;

time multiplexing the demodulation reference signal sequence and user data in single carrier-orthogonal frequency division multiplexing, SC-OFDM, symbols; and transmitting, by a wireless device 20, the multiplexed signal.

Embodiment 15A. The method of Embodiment 14A, wherein the set of base sequences comprises 30 quadrature phase shifting keying, QPSK, sequences.

Embodiment 16A. A method of dynamically switching a pairing of multiple users from one subframe to another subframe to improve multi-user pairing probability, the method comprising:

providing an indication from a set of indications identifying at least one of a cyclic shift, which subcarriers should be used for transmission, and an orthogonal cover sequence, the set of indications comprising at least one of:

a first indication that a wireless device should transmit on all subcarriers of a set of subcarriers;

a second indication that the wireless device 20 should transmit on a first subset of the set of subcarriers; and a third indication that the wireless device 20 should transmit on a second subset of the set of subcarriers.

Embodiment 17A. The method of Embodiment 16A, wherein the wireless device 20 transmits on all subcarriers of a set of subcarriers using a cyclic shift value from the set of cyclic shift values $\{0, 3, 6, 9\}$.

Embodiment 18A. The method of Embodiment 16A, the wireless device 20 transmits on the first subset of the set of subcarriers using an orthogonal cover sequence and a cyclic shift value from one of the sets of cyclic shift values among two sets of cyclic shift values $\{1, 7, 4, 10\}$ and $\{2, 5, 8, 11\}$.

Embodiment 19A. The method of Embodiment 16A, wherein the wireless device transmits on the second subset of the set of subcarriers using an orthogonal cover sequence and a cyclic shift value from the set of cyclic shift values not used by another wireless device 20 transmitting on the first subset of the set of subcarriers, wherein the second subset does not contain subcarriers in the first subset.

Embodiment 20A. A wireless device 20 configured to use a reference signal sequence at a predetermined power level, the wireless device 20 comprising:
processing circuitry 22 including a memory 24 and a processor 26, the memory 24 in communication with the processor 26, the memory 24 having instructions that, when executed by the processor 26, configure the processor 26 to:
use the reference signal sequence at the predetermined power level, wherein
a first set of signal sequences has been identified, the first set of signal sequences having at least one of a peak to average power ratio, PAPR, and cubic metric, CM, below a corresponding threshold value,
a second set of signal sequences has been identified as the first set or a subset of the first set, wherein, optionally, the second set has been identified by eliminating sequences of the first set of candidate signal sequences having the highest cross correlation magnitude statistics, wherein, optionally the eliminating is iterative, and
the second set of signal sequences has been designated as the reference signal sequence.

Embodiment 21A. The wireless device 20 of Embodiment 20A, wherein values of the first set of signal sequences and the second set of signal sequences are the same.

Embodiment 22A. The wireless device 20 of Embodiment 20A, wherein the first set of signal sequences is adapted to be transmitted in a first set of subcarriers and the second set of signal sequences is adapted to be transmitted in a second set of subcarriers, the processor 26 further configured to multiplex the first set of signal sequences and the second set of signal sequences.

Embodiment 23A. The wireless device 20 of Embodiment 22A, wherein the second set of subcarriers is a subset of subcarriers used to transmit the first set of signal sequences.

Embodiment 24A. The wireless device 20 of Embodiment 20A, wherein the first set of sequences is determined using a first cyclic shift factor and the second set of sequences is determined using a second cyclic shift factor.

Embodiment 25A. The wireless device 20 of Embodiment 24A, wherein a first DMRS reference sequence is proportional to $e^{jD \alpha_1 n}$, wherein $$\alpha_1 = \frac{2\pi n_{cs,1}}{12}$$

is the first cyclic shift factor and $n_{cs,1} \in \{0, 1, \ldots, 11\}$ is given by $n_{cs,\lambda} = (n_{DMRS}^{(1)} + n_{DRMS\lambda}^{(2)} + n_{PN}(n_s)) \bmod 12$, $n=0, 1, \ldots, M_{sc}^{RS}/D-1$, where D is a number of subcarriers used to transmit the second set of signal sequences divided by a number of subcarriers used to transmit the first set of signal sequences.

Embodiment 26A. The wireless device 20 of Embodiment 24A, wherein a second DMRS reference sequence is proportional to $e^{j\alpha_2 n}$ wherein $$\alpha_2 = \frac{2\pi n_{cs,2}}{12}$$

is the second cyclic shift factor and $n_{cs,2} \in \{0, 1, \ldots, 11\}$ is given by equation $$n_{cs,\lambda} = (n_{DMRS}^{(1)} + n_{DMRS\lambda}^{(2)} + n_{PN}(n_s)) \bmod 12,$$
$$n=0,1, \ldots, M_{sc}^{RS}-1.$$

Embodiment 27A. The wireless device 20 of Embodiment 20A, wherein the processor 26 is further configured to construct a sequence of quadrature phase shifting keying, QPSK, symbols and the communications interface 36 is configured to transmit the sequence of QPSK symbols.

Embodiment 28A. The wireless device 20 of Embodiment 27A, where the sequence of QPSK symbols has a cubic metric less than a predetermined threshold.

Embodiment 29A. The wireless device 20 of Embodiment 27A, where a maximum cross correlation between the sequence of QPSK symbols and a predetermined set of sequences is less than a predetermined threshold.

Embodiment 30A. A wireless device 20 configured to multiplex reference signals occupying different numbers of subcarriers, the wireless device 20 comprising:
processing circuitry 22 including a memory 24 and a processor 26, the memory 24 in communication with the processor 26, the memory 24 having instructions that, when executed by the processor 26, configure the processor 26 to:
determine a first reference signal sequence with length L; and
a communications interface 36 configured to:
transmit a subset of the first reference signal sequence on a first subset of a set of L subcarriers; and
transmit zero magnitude signals on subcarriers that are not in the first subset of subcarriers.

Embodiment 31A. A wireless device 20 configured to switch between reference signal sequences to one of enhance multiplexing capacity or reduce required sequence transmission power, the wireless device 20 comprising:
a communications interface 36 configured to:
receive an indication selecting a reference signal type from one of a first or a second reference signal sequence type; and
processing circuitry 22 including a memory 24 and a processor 26, the memory 24 in communication with the processor 26, the memory 24 having instructions that, when executed by the processor 26, configure the processor 26 to determine a reference signal based on the selected reference signal type:
the communications interface 36 further configured to transmit the determined reference signal.

Embodiment 32A. The wireless device 20 of Embodiment 31A, wherein the first reference signal type comprises reference signals sequences that are transmitted on a first subset of a set of subcarriers and that are orthogonal to a second reference signal transmitted on the set of subcarriers, and the second reference signal type comprises reference signals sequences that are transmitted on the first subset of a set of subcarriers and have a lower required transmission power metric than the first reference signal type.

Embodiment 33A. A wireless device 20 configured to transmit demodulation reference signals in a wireless network, the wireless device 20 comprising: processing circuitry 22 including a memory 24 and a processor 26, the memory 24 in communication with the processor 26, the memory 24 having instructions that, when executed by the processor 26, configure the processor 26 to:
determine a set of base sequences;
derive a demodulation reference signal sequence from the set of base sequences; and time multiplex the demodulation reference signal sequence and user data in single carrier-orthogonal frequency division multiplexing, SC-OFDM, symbols; and a communications interface 36 configured to:

transmit the multiplexed signal.

Embodiment 34A. The wireless device 20 of Embodiment 33A, wherein the set of base sequences comprises 30 quadrature phase shifting keying, QPSK, sequences.

Embodiment 35A. A wireless device 20 configured to dynamically switch a pairing of multiple users from one subframe to another subframe to improve multi-user pairing probability, the wireless device 20 comprising:

a communications interface 36;

processing circuitry 22 including a memory 24 and a processor 26, the memory 24 in communication with the processor 26, the memory 24 having instructions that, when executed by the processor 26, configure the processor 26 to:

provide an indication from a set of indications identifying at least one of a cyclic shift, which subcarriers should be used for transmission, and an orthogonal cover sequence, the set of indications comprising at least one of:

a first indication that a wireless device 20 should transmit on all subcarriers of a set of subcarriers;

a second indication that the wireless device 20 should transmit on a first subset of the set of subcarriers; and a third indication that the wireless device 20 should transmit on a second subset of the set of subcarriers.

Embodiment 36A. The wireless device 20 of Embodiment 35A, wherein communications interface 36 transmits on all subcarriers of a set of subcarriers using a cyclic shift value from the set of cyclic shift values {0, 3, 6, 9}.

Embodiment 37A. The wireless device 20 of Embodiment 35A, wherein the communications interface 36 transmits on the first subset of the set of subcarriers using an orthogonal cover sequence and a cyclic shift value from one of the sets of cyclic shift values among two sets of cyclic shift values {1, 7, 4, 10} and {2, 5, 8, 11}.

Embodiment 38A. The wireless device 20 of Embodiment 35A, wherein the communications interface 36 transmits on the second subset of the set of subcarriers using an orthogonal cover sequence and a cyclic shift value from the set of cyclic shift values not used by another wireless device 20 transmitting on the first subset of the set of subcarriers, wherein the second subset does not contain subcarriers in the first subset.

Embodiment 39A. A network node 48 configured to receive demodulation reference signals from a wireless device 20 in a wireless network, the network node 48 comprising:

a communications interface 50 configured to receive, from the wireless device 20, a demodulated reference signal, the demodulated reference signal derived from a set of base sequences, the demodulated reference signal and user data time-multiplexed in single carrier-orthogonal frequency division multiplexing, SC-OFDM, symbols; and processing circuitry 52 including a memory 54 and a processor 56, the memory 54 in communication with the processor 56, the memory 54 having instructions that, when executed by the processor 56, configure the processor 56 to:

perform channel estimation based on the demodulation reference signal.

Embodiment 40A. A method, performed at a network node 48, for receiving demodulation reference signals from a wireless device 20 in a wireless network, the method comprising:

receiving, from the wireless device 20, a demodulated reference signal, the demodulated reference signal derived from a set of base sequences, the demodulated reference signal and user data time-multiplexed in single carrier-orthogonal frequency division multiplexing, SC-OFDM, symbols; and performing channel estimation based on the demodulation reference signal.

Embodiment 41A. A wireless device 20 configured to designate a reference signal sequence at a reduced power level, comprising:

a memory module 62 configured to store first signal sequences and second signal sequences; and a signal identification module 64 configured to:

identify a first set of signal sequences from the stored first signal sequences having at least one of a peak to average power ratio. PAPR, and cubic metric, CM, below a corresponding threshold value;

identify a second set of signal sequences from the stored second signal sequences by iteratively eliminating sequences of the first set of signal sequences having the highest cross correlation magnitude statistics, the second set being a subset of the first set; and designate the second set of signal sequences as the reference signal sequence.

Embodiment 42A. A wireless device 20 configured to transmit a reference signal at a reduced power level while maintaining the reference signal's identifiability among other reference signals, the wireless device 20 comprising:

processing circuitry 22 including a memory 24 and a processor 26, the memory 24 in communication with the processor 26, the memory 24 having instructions that, when executed by the processor 26, configure the processor 26 to:

construct a sequence of quadrature phase shifting keying, QPSK, symbols:

where the sequence has a cubic metric less than a first predefined threshold;

and where a maximum cross correlation between the sequence and a predetermined set of sequences is less than a second predefined threshold, where the predetermined set of sequences comprises sequences the wireless device 20 may transmit; and a communications interface 36 configured to transmit the sequence of QPSK symbols.

Embodiment 1. A method of switching between reference signal sequences to one of enhance multiplexing capacity or reduce required sequence transmission power, the method comprising:

receiving an indication;

selecting a reference signal type from one of a first or a second reference signal sequence type, based on the indication; and transmitting a reference signal having the selected reference signal type.

Embodiment 2. The method of Embodiment 1, wherein the first reference signal type comprises reference signals sequences that are transmitted on a first subset of a set of subcarriers and that are orthogonal to a second reference signal transmitted on the set of subcarriers, and the second reference signal type comprises reference signals sequences that are transmitted on the first subset of a set of subcarriers and have a lower required transmission power metric than the first reference signal type.

Embodiment 3. The method of any one of Embodiments 1-2, wherein the reference signal type is a Demodulation Reference Signal, DMRS, signal type.

Embodiment 4. The method of any one of Embodiments 1-3, wherein the indication is at least one value in a downlink control field that corresponds to one of the first or the second reference signal sequence type.

Embodiment 5. The method of any one of Embodiments 1-3, wherein the indication is at least one value in a downlink control field that indicates a parameter for transmission in an uplink channel, the reference signal type being selected based on whether the parameter meets a criterion.

Embodiment 6. The method of Embodiment 5, wherein the criterion includes one taken from the parameter corresponds to an odd number of resource blocks, the parameter corresponds to an even number resources blocks, the parameter is greater than a predefined number of resource blocks.

Embodiment 7. The method of Embodiment 1, wherein the first reference signal sequence type is a decimated signal type.

Embodiment 8. The method of any one of Embodiments 1-7, wherein the indication is at least one value in a downlink control indictor (DCI) field.

Embodiment 9. A method of transmitting demodulation reference signals in a wireless network, the method comprising:

determining a set of base sequences;

deriving a demodulation reference signal sequence from the set of base sequences;

time multiplexing the demodulation reference signal sequence and user data in single carrier-orthogonal frequency division multiplexing, SC-OFDM, symbols; and transmitting, by a wireless device 20, the multiplexed signal; and the set of base sequences comprises thirty quadrature phase shifting keying, QPSK, sequences.

Embodiment 10. The method of Embodiment 9, wherein the deriving of the demodulation reference signal sequence from the set of base sequences includes decimating the set of base sequences.

Embodiment 11. The method of any one of Embodiments 9-10, wherein a length of each of the base sequences in the set of base sequences is larger in length than the demodulation reference signal sequence.

Embodiment 12. The method of any one of Embodiments 9-11, wherein a transmission power metric of the demodulation reference signal sequence is less than a respective transmission power metric of each of the base sequences of the set of base sequences.

Embodiment 13. The method of any one of Embodiments 9-12, wherein the indication is from a set of indications identifying at least one of a cyclic shift, which subcarriers should be used for transmission, and an orthogonal cover sequence, the set of indications comprising at least one of:

a first indication that a wireless device should transmit on all subcarriers of a set of subcarriers;

a second indication that the wireless device 20 should transmit on a first subset of the set of subcarriers; and a third indication that the wireless device 20 should transmit on a second subset of the set of subcarriers.

Embodiment 14. The method of Embodiment 13, wherein the wireless device 20 transmits on all subcarriers of the set of subcarriers using a cyclic shift value from a set of cyclic shift values {0, 3, 6, 9}.

Embodiment 15. The method of Embodiment 13, the wireless device 20 transmits on the first subset of the set of subcarriers using an orthogonal cover sequence and a cyclic shift value from one of a sets of cyclic shift values among two sets of cyclic shift values {1, 7, 4, 10} and {2, 5, 8, 11}.

Embodiment 16. The method of Embodiment 13, wherein the wireless device 20 transmits on the second subset of the set of subcarriers using an orthogonal cover sequence and a cyclic shift value from a set of cyclic shift values not used by another wireless device 20 transmitting on the first subset of the set of subcarriers, wherein the second subset does not contain subcarriers in the first subset.

Embodiment 17. A wireless device 20 configured to switch between reference signal sequences to one of enhance multiplexing capacity or reduce required sequence transmission power, the wireless device 20 comprising:

a communications interface 36 configured to:

receive an indication selecting a reference signal type from one of a first or a second reference signal sequence type; and processing circuitry 22 including a memory 24 and a processor 26, the memory 24 in communication with the processor 26, the memory 24 having instructions that, when executed by the processor 26, configure the processor 26 to determine a reference signal based on the selected reference signal type; and the communications interface 36 further configured to transmit the determined reference signal.

Embodiment 18. The wireless device 20 of Embodiment 17, wherein the first reference signal type comprises reference signals sequences that are transmitted on a first subset of a set of subcarriers and that are orthogonal to a second reference signal transmitted on the set of subcarriers, and the second reference signal type comprises reference signals sequences that are transmitted on the first subset of a set of subcarriers and have a lower required transmission power metric than the first reference signal type.

Embodiment 19. The wireless device 20 of any one of Embodiments 17-18, wherein the reference signal type is a Demodulation Reference Signal, DMRS, signal type.

Embodiment 20. The wireless device 20 of any one of Embodiments 17-19, wherein the indication is at least one value in a downlink control field that corresponds to one of the first or the second reference signal type.

Embodiment 21. The wireless device 20 of any one of Embodiments 17-19, wherein the indication is at least one value in a downlink control field that indicates a parameter for transmission in an uplink channel, the reference signal type being selected based on whether the parameter meets a criterion.

Embodiment 22. The wireless device 20 of Embodiment 21, wherein the criterion includes one taken from the parameter corresponds to an odd number of resource blocks, the parameter corresponds to an even number resources blocks, the parameter is greater than a predefined number of resource blocks.

Embodiment 23. The wireless device 20 of any one of Embodiments 17-22, wherein the first reference signal type is a decimated signal type; and the indication is at least one value in a downlink control indictor (DCI) field.

Embodiment 24. A wireless device 20 configured to designate a reference signal sequence at a reduced power level, comprising:

a memory module 62 configured to store first signal sequences and second signal sequences; and a signal identification module 64 configured to:

identify a first set of signal sequences from the stored first signal sequences having at least one of a peak to average power ratio, PAPR, and cubic metric, CM, below a corresponding threshold value;

identify a second set of signal sequences from the stored second signal sequences by iteratively eliminating sequences of the first set of signal sequences having the highest cross correlation magnitude statistics, the second set being a subset of the first set; and designate the second set of signal sequences as the reference signal sequence.

Some Other Embodiments

According to one aspect of the disclosure, a method of transmitting demodulation reference signals (DMRS) over one, three or five resource blocks (RBs) with Interleaved Frequency Division Multiple Access (IFDMA) from a wireless device 20 to a wireless network node 48 in a wireless network wherein Single Carrier Frequency Division Multiple Access (SC-OFDMA) is deployed in uplink is provided. At least one of: a set of base sequences including thirty quadrature phase shifting keying, QPSK, sequences of length 6, 18 or 30 is determined (S180). A demodulation reference signal sequence is derived from the determined set of base sequences (S190); the demodulation reference signal sequence is multiplexed (S200); and the multiplexed demodulation reference signal sequence is transmitted to the wireless network node 48 by the wireless device 20 (S210).

According to one embodiment of this aspect, the set of thirty base sequences is given by:

$$\bar{r}_{u,v}(n)=e^{j\varphi(n)\pi/4}, 0\leq n \leq M_{sc}^{RS}-1; M_{sc}^{RS}\in\{6,18,30\};$$
$$v=0, u=0,1,\ldots,29.$$

According to one embodiment of this aspect, φ(n) is given in the tables below:

| | | | φ(n) for $M_{sc}^{RS}$ = 6. | | | |
|---|---|---|---|---|---|---|
| u | | | φ(0), φ(1), . . . , φ(5) | | | |
| 0 | −1 | −3 | 3 | −3 | 3 | −3 |
| 1 | −1 | 3 | −1 | 1 | 1 | 1 |
| 2 | 3 | −1 | −3 | −3 | 1 | 3 |
| 3 | 3 | −1 | −1 | 1 | −1 | −1 |
| 4 | −1 | −1 | −3 | 1 | −3 | −1 |
| 5 | 1 | 3 | −3 | −1 | −3 | 3 |
| 6 | −3 | 3 | −1 | −1 | 1 | −3 |
| 7 | −1 | −3 | −3 | 1 | 3 | 3 |
| 8 | 3 | −1 | −1 | 3 | 1 | 3 |
| 9 | 3 | −3 | 3 | 1 | −1 | 1 |
| 10 | −3 | 1 | −3 | −3 | −3 | −3 |
| 11 | −3 | −3 | −3 | 1 | −3 | −3 |
| 12 | 3 | −3 | 1 | −1 | −3 | −3 |
| 13 | 3 | −3 | 3 | −1 | −1 | −3 |
| 14 | 3 | −1 | 1 | 3 | 3 | 1 |
| 15 | −1 | 1 | −1 | −3 | 1 | 1 |
| 16 | −3 | −1 | −3 | −1 | 3 | 3 |
| 17 | 1 | −1 | 3 | −3 | 3 | 3 |
| 18 | 1 | 3 | 1 | 1 | −3 | 3 |
| 19 | −1 | −3 | −1 | −1 | 3 | −3 |
| 20 | 3 | −1 | −3 | −1 | −1 | −3 |
| 21 | 3 | 1 | 3 | −3 | −3 | 1 |
| 22 | 1 | 3 | −1 | −1 | 1 | −1 |
| 23 | −3 | 1 | −3 | 3 | 3 | 3 |
| 24 | 1 | 3 | −3 | 3 | −3 | 3 |
| 25 | −1 | −1 | 1 | −3 | 1 | −1 |
| 26 | 1 | −3 | −1 | −1 | 3 | 1 |
| 27 | −3 | −1 | −1 | 3 | 1 | 1 |
| 28 | −1 | 3 | −3 | −3 | −3 | 3 |
| 29 | 3 | 1 | −1 | 1 | 3 | 1 |

According to one embodiment of this aspect, the multiplexing is performed in a time domain, the DMRS is transmitted in different SC-FDMA symbols.

According to another aspect of the disclosure, a method in a network node 48 for receiving demodulation reference signals (DMRS) over one, three or five resource blocks (RBs) with Interleaved Frequency Division Multiple Access (IFDMA) in a wireless network wherein Single Carrier Frequency Division Multiple Access (SC-OFDMA) is deployed in an uplink is provided. An indication of using IFDMA for DMRS transmission is signaled to the wireless device 20 (S270). A demodulation reference signal is received by the wireless network node 48 from the wireless device 20 (S280). The indication of using IFDMA for DMRS transmission is used in the receiving. A demodulation reference signal sequence is derived from a set of base sequences (S290). Channel estimation is performed based on the received demodulation reference signal, based on the derived demodulation reference signal sequence and based on the indication of using IFDMA for DMRS transmission (S300).

According to one embodiment of this aspect, the set of thirty base sequences is given by: $\bar{r}_{u,v}(n)=e^{j\varphi(n)\pi/4}$, $0\leq n\leq M_{sc}^{RS}-1$, $M_{sc}^{RS}\in\{6,18,30\}$; v=0, u=0, 1, . . . , 29.

According to one embodiment of this aspect. φ(n) is given in the tables

| | | | φ(n) for $M_{sc}^{RS}$ = 6. | | | |
|---|---|---|---|---|---|---|
| u | | | φ(0), φ(1), . . . , φ(5) | | | |
| 0 | −1 | −3 | 3 | −3 | 3 | −3 |
| 1 | −1 | 3 | −1 | 1 | 1 | 1 |
| 2 | 3 | −1 | −3 | −3 | 1 | 3 |
| 3 | 3 | −1 | −1 | 1 | −1 | −1 |
| 4 | −1 | −1 | −3 | 1 | −3 | −1 |
| 5 | 1 | 3 | −3 | −1 | −3 | 3 |
| 6 | −3 | 3 | −1 | −1 | 1 | −3 |
| 7 | −1 | −3 | −3 | 1 | 3 | 3 |
| 8 | 3 | −1 | −1 | 3 | 1 | 3 |
| 9 | 3 | −3 | 3 | 1 | −1 | 1 |
| 10 | −3 | 1 | −3 | −3 | −3 | −3 |
| 11 | −3 | −3 | −3 | 1 | −3 | −3 |
| 12 | 3 | −3 | 1 | −1 | −3 | −3 |
| 13 | 3 | −3 | 3 | −1 | −1 | −3 |
| 14 | 3 | −1 | 1 | 3 | 3 | 1 |
| 15 | −1 | 1 | −1 | −3 | 1 | 1 |
| 16 | −3 | −1 | −3 | −1 | 3 | 3 |
| 17 | 1 | −1 | 3 | −3 | 3 | 3 |
| 18 | 1 | 3 | 1 | 1 | −3 | 3 |
| 19 | −1 | −3 | −1 | −1 | 3 | −3 |
| 20 | 3 | −1 | −3 | −1 | −1 | −3 |
| 21 | 3 | 1 | 3 | −3 | −3 | 1 |
| 22 | 1 | 3 | −1 | −1 | 1 | −1 |
| 23 | −3 | 1 | −3 | 3 | 3 | 3 |
| 24 | 1 | 3 | −3 | 3 | −3 | 3 |
| 25 | −1 | −1 | 1 | −3 | 1 | −1 |
| 26 | 1 | −3 | −1 | −1 | 3 | 1 |
| 27 | −3 | −1 | −1 | 3 | 1 | 1 |
| 28 | −1 | 3 | −3 | −3 | −3 | 3 |
| 29 | 3 | 1 | −1 | 1 | 3 | 1 |

According to one aspect of the disclosure, a method in a wireless device 20 for transmitting demodulation reference signals (DMRS) over one, three or five resource blocks (RBs) with interleaved Frequency Division Multiple Access (IFDMA) in a wireless network wherein Single Carrier Frequency Division Multiple Access (SC-OFDMA) is deployed in an uplink is provided. An indication of using IFDMA for DMRS transmission is received from the network node 48 (S310). A set of base sequences is determined (S320). The set of base sequences includes thirty quadrature phase shift keying, QPSK, sequences of length 6, 18 or 30. A demodulation reference signal sequence is derived from the set of base sequences (S330). The demodulation reference signal sequence is time multiplexed in single carrier-orthogonal frequency division multiplexing, SC-OFDM, symbols (S340). The multiplexed signal is transmitted by a wireless device 20 to the wireless network node 48 (S350).

According to one embodiment of this aspect, the set of thirty base sequences is given by $\bar{r}_{u,v}(n)=e^{j\varphi(n)\pi/4}$, $0\leq n\leq M_{sc}^{RS}-1$, $M_{sc}^{RS}=6,18,30$; v=0, u=0, 1, . . . , 29.

According to one embodiment of this aspect, φ(n) is given in the tables below:

| u | φ(0), φ(1), . . . , φ(5) | | | | | |
|---|---|---|---|---|---|---|
| | φ(n) for $M_{sc}^{RS}$ = 6. | | | | | |
| 0 | −1 | −3 | 3 | −3 | 3 | −3 |
| 1 | −1 | 3 | −1 | 1 | 1 | 1 |
| 2 | 3 | −1 | −3 | −3 | 1 | 3 |
| 3 | 3 | −1 | −1 | 1 | −1 | −1 |
| 4 | −1 | −1 | −3 | 1 | −3 | −1 |
| 5 | 1 | 3 | −3 | −1 | −3 | 3 |
| 6 | −3 | 3 | −1 | −1 | 1 | −3 |
| 7 | −1 | −3 | −3 | 1 | 3 | 3 |
| 8 | 3 | −1 | −1 | 3 | 1 | 3 |
| 9 | 3 | −3 | 3 | 1 | −1 | 1 |
| 10 | −3 | 1 | −3 | −3 | −3 | −3 |
| 11 | −3 | −3 | −3 | 1 | −3 | −3 |
| 12 | 3 | −3 | 1 | −1 | −3 | −3 |
| 13 | 3 | −3 | 3 | −1 | −1 | −3 |
| 14 | 3 | −1 | 1 | 3 | 3 | 1 |
| 15 | −1 | 1 | −1 | −3 | 1 | 1 |
| 16 | −3 | −1 | −3 | −1 | 3 | 3 |
| 17 | 1 | −1 | 3 | −3 | 3 | 3 |
| 18 | 1 | 3 | 1 | 1 | −3 | 3 |
| 19 | −1 | −3 | −1 | −1 | 3 | −3 |
| 20 | 3 | −1 | −3 | −1 | −1 | −3 |
| 21 | 3 | 1 | 3 | −3 | −3 | 1 |
| 22 | 1 | 3 | −1 | −1 | 1 | −1 |
| 23 | −3 | 1 | −3 | 3 | 3 | 3 |
| 24 | 1 | 3 | −3 | 3 | −3 | 3 |
| 25 | −1 | −1 | 1 | −3 | 1 | −1 |
| 26 | 1 | −3 | −1 | −1 | 3 | 1 |
| 27 | −3 | −1 | −1 | 3 | 1 | 1 |
| 28 | −1 | 3 | −3 | −3 | −3 | 3 |
| 29 | 3 | 1 | −1 | 1 | 3 | 1 |

According to one embodiment of this aspect, the deriving of the demodulation reference signal sequence from the set of base sequences includes decimating the set of base sequences comprises applying a cyclic shift to the base sequences and an orthogonal cover code.

According to another aspect of the disclosure, a method of switching between reference signal sequences to one of enhance multiplexing capacity or reduce required sequence transmission power is provided. An indication is received (S160). A reference signal type is selected from one of a first or a second reference signal sequence type, based on the indication (S160). A reference signal having the selected reference signal type is transmitted (S170).

According to one embodiment of this aspect, the first reference signal type comprises reference signals sequences that are transmitted on a first subset of a set of subcarriers and that are orthogonal to a second reference signal transmitted on the set of subcarriers, and the second reference signal type comprises reference signals sequences that are transmitted on the first subset of a set of subcarriers and have a lower required transmission power metric than the first reference signal type.

According to one embodiment of this aspect, the transmission power metric is a cubic metric, CM, that is in units of decibels and is given by:

$$CM = \frac{20\log_{10}\{\text{rms}[v_{norm}^3(t)]\} - 1.52}{1.56} \text{ dB},$$

where $$\text{rms}(x) = \sqrt{\frac{(x'x)}{N}}, \quad v_{norm}(t) = \frac{|v(t)|}{\text{rms}[v(t)]},$$

and v(t) is the value of the first or second reference signal type at time t.

According to one embodiment of this aspect, the reference signal is a Demodulation Reference Signal, DMRS, signal. According to one embodiment of this aspect, the indication is at least one value in a downlink control field that corresponds to one of the first or the second reference signal sequence type.

According to one embodiment of this aspect, the indication is at least one value in a downlink control field that indicates a parameter for transmission in an uplink channel, the reference signal type being selected based on whether the parameter meets a criterion. According to one embodiment of this aspect, the criterion includes one taken from the parameter corresponds to an odd number of resource blocks, the parameter corresponds to an even number resources blocks, the parameter is greater than a predefined number of resource blocks. According to one embodiment of this aspect, the first reference signal sequence type is a decimated signal type. According to one embodiment of this aspect, the indication is at least one value in a downlink control indictor (DCI) field.

According to another aspect of the disclosure, a wireless device 20 configured to switch between reference signal sequences to one of enhance multiplexing capacity or reduce required sequence transmission power is provided. The wireless device 20 includes a communications interface 36 configured to: receive an indication selecting a reference signal type from one of a first or a second reference signal sequence type, and processing circuitry 22 configured to determine a reference signal based on the selected reference signal type indicated in the indication. The communications interface 36 further configured to transmit the determined reference signal having the selected reference signal type indicated in the indication.

According to one embodiment of this aspect, the first reference signal type comprises reference signals sequences that are transmitted on a first subset of a set of subcarriers and that are orthogonal to a second reference signal transmitted on the set of subcarriers, and the second reference signal type comprises reference signals sequences that are transmitted on the first subset of a set of subcarriers and have a lower required transmission power metric than the first reference signal type.

According to one embodiment of this aspect, the reference signal type is a Demodulation Reference Signal, DMRS, signal type. According to one embodiment of this aspect, the indication is at least one value in a downlink control field that corresponds to one of the first or the second reference signal type. According to one embodiment of this aspect, the indication is at least one value in a downlink control field that indicates a parameter for transmission in an uplink channel, the reference signal type being selected based on whether the parameter meets a criterion.

According to one embodiment of this aspect, the criterion includes one taken from the parameter corresponds to an odd number of resource blocks, the parameter corresponds to an even number resources blocks, the parameter is greater than a predefined number of resource blocks. According to one embodiment of this aspect, the first reference signal type is a decimated signal type. The indication is at least one value in a downlink control indictor (DCI) field.

According to another aspect of the disclosure, a wireless device 20 configured to designate a reference signal sequence at a reduced power level is provided. Wireless device 20 includes a memory module 62 configured to store first signal sequences and second signal sequences; a signal identification module 64 configured to: identify a first set of signal sequences from the stored first signal sequences having at least one of a peak to average power ratio. PAPR, and cubic metric. CM, below a corresponding threshold value, and identify a second set of signal sequences from the stored second signal sequences by iteratively eliminating sequences of the first set of signal sequences having the highest cross correlation magnitude statistics, the second set being a subset of the first set, an designate the second set of signal sequences as the reference signal sequence.

According to another aspect of the disclosure, a wireless device 20 configured to multiplex reference signals occupying different numbers of subcarriers is provided. The wireless device includes processing circuitry 22 configured to: determine a first reference signal sequence with length L; and a communications interface 36 configured to: transmit a subset of the first reference signal sequence on a first subset of a set of L subcarriers; and transmit zero magnitude signals on subcarriers that are not in the first subset of subcarriers.

According to another aspect of the disclosure, a wireless device 20 for transmitting demodulation reference signals (DMRS) over one, three or five resource blocks (RBs) with Interleaved Frequency Division Multiple Access (IFDMA) to a wireless network node 48 in a wireless network wherein Single Carrier Frequency Division Multiple Access (SC-OFDMA) is deployed in uplink is provided. The wireless device 20 includes processing circuitry 22 configured to at least one of: determine a set of base sequences comprising thirty quadrature phase shifting keying, QPSK, sequences of length 6, 18 or 30; derive a demodulation reference signal sequence from the determined set of base sequences; multiplex the demodulation reference signal sequence; and transmit the multiplexed demodulation reference signal sequence to the wireless network node 48.

According to one embodiment of this aspect, the set of thirty base sequences is given by:

$$\bar{r}_{u,v}(n) = e^{j\varphi(n)\pi/4}, 0 \leq n \leq M_{sc}^{RS}-1; M_{sc}^{RS} \in \{6,18,30\};$$
$$v=0, u=0,1,\ldots,29.$$

According to one embodiment of this aspect, φ(n) is given in the tables below:

| $\varphi(n)$ for $M_{sc}^{RS} = 6$. | | | | | | |
|---|---|---|---|---|---|---|
| u | $\varphi(0), \varphi(1), \ldots, \varphi(5)$ | | | | | |
| 0 | −1 | −3 | 3 | −3 | 3 | −3 |
| 1 | −1 | 3 | −1 | 1 | 1 | 1 |
| 2 | 3 | −1 | −3 | −3 | 1 | 3 |
| 3 | 3 | −1 | −1 | 1 | −1 | −1 |
| 4 | −1 | −1 | −3 | 1 | −3 | −1 |
| 5 | 1 | 3 | −3 | −1 | −3 | 3 |
| 6 | −3 | 3 | −1 | −1 | 1 | −3 |
| 7 | −1 | −3 | −3 | 1 | 3 | 3 |
| 8 | 3 | −1 | −1 | 3 | 1 | 3 |
| 9 | 3 | −3 | 3 | 1 | −1 | 1 |
| 10 | −3 | 1 | −3 | −3 | −3 | −3 |
| 11 | −3 | −3 | −3 | 1 | −3 | −3 |
| 12 | 3 | −3 | 1 | −1 | −3 | −3 |
| 13 | 3 | −3 | 3 | −1 | −1 | −3 |
| 14 | 3 | −1 | 1 | 3 | 3 | 1 |
| 15 | −1 | 1 | −1 | −3 | 1 | 1 |

-continued

| $\varphi(n)$ for $M_{sc}^{RS} = 6$. | | | | | | |
|---|---|---|---|---|---|---|
| u | $\varphi(0), \varphi(1), \ldots, \varphi(5)$ | | | | | |
| 16 | −3 | −1 | −3 | −1 | 3 | 3 |
| 17 | 1 | −1 | 3 | −3 | 3 | 3 |
| 18 | 1 | 3 | 1 | 1 | −3 | 3 |
| 19 | −1 | −3 | −1 | −1 | 3 | −3 |
| 20 | 3 | −1 | −3 | −1 | −1 | −3 |
| 21 | 3 | 1 | 3 | −3 | −3 | 1 |
| 22 | 1 | 3 | −1 | −1 | 1 | −1 |
| 23 | −3 | 1 | −3 | 3 | 3 | 3 |
| 24 | 1 | 3 | −3 | 3 | −3 | 3 |
| 25 | −1 | −1 | 1 | −3 | 1 | −1 |
| 26 | 1 | −3 | −1 | −1 | 3 | 1 |
| 27 | −3 | −1 | −1 | 3 | 1 | 1 |
| 28 | −1 | 3 | −3 | −3 | −3 | 3 |
| 29 | 3 | 1 | −1 | 1 | 3 | 1 |

According to one embodiment of this aspect, the multiplexing is performed in a time domain, the DMRS being transmitted in different SC-FDMA symbols.

According to another aspect of the disclosure, a network node 48 for receiving demodulation reference signals (DMRS) over one, three or five resource blocks (RBs) with Interleaved Frequency Division Multiple Access (IFDMA) in a wireless network wherein Single Carrier Frequency Division Multiple Access (SC-OFDMA) is deployed in an uplink is provided. The network node 48 includes processing circuitry 52 configured to: signal, to the wireless device 20, an indication of using IFDMA for DMRS transmission; receive a demodulation reference signal from the wireless device 20, the indication of using IFDMA for DMRS transmission being used in the receiving; derive a demodulation reference signal sequence from a set of base sequences; and perform channel estimation based on the received demodulation reference signal, based on the derived demodulation reference signal sequence and based on the indication of using IFDMA for DMRS transmission.

According to one embodiment of this aspect, the set of thirty base sequences is given by:

$$\bar{r}_{u,v}(n) = e^{j\varphi(n)\pi/4}, 0 \leq n \leq M_{sc}^{RS}-1, M_{sc}^{RS} \in \{6,18,30\};$$
$$v=0, u=0,1,\ldots,29.$$

According to one embodiment of this aspect. φ(n) is given in the tables below:

| $\varphi(n)$ for $M_{sc}^{RS} = 6$. | | | | | | |
|---|---|---|---|---|---|---|
| u | $\varphi(0), \varphi(1), \ldots, \varphi(5)$ | | | | | |
| 0 | −1 | −3 | 3 | −3 | 3 | −3 |
| 1 | −1 | 3 | −1 | 1 | 1 | 1 |
| 2 | 3 | −1 | −3 | −3 | 1 | 3 |
| 3 | 3 | −1 | −1 | 1 | −1 | −1 |
| 4 | −1 | −1 | −3 | 1 | −3 | −1 |
| 5 | 1 | 3 | −3 | −1 | −3 | 3 |
| 6 | −3 | 3 | −1 | −1 | 1 | −3 |
| 7 | −1 | −3 | −3 | 1 | 3 | 3 |
| 8 | 3 | −1 | −1 | 3 | 1 | 3 |
| 9 | 3 | −3 | 3 | 1 | −1 | 1 |
| 10 | −3 | 1 | −3 | −3 | −3 | −3 |
| 11 | −3 | −3 | −3 | 1 | −3 | −3 |
| 12 | 3 | −3 | 1 | −1 | −3 | −3 |
| 13 | 3 | −3 | 3 | −1 | −1 | −3 |
| 14 | 3 | −1 | 1 | 3 | 3 | 1 |
| 15 | −1 | 1 | −1 | −3 | 1 | 1 |
| 16 | −3 | −1 | −3 | −1 | 3 | 3 |
| 17 | 1 | −1 | 3 | −3 | 3 | 3 |
| 18 | 1 | 3 | 1 | 1 | −3 | 3 |
| 19 | −1 | −3 | −1 | −1 | 3 | 3 |

| φ(n) for $M_{sc}^{RS}$ = 6. | | | | | | |
|---|---|---|---|---|---|---|
| u | φ(0), φ(1), . . . , φ(5) | | | | | |
| 20 | 3 | −1 | −3 | −1 | −1 | −3 |
| 21 | 3 | 1 | 3 | −3 | −3 | 1 |
| 22 | 1 | 3 | −1 | −1 | 1 | −1 |
| 23 | −3 | 1 | −3 | 3 | 3 | 3 |
| 24 | 1 | 3 | −3 | 3 | −3 | 3 |
| 25 | −1 | −1 | 1 | −3 | 1 | −1 |
| 26 | 1 | −3 | −1 | −1 | 3 | 1 |
| 27 | −3 | −1 | −1 | 3 | 1 | 1 |
| 28 | −1 | 3 | −3 | −3 | −3 | 3 |
| 29 | 3 | 1 | −1 | 1 | 3 | 1 |

According to another aspect of the disclosure, a wireless device 20 for transmitting demodulation reference signals (DMRS) over one, three or five resource blocks (RBs) with interleaved Frequency Division Multiple Access (IFDMA) in a wireless network wherein Single Carrier Frequency Division Multiple Access (SC-OFDMA) is deployed in an uplink is provided. The wireless device 20 includes processing circuitry 22 configured to: receive, from the network node 48, an indication of using IFDMA for DMRS transmission; determine a set of base sequences, the set of base sequences comprising thirty quadrature phase shift keying, QPSK, sequences of length 6, 18 or 30; derive a demodulation reference signal sequence from the set of base sequences; time multiplex the demodulation reference signal sequence in single carrier-orthogonal frequency division multiplexing, SC-OFDM, symbols; and transmit the multiplexed signal to the wireless network node 48.

According to one embodiment of this aspect, the set of thirty base sequences is given by $$\bar{r}_{u,v}(n)=e^{j\varphi(n)\pi/4}, 0 \le n \le M_{sc}^{RS}-1, M_{sc}^{RS} \in \{6,18,30\};$$
$$v=0, u=0,1,\ldots,29.$$

According to one embodiment of this aspect, φ(n) is given in the tables below:

| φ(n) for $M_{sc}^{RS}$ = 6. | | | | | | |
|---|---|---|---|---|---|---|
| u | φ(0), φ(1), . . . , φ(5) | | | | | |
| 0 | −1 | −3 | 3 | −3 | 3 | −3 |
| 1 | −1 | 3 | −1 | 1 | 1 | 1 |
| 2 | 3 | −1 | −3 | −3 | 1 | 3 |
| 3 | 3 | −1 | −1 | 1 | −1 | −1 |
| 4 | −1 | −1 | −3 | 1 | −3 | −1 |
| 5 | 1 | 3 | −3 | −1 | −3 | 3 |
| 6 | −3 | 3 | −1 | −1 | 1 | −3 |
| 7 | −1 | −3 | −3 | 1 | 3 | 3 |
| 8 | 3 | −1 | −1 | 3 | 1 | 3 |
| 9 | 3 | −3 | 3 | 1 | −1 | 1 |
| 10 | −3 | 1 | −3 | −3 | −3 | −3 |
| 11 | −3 | −3 | −3 | 1 | −3 | −3 |
| 12 | 3 | −3 | 1 | −1 | −3 | −3 |
| 13 | 3 | −3 | 3 | −1 | −1 | −3 |
| 14 | 3 | −1 | 1 | 3 | 3 | 1 |
| 15 | −1 | 1 | −1 | −3 | 1 | 1 |
| 16 | −3 | −1 | −3 | −1 | 3 | 3 |
| 17 | 1 | −1 | 3 | −3 | 3 | 3 |
| 18 | 1 | 3 | 1 | 1 | −3 | 3 |
| 19 | −1 | −3 | −1 | −1 | 3 | −3 |
| 20 | 3 | −1 | −3 | −1 | −1 | −3 |
| 21 | 3 | 1 | 3 | −3 | −3 | 1 |
| 22 | 1 | 3 | −1 | −1 | 1 | −1 |
| 23 | −3 | 1 | −3 | 3 | 3 | 3 |
| 24 | 1 | 3 | −3 | 3 | −3 | 3 |
| 25 | −1 | −1 | 1 | −3 | 1 | −1 |
| 26 | 1 | −3 | −1 | −1 | 3 | 1 |
| 27 | −3 | −1 | −1 | 3 | 1 | 1 |
| 28 | −1 | 3 | −3 | −3 | −3 | 3 |
| 29 | 3 | 1 | −1 | 1 | 3 | 1 |

According to one embodiment of this aspect, the deriving of the demodulation reference signal sequence from the set of base sequences includes decimating the set of base sequences comprises applying a cyclic shift to the base sequences and an orthogonal cover code.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings.

What is claimed is:

1. A method of transmitting demodulation reference signals (DMRS) over one, three or five resource blocks (RBs) with Interleaved Frequency Division Multiple Access (IFDMA) from a wireless device to a wireless network node in a wireless network wherein Single Carrier Frequency Division Multiple Access (SC-OFDMA) is deployed in uplink, the method comprising at least one of:

determining a set of base sequences comprising thirty quadrature phase shifting keying, QPSK, sequences of one of length 6, 18 and 30, the set of thirty base sequences is given by:

$\bar{r}_{u,v}(n) = e^{j\phi(n)\pi/4}, 0 \leq n \leq M_{sc}^{RS}-1; M_{sc}^{RS} \in \{6,18,30\}; v=0, u=0,1,\ldots,29;$ deriving a demodulation reference signal sequence from the determined set of base sequences;
  multiplexing the demodulation reference signal sequence; and
  transmitting, by the wireless device, the multiplexed demodulation reference signal sequence to the wireless network node;
  where $r_{u,v}(n)$ is an equation for reference signal sequences;
  where $M_{sc}^{RS}$ is a sequence length;
  where v is a base sequence number;
  where u is a group number; and where φ(n) is given in the following table:

| | $\varphi(n)$ for $M_{sc}^{RS} = 6$ | | | | | |
|---|---|---|---|---|---|---|
| u | $\varphi(0), \varphi(1), \ldots, \varphi(5)$ | | | | | |
| 0 | -1 | -3 | 3 | -3 | 3 | -3 |
| 1 | -1 | 3 | -1 | 1 | 1 | 1 |
| 2 | 3 | -1 | -3 | -3 | 1 | 3 |
| 3 | 3 | -1 | -1 | 1 | -1 | -1 |
| 4 | -1 | -1 | -3 | 1 | -3 | -1 |
| 5 | 1 | 3 | -3 | -1 | -3 | 3 |
| 6 | -3 | 3 | -1 | -1 | 1 | -3 |
| 7 | -1 | -3 | -3 | 1 | 3 | 3 |
| 8 | 3 | -1 | -1 | 3 | 1 | 3 |
| 9 | 3 | -3 | 3 | 1 | -1 | 1 |
| 10 | -3 | 1 | -3 | -3 | -3 | -3 |
| 11 | -3 | -3 | -3 | 1 | -3 | -3 |
| 12 | 3 | -3 | 1 | -1 | -3 | -3 |
| 13 | 3 | -3 | 3 | -1 | -1 | -3 |
| 14 | 3 | -1 | 1 | 3 | 3 | 1 |
| 15 | -1 | 1 | -1 | -3 | 1 | 1 |
| 16 | -3 | -1 | -3 | -1 | 3 | 3 |
| 17 | 1 | -1 | 3 | -3 | 3 | 3 |
| 18 | 1 | 3 | 1 | 1 | -3 | 3 |
| 19 | -1 | -3 | -1 | -1 | 3 | -3 |
| 20 | 3 | -1 | -3 | -1 | -1 | -3 |
| 21 | 3 | 1 | 3 | -3 | -3 | 1 |
| 22 | 1 | 3 | -1 | -1 | 1 | -1 |
| 23 | -3 | 1 | -3 | 3 | 3 | 3 |
| 24 | 1 | 3 | -3 | 3 | -3 | 3 |
| 25 | -1 | -1 | 1 | -3 | 1 | -1 |
| 26 | 1 | -3 | -1 | -1 | 3 | 1 |
| 27 | -3 | -1 | -1 | 3 | 1 | 1 |
| 28 | -1 | 3 | -3 | -3 | -3 | 3 |
| 29 | 3 | 1 | -1 | 1 | 3 | 1. |

2. The method of claim 1, wherein the multiplexing is performed in a time domain, the DMRS being transmitted in different SC-FDMA symbols.

3. A method in a network node for receiving demodulation reference signals (DMRS) over one, three or five resource blocks (RBs) with Interleaved Frequency Division Multiple Access (IFDMA) in a wireless network wherein Single Carrier Frequency Division Multiple Access (SC-OFDMA) is deployed in an uplink, the method comprising:

signaling, to the wireless device, an indication of using IFDMA for DMRS transmission;

receiving, by the wireless network node, a demodulation reference signal from the wireless device, the indication of using IFDMA for DMRS transmission being used in the receiving;

deriving a demodulation reference signal sequence from a set of thirty base sequences, the set of thirty base sequences is given by:

$\bar{r}_{u,v}(n) = e^{j\varphi(n)\pi/4}, 0 \leq n \leq M_{sc}^{RS}-1, M_{sc}^{RS} \in \{6,18,30\};$
  $v=0, u=0,1,\ldots,29;$ performing channel estimation based on the received demodulation reference signal, based on the derived demodulation reference signal sequence and based on the indication of using IFDMA for DMRS transmission;

where $\bar{r}_{u,v}(n)$ is an equation for reference signal sequences;
  where $M_{sc}^{RS}$ is a sequence length;
  where v is a base sequence number;
  where u is a group number; and where φ(n) is given in the following table:

| u | φ(n) for $M_{sc}^{RS} = 6$ φ(0), φ(1), ..., φ(5) | | | | | |
|---|---|---|---|---|---|---|
| 0 | -1 | -3 | 3 | -3 | 3 | -3 |
| 1 | -1 | 3 | -1 | 1 | 1 | 1 |
| 2 | 3 | -1 | -3 | -3 | 1 | 3 |
| 3 | 3 | -1 | -1 | 1 | -1 | -1 |
| 4 | -1 | -1 | -3 | 1 | -3 | -1 |
| 5 | 1 | 3 | -3 | -1 | -3 | 3 |
| 6 | -3 | 3 | -1 | -1 | 1 | -3 |
| 7 | -1 | -3 | -3 | 1 | 3 | 3 |
| 8 | 3 | -1 | -1 | 3 | 1 | 3 |
| 9 | 3 | -3 | 3 | 1 | -1 | 1 |
| 10 | -3 | 1 | -3 | -3 | -3 | -3 |
| 11 | -3 | -3 | -3 | 1 | -3 | -3 |
| 12 | 3 | -3 | 1 | -1 | -3 | -3 |
| 13 | 3 | -3 | 3 | -1 | -1 | -3 |
| 14 | 3 | -1 | 1 | 3 | 3 | 1 |
| 15 | -1 | 1 | -1 | -3 | 1 | 1 |
| 16 | -3 | -1 | -3 | -1 | 3 | 3 |
| 17 | 1 | -1 | 3 | -3 | 3 | 3 |
| 18 | 1 | 3 | 1 | 1 | -3 | 3 |
| 19 | -1 | -3 | -1 | -1 | 3 | -3 |
| 20 | 3 | -1 | -3 | -1 | -1 | -3 |
| 21 | 3 | 1 | 3 | -3 | -3 | 1 |
| 22 | 1 | 3 | -1 | -1 | 1 | -1 |
| 23 | -3 | 1 | -3 | 3 | 3 | 3 |
| 24 | 1 | 3 | -3 | 3 | -3 | 3 |
| 25 | -1 | -1 | 1 | -3 | 1 | -1 |
| 26 | 1 | -3 | -1 | -1 | 3 | 1 |
| 27 | -3 | -1 | -1 | 3 | 1 | 1 |
| 28 | -1 | 3 | -3 | -3 | -3 | 3 |
| 29 | 3 | 1 | -1 | 1 | 3 | 1. |

4. A wireless device for transmitting demodulation reference signals (DMRS) over one, three or five resource blocks (RBs) with Interleaved Frequency Division Multiple Access (IFDMA) to a wireless network node in a wireless network wherein Single Carrier Frequency Division Multiple Access (SC-OFDMA) is deployed in uplink, the wireless device comprising:
processing circuitry configured to at least one of:
determine a set of base sequences comprising thirty quadrature phase shifting keying, QPSK, sequences of one of length 6, 18 and 30, the set of thirty base sequences is given by:

$$\bar{r}_{u,v}(n)=e^{j\phi(n)\pi/4}, 0\leq n\leq M_{sc}^{RS}-1; M_{sc}^{RS}\in\{6,18,30\};$$
$$v=0, u=0,1,\ldots,29;$$

derive a demodulation reference signal sequence from the determined set of base sequences;
multiplex the demodulation reference signal sequence; and
transmit the multiplexed demodulation reference signal sequence to the wireless network node;
where $\bar{r}_{u,v}(n)$ is an equation for reference signal sequences;
where $M_{sc}^{RS}$ is a sequence length;
where v is a base sequence number;
where u is a group number; and
where φ(n) is given in the following table:

5. The wireless device of claim 4, wherein the multiplexing is performed in a time domain, the DMRS being transmitted in different SC-FDMA symbols.

6. A wireless device for transmitting demodulation reference signals (DMRS) over one, three or five resource blocks (RBs) with interleaved Frequency Division Multiple Access (IFDMA) in a wireless network wherein Single Carrier Frequency Division Multiple Access (SC-OFDMA) is deployed in an uplink, the wireless device comprising:
processing circuitry configured to:
receive, from the network node, an indication of using IFDMA for DMRS transmission;
determine a set of base sequences, the set of base sequences comprising thirty quadrature phase shift keying, QPSK, sequences of length 6, 18 or 30, the set of thirty base sequences is given by $$\bar{r}_{u,v}(n)=e^{j\phi(n)\pi/4}, 0\leq n\leq M_{sc}^{RS}-1; M_{sc}^{RS}\in\{6,18,30\};$$
$$v=0, u=0,1,\ldots,29;$$

derive a demodulation reference signal sequence from the set of base sequences;
time multiplex the demodulation reference signal sequence in single carrier-orthogonal frequency division multiplexing, SC-OFDM, symbols;
transmit the multiplexed signal to the wireless network node;
where $\bar{r}_{u,v}(n)$ is an equation for reference signal sequences;
where $M_{sc}^{RS}$ is a sequence length;
where v is a base sequence number;
where u is a group number; and where φ(n) is given in the following table:

| u | \multicolumn{6}{c}{φ(n) for $M_{sc}^{RS} = 6$ <br> φ(0), φ(1), ..., φ(5)} |
|---|---|---|---|---|---|---|
| 0 | −1 | −3 | 3 | −3 | 3 | −3 |
| 1 | −1 | 3 | −1 | 1 | 1 | 1 |
| 2 | 3 | −1 | −3 | −3 | 1 | 3 |
| 3 | 3 | −1 | −1 | 1 | −1 | −1 |
| 4 | −1 | −1 | −3 | 1 | −3 | −1 |
| 5 | 1 | 3 | −3 | −1 | −3 | 3 |
| 6 | −3 | 3 | −1 | −1 | 1 | −3 |
| 7 | −1 | −3 | −3 | 1 | 3 | 3 |
| 8 | 3 | −1 | −1 | 3 | 1 | 3 |
| 9 | 3 | −3 | 3 | 1 | −1 | 1 |
| 10 | −3 | 1 | −3 | −3 | −3 | −3 |
| 11 | −3 | −3 | −3 | 1 | −3 | −3 |
| 12 | 3 | −3 | 1 | −1 | −3 | −3 |
| 13 | 3 | −3 | 3 | −1 | −1 | −3 |
| 14 | 3 | −1 | 1 | 3 | 3 | 1 |
| 15 | −1 | 1 | −1 | −3 | 1 | 1 |
| 16 | −3 | −1 | −3 | −1 | 3 | 3 |
| 17 | 1 | −1 | 3 | −3 | 3 | 3 |
| 18 | 1 | 3 | 1 | 1 | −3 | 3 |
| 19 | −1 | −3 | −1 | −1 | 3 | −3 |
| 20 | 3 | −1 | −3 | −1 | −1 | −3 |
| 21 | 3 | 1 | 3 | −3 | −3 | 1 |
| 22 | 1 | 3 | −1 | −1 | 1 | −1 |
| 23 | −3 | 1 | −3 | 3 | 3 | 3 |
| 24 | 1 | 3 | −3 | 3 | −3 | 3 |
| 25 | −1 | −1 | 1 | −3 | 1 | −1 |
| 26 | 1 | −3 | −1 | −1 | 3 | 1 |
| 27 | −3 | −1 | −1 | 3 | 1 | 1 |
| 28 | −1 | 3 | −3 | −3 | −3 | 3 |
| 29 | 3 | 1 | −1 | 1 | 3 | 1. |

7. The wireless device of claim 6, wherein the deriving of the demodulation reference signal sequence from the set of base sequences includes decimating the set of base sequences comprises applying a cyclic shift to the base sequences and an orthogonal cover code.

\* \* \* \* \*